United States Patent [19]

Yamada et al.

[11] Patent Number: 5,842,962
[45] Date of Patent: *Dec. 1, 1998

[54] CYLINDRICAL BODY FOR AN IMAGE FORMING APPARATUS

[75] Inventors: Yusuke Yamada; Shigemori Tanaka, both of Kawasaki; Saijiro Endo, Tokyo; Suguru Onuma, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 550,375

[22] Filed: Oct. 30, 1995

[30] Foreign Application Priority Data

| Oct. 31, 1994 | [JP] | Japan | 6-290664 |
| Oct. 31, 1994 | [JP] | Japan | 6-290665 |
| Oct. 5, 1995 | [JP] | Japan | 7-258630 |

[51] Int. Cl.⁶ ........................ B05C 1/08
[52] U.S. Cl. ............. 492/18; 492/47; 29/895.22; 399/279
[58] Field of Search ............ 492/18, 40, 45, 492/47; 399/159, 279, 286, 313; 29/895.22; 355/133

[56] References Cited

U.S. PATENT DOCUMENTS

| 2,671,262 | 3/1954 | Kuniholm | 492/47 |
| 3,518,739 | 7/1970 | Butler | 492/18 |
| 4,272,872 | 6/1981 | Hess et al. | 492/18 |
| 5,052,090 | 10/1991 | Kitaura et al. | 492/18 |
| 5,175,586 | 12/1992 | Goseki et al. | 355/259 |
| 5,498,837 | 3/1996 | Yamashita | 492/54 |
| 5,583,473 | 12/1996 | Yamashita | 492/18 |
| 5,594,531 | 1/1997 | Shishido et al. | 492/18 |

FOREIGN PATENT DOCUMENTS

| 775410 | 1/1968 | Canada | 492/47 |
| 63-220207 | 9/1988 | Japan . | |
| 3286414 | 12/1991 | Japan . | |

*Primary Examiner*—David P. Bryant
*Attorney, Agent, or Firm*—Fitzpatrick, Cella, Harper & Scinto

[57] ABSTRACT

It is an object of this invention to provide a cylindrical body manufacturing method capable of setting a high coaxiality and a high run-out accuracy between a cylindrical member and a flange member. To achieve this object, in a cylindrical body manufacturing method according to this invention, the diameter of an end portion of a sleeve is increased by heating the end portion. A flange held at the end of a robot hand is clearance-fitted in an inner-diameter processed hole in the end portion of the sleeve while the central axis of the flange is aligned with that of the sleeve. The flange is then pushed to make the outer periphery of the flange abut against the end face of the sleeve.

5 Claims, 49 Drawing Sheets

$e_1 \fallingdotseq e_2$ $e_1 >> e_2$

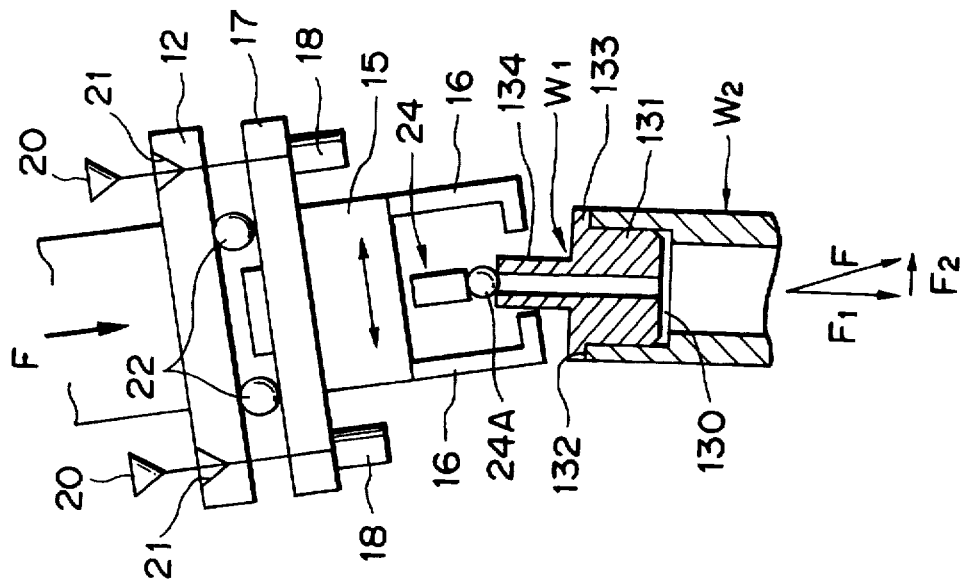
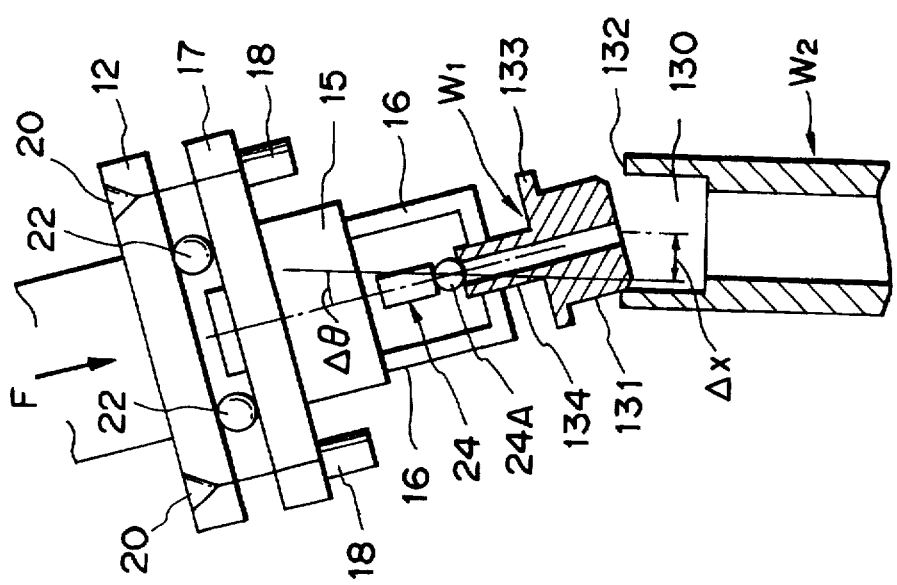

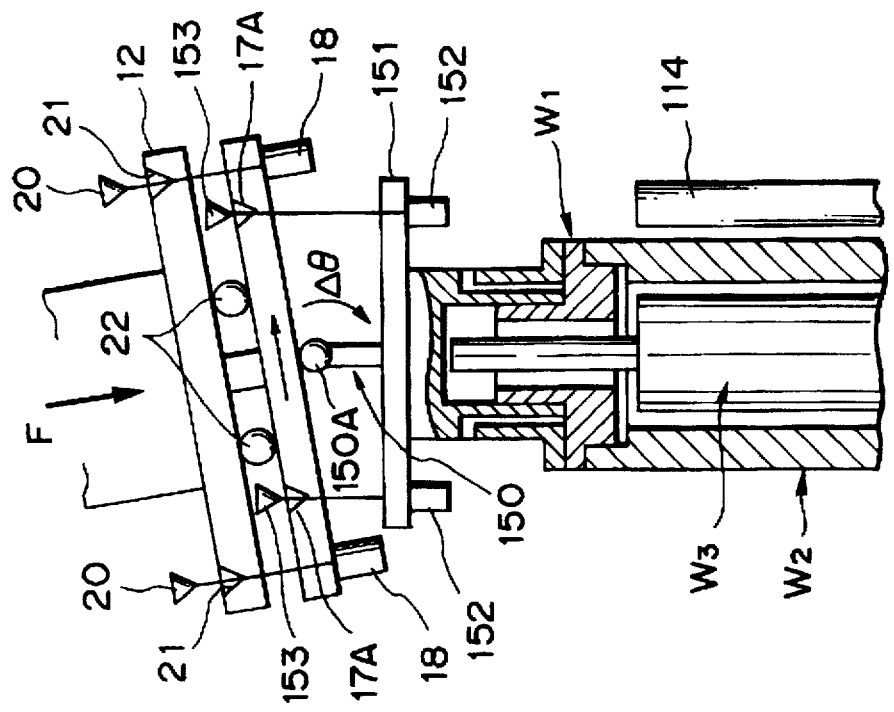
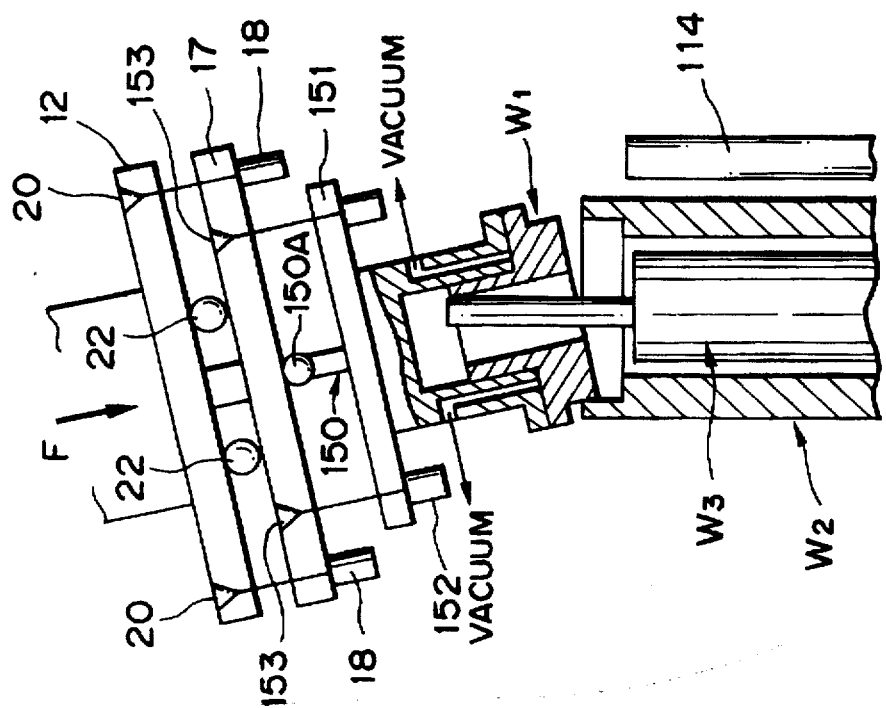

FIG. 45

|  | SUPPLIED POWER (kw) | POWER SUPPLY TIME (sec) | HEATING TEMPERATURE (°C) |
|---|---|---|---|
| φ16 Aℓ SLEEVE | 1 | 1 | ABOUT 200 |
| φ20 Aℓ SLEEVE | 2 | 1 | ABOUT 200 |
| φ20 SUS SLEEVE | 1 | 1 | ABOUT 200 |
| φ30 Aℓ SLEEVE | 3 | 1 | ABOUT 200 |
| φ12 Aℓ SLEEVE | 0.7 | 1 | ABOUT 200 |

FIG. 46

| | WALL THICKNESS (mm) OF SLEEVE | CONNECTION MARGIN (μm) | SOCKET JOINT RUN-OUT (μm) | END FACE SQUARENESS (μm) | CONNECTION LENGTH (mm) | INCREASED DIAMETER (mm) | PULLING FORCE | IMAGE EVALUATION |
|---|---|---|---|---|---|---|---|---|
| EXAMPLE 6 | 0.8 | 9 (0.045% OF REFERENCE INNER DIAMETER) | 8 | 4 | 1.5 | 65 | ○ | ◎ |
| EXAMPLE 7 | 0.8 | 20 (0.1% OF REFERENCE INNER DIAMETER) | 6 | 3 | 2.0 | 85 | ○ | ◎ |
| EXAMPLE 8 | 0.8 | 15 (0.08% OF REFERENCE INNER DIAMETER) | 7 | 3 | 2.0 | 75 | ○ | ◎ |
| EXAMPLE 9 | 0.8 | 19 (0.1% OF REFERENCE INNER DIAMETER) | 10 | 5 | 2.0 | 75 | ○ | ○ |
| COMPARATIVE EXAMPLE 1 | 0.8 | 47 | 7 | 4 | 1.5 | 30 | — | — |
| COMPARATIVE EXAMPLE 2 | 0.8 | 10 | 20 | 20 | 2.0 | 65 | ○ | × |
| COMPARATIVE EXAMPLE 3 | 0.8 | 10 | 7 | 4 | 0.5 | 65 | × | × |
| COMPARATIVE EXAMPLE 4 | 0.8 | 7 (0.037% OF REFERENCE INNER DIAMETER) | 7 | 4 | 1.5 | 65 | × | ○ |
| COMPARATIVE EXAMPLE 5 | 0.8 | 15 | 12 | 7 | 2.0 | 56 | ○ | △ |

IMAGE EVALUATION
◎ : VERY GOOD
○ : GOOD
△ : POOR BUT NOT PRACTICALLY UNUSABLE
× : PRACTICALLY UNUSABLE

PULLING FORCE  ○ : 5 kg OR HIGHER   × : 5 kg OR LOWER

CYLINDRICAL BODY FOR AN IMAGE FORMING APPARATUS

BACKGROUND OF THE INVENTION

The present invention relates to a cylindrical body such as in electrophotographic photosensitive drum or a developing sleeve of image forming apparatuses, e.g., a copying machine, a printer, a facsimile, and a printing machine, a method and an apparatus for manufacturing the cylindrical body, and a developing apparatus.

Conventionally, a cylindrical member finished to have a predetermined surface roughness is used as an electrophotographic photosensitive drum or a developing sleeve of image forming apparatuses such as an electrophotographic copying machine, a laser beam printer, a facsimile, and a printing machine.

An electrophotographic photosensitive drum is manufactured by forming a photoconductive layer on the surface of drum substrate finished to have a predetermined surface roughness. If the surface accuracy or the dimensional accuracy of the drum substrate is low, the photoconductive layer surface becomes uneven, resulting in defects occurring in images of an image forming apparatus. Therefore, to obtain an image forming apparatus with a high accuracy, the surface accuracy of the drum substrate must have a predetermined surface roughness. Also, the straightness and the roundness of the drum substrate must have a high accuracy.

A developing sleeve is used to carry a developer to a latent image carrier on which a latent image is formed, in order to allow the latent image carrier to carry the latent image formed by an electrophotographic process or an electrostatic recording process. To carry a developer and faithfully develop a latent image into a visual image, the developing sleeve must have a high accuracy in the straightness and in the prevention of a run-out regardless of whether the developer is a mono or two-component developer, a magnetic or nonmagnetic developer, or an insulating or dielectric developer.

The straightness of the developing sleeve is preferably 15 μm or less. This value is necessary to maintain a uniform gap in the axial direction between the developing sleeve and the photosensitive drum to thereby obtain good images. A desired accuracy is attained by extruding, drawing, and cutting or polishing a cylindrical body.

On the other hand, the photosensitive drum preferably has straightness of 20 μm or less. This value is necessary to obtain uniform latent images in the axial direction of an exposing means in the latent image formation by the photosensitive drum. A desired accuracy is attained by extruding, drawing, and cutting a cylindrical body.

Generally, such a cylindrical member is made from Al with a purity of 99.5% or higher, a Cu—Mn—Al alloy containing 0.05 to 0.20% of Cu and 1.0 to 1.5% of Mu, or a Si—Mg—Al alloy containing 0.20 to 0.60% of Si and 0.45 to 0.90% of Mg. Any of these materials is made have certain dimensional accuracy through extrusion and drawing. However, a large bending remains in this aluminum drawn cylinder. Therefore, the cylinder is usually finished to have a wanted dimensional accuracy (straightness, run-out) by performing roll correction or the like processing. Thereafter, the cylinder is cut into a predetermined length, burrs are removed from the two end portions, and the end portions are finished by cutting in order to improve the end face accuracy.

In the case of a developing sleeve, for example, to impart a function of a developing sleeve to the substrate cylinder manufactured as described above, sandblasting is performed on the surface of the cylinder to roughen the surface, thereby improving the ability to carry a developer (toner). Thereafter, to improve the toner charging properties, a paint prepared by dispersing conductive carbon in a thermosetting resin is spray-coated on the roughened surface, and the coated layer is hardened by drying it in a constant temperature bath at about 150° to 170° C. for 20 to 30 min. This method is well known to those skilled in the art.

Finally, flange members for supporting a developing sleeve to be rotatable are connected by bonding, press fit, or some other method to the two end portions of the cylindrical member thus manufactured. A magnet roller for carrying toner by a magnetic force is sometimes inserted into the cylinder depending on the type of developer (toner) to be used, i.e., when the toner is magnetic toner. By connecting the flange members to the two end portions in this way, the cylindrical member is completed as a developing sleeve.

Unfortunately, the coaxiality between the flange members and the cylindrical member is degraded because the flange members are connected after sandblasting and coating are performed for the substrate cylinder. That is, since the cylindrical part and the flange parts as unit parts are connected, the connection accuracy necessarily has its limit. The resulting developing sleeve is particularly unsuitable as a high-accuracy cylindrical member for use in, e.g., electrophotographic apparatuses. If the connection accuracy of the flange members is low, the flange members are sometimes connected askew to the cylindrical member. In this case the rotational behavior of the developing sleeve becomes irregular, and this sometimes appears as a sleeve-period density variation in images.

The following method is available as a method of eliminating this drawback.

That is, a flange member is previously connected by press fit, bonding, or some other method to one end portion of a cylindrical member as a substrate of a developing sleeve. Before blasting and coating, a magnet roller is inserted and another flange member is similarly connected to the other end portion of the cylindrical member. Thereafter, the outer surfaces of the flange members and the cylindrical member are simultaneously cut by a lathe or the like machine, thereby finishing the coaxiality between the flange members and the cylindrical member with a high accuracy. Finally, blasting and coating are performed. In this method, the coaxiality between the bearings of the flange members and the cylindrical member depends upon the machining accuracy of the lathe. Accordingly, a highly accurate coaxiality is relatively easily obtained.

It is unfortunate that this method also has the following problems. For example, when the cylindrical member incorporating the magnet roller is placed under a high temperature of 150° to 170° C. in the drying step after coating, the magnet roller inserted into the cylindrical member sometimes deforms due to the heat. The magnet roller largely bends inside the cylindrical member and contacts the inner surface of the cylindrical member in some instances. Additionally, the lines of magnetic force may be shifted by the deformation of the magnet roller, or the magnet roller contacting the inner surface of the cylindrical member influences the rotational behavior of the developing sleeve, adversely affecting formed images. Also, vibrations readily occur when works are rotated at a high speed in the cutting step done by a lathe. Accordingly, the work rotating speed must be limited to approximately 3000 rpm or lower, and this makes a high-speed cutting step difficult. Additionally, rotation of a motor must be stopped when each work is attached and detached to and from the cutting machine. Consequently, the waiting time is prolonged since the motor rise time is necessary for each machining cycle of each work. The result is that the machining cycle time of the work itself is prolonged to lead to a rise in the manufacturing cost.

More specifically, the methods of connecting a cylindrical member and flange members of a developing sleeve are: method (A) in which plastic flange members are pressed into the end portions of an aluminum cylindrical member and then the end portions of the cylindrical member are caulked; and method (B) in which aluminum flange members are pressed into the end portions of an aluminum cylindrical member. The respective problems of these methods are as follows.

Problems of method (A)

To obtain a highly accurate connection by pressing plastic flange members into the end portions of an aluminum cylindrical member, a press-fit apparatus which is adjusted with a high accuracy is required as an apparatus for press-fitting the flange members. This adjustment is difficult, and the press-fit apparatus is expensive. Also, even when a highly accurate press-fit apparatus is used, the run-out of the flange members is as large as 60 $\mu$m with reference to the outer diameter of the cylindrical member. Furthermore, to prevent removal of the flange members, the connected portions of the cylindrical member must be caulked after the flange members are press-fitted.

If the run-out of the flange members is 15 $\mu$m or larger and images are formed using this developing sleeve, the central axes of the cylindrical member and the flange members are not aligned. As a result, an excessive force acts on the cylindrical member to make it impossible to keep the gap between the developing sleeve and a photosensitive drum constant. Consequently, a significant pitch variation appears.

In order that the gap between the developing sleeve connected by the above method and a photosensitive drum be kept constant, if sleeve rollers are fitted in the two ends of the cylindrical member of the developing sleeve and urged against the photosensitive drum with a fixed pre-load, any run-out gives rise to the following problem. That is, since the sleeve rollers are made of a soft resin so as not to damage the surface of the cylindrical member of the developing sleeve or of the photosensitive drum, the rollers are unevenly scraped off by a run-out, resulting in a low durability. This prevents a high-speed rotation of the developing sleeve with respect to the photosensitive drum, making a high-speed recording operation difficult.

Problems of method (B)

In this method aluminum flange members are pressed into an aluminum cylindrical member, and this obviates the need for caulking of the connected portions of the cylindrical member in method (A). However, the run-out of the flange members is made worse because the flange members are nonuniformly press-fitted due to scoring between the cylindrical member and the flange members.

In order that the gap between the developing sleeve connected by the above method and a photosensitive drum be kept constant, if sleeve rollers 2023 made of a hard resin are fitted on flange members 2022 as illustrated in FIG. 42, the following problem arises. That is, if there is a difference between the central axes of a cylindrical member of a developing sleeve 1020 and the flange members 2022, the cylindrical member of the developing sleeve 1020 eccentrically rotates around a fixed magnet roller 1025 as shown in FIGS. 43A to 43D. When the developing sleeve 1020 and a photosensitive drum 1101 (FIG. 42) exchange toner, this eccentric rotation alters (FIG. 44) the magnetic toner attraction force of the magnet roller 1025. This results in variations in the image quality.

As a method of solving this problem, Japanese Patent Laid-Open No. 63-220207 has disclosed a method by which a shaft member and a rotary member in which this shaft member is fitted are connected by shrink fit. However, Japanese Patent Laid-Open No. 63-220207 has disclosed only a technique of forming a clearance between the rotary member and the shaft member by heating the rotary member and then inserting the shaft member, i.e., does not disclose any method by which the run-out accuracy or the coaxiality between the two members is improved. Also, Japanese Patent Laid-Open No. 63-220207 does not disclose the heating conditions or the like factors during the shrink fit.

SUMMARY OF THE INVENTION

The present invention, therefore, has been made in consideration of the above conventional problems and has as its object to provide a cylindrical body manufacturing method and apparatus capable of connecting a cylindrical member and flange members with a high coaxiality and a high run-out accuracy, a cylindrical body such as a developing sleeve or a photosensitive drum, and a developing apparatus.

To solve the above problems and achieve the object, according to the first aspect a cylindrical body of the present invention has the following arrangement.

That is, in a cylindrical body in which a connecting portion of a flange member is fitted in an end portion of a cylindrical member, the inside of the end portion of the cylindrical member and the connecting portion of the flange member are set to have dimensions by which a close-fit relation is obtained between the end portion and the connecting portion, the flange member has an opposing surface which abuts against an end face of the cylindrical member, and the end portion of the cylindrical member is heated and increased in diameter so as to have a clearance-fit relation with the connecting portion of the flange member, the connecting portion of the flange member is fitted in the end portion of the cylindrical member, while the end portion of the cylindrical member is cooled, so that a central axis of the flange member is aligned with a central axis of the cylindrical member, and the opposing surface of the flange member contacts the end face of the cylindrical member.

According to the second aspect a cylindrical body of the present invention has the following arrangement.

That is, a cylindrical body comprises a sleeve member having an opening portion in at least one end, a fitting portion being defined inside the opening portion, and a shaft member having a first cylindrical portion to be fitted in the fitting portion of the sleeve member, and a second cylindrical portion in which a shaft portion extending from the first cylindrical portion is formed, wherein an inner diameter of the opening portion of the sleeve member is increased by heating the opening portion to a predetermined temperature by induction heating, the first cylindrical portion of the shaft member is inserted and fitted in the opening portion increased in diameter, and the shaft member and the sleeve member are connected by cooling the heated portion.

According to the third aspect a cylindrical body of the present invention has the following arrangement.

That is, a cylindrical body comprises a sleeve member having an opening portion in at least one end, a fitting portion being defined inside the opening portion; and a shaft member having a first cylindrical portion to be fitted in the fitting portion of the sleeve member, and a second cylindriil portion in which a shaft portion extending from the first /lindrical portion is formed, wherein the sleeve member id the shaft member are primarily made from aluminum, an ner diameter of the opening portion of the sleeve member increased by heating the opening portion to a predetermined temperature, the first cylindrical portion of the shaft ember is inserted and fitted in the opening portion creased in diameter, and the shaft member and the sleeve ember are integrally connected by cooling the heated ortion, thereby ensuring coaxiality between the sleeve ember and the shaft member.

According to the first aspect a developing sleeve of the esent invention has the following arrangement.

That is, in a developing sleeve in which a connecting ortion of a flange member is fitted in an end portion of a /lindrical member, the inside of the end portion of the /lindrical member and the connecting portion of the flange ember are set to have dimensions by which a close-fit lation is obtained between the end portion and the connecting portion, the flange member has an opposing surface hich abuts against an end face of the cylindrical member, id the end portion of the cylindrical member is heated and creased in diameter so as to have a clearance-fit relation ith the connecting portion of the flange member, the nnecting portion of the flange member is fitted in the end ortion of the cylindrical member, while the end portion of e cylindrical member is cooled, so that a central axis of the inge member is aligned with a central axis of the cylinical member, and the opposing surface of the flange ember contacts the end face of the cylindrical member.

According to the second aspect a developing sleeve of the esent invention has the following arrangement.

That is, a developing sleeve for an image forming apparatus comprises a sleeve member having an opening portion at least one end, a fitting portion being defined inside the ening portion, and a shaft member having a first cylinical portion to be fitted in the fitting portion of the sleeve ember, and a second cylindrical portion in which a shaft rtion extending from the first cylindrical portion is rmed, wherein an inner diameter of the opening portion of e sleeve member is increased by heating the opening rtion to a predetermined temperature, the first cylindrical rtion of the shaft member is inserted and fitted in the ening portion increased in diameter, and the shaft member d the sleeve member are connected by cooling the heated rtion.

According to the third aspect a developing sleeve of the esent invention has the following arrangement.

That is, a developing sleeve comprises a sleeve member ving an opening portion in at least one end, a fitting rtion being defined inside the opening portion, and a shaft ember having a first cylindrical portion to be fitted in the ting portion of the sleeve member, and a second cylindrical portion in which a shaft portion extending from the first lindrical portion is formed, wherein the sleeve member d the shaft member are primarily made from aluminum, an er diameter of the opening portion of the sleeve member increased by heating the opening portion to a predetermined temperature, the first cylindrical portion of the shaft ember is inserted and fitted in the opening portion reased in diameter, and the shaft member and the sleeve ember are integrally connected by cooling the heated rtion, thereby ensuring coaxiality between the sleeve ember and the shaft member.

According to the fourth aspect a developing sleeve of the esent invention has the following arrangement.

That is, a developing sleeve for an image forming apparatus comprises a sleeve member having an opening portion in at least one end, a fitting portion being defined inside the opening portion, a shaft member having a first cylindrical portion to be fitted in the fitting portion of the sleeve member, and a second cylindrical portion in which a hollow shaft portion extending from the first cylindrical portion is formed, and a magnet member having a shaft portion arranged in the sleeve member, wherein the shaft portion of the magnet member is exposed from the hollow shaft portion of the shaft member, and an inner diameter of the opening portion of the sleeve member is increased by heating the opening portion to a predetermined temperature, the first cylindrical portion of the shaft member is inserted and fitted in the opening portion increased in diameter, and the shaft member and the sleeve member are connected by cooling the heated portion.

According to the fifth aspect a developing sleeve of the present invention has the following arrangement.

That is, a developing sleeve for an image forming apparatus comprises a sleeve member having an opening portion in at least one end, a plurality of fitting portions being defined inside the opening portion, a shaft member having a first cylindrical portion to be fitted in the fitting portions of the sleeve member, and a second cylindrical portion in which a hollow shaft portion extending from the first cylindrical portion is formed, a bearing member to be fitted in the fitting portions of the sleeve member, and a magnet member having a shaft portion arranged in the sleeve member, wherein the shaft portion of the magnet member is exposed from the hollow shaft portion of the shaft member through the bearing member, and an inner diameter of the opening portion of the sleeve member is increased by heating the opening portion to a predetermined temperature, the first cylindrical portion of the shaft member is inserted and fitted in the opening portion increased in diameter, and the shaft member and the sleeve member are connected by cooling the heated portion.

According to the first aspect a photosensitive drum of the present invention has the following arrangement.

That is, in a photosensitive drum in which a connecting portion of a flange member is fitted in an end portion of a cylindrical member, the inside of the end portion of the cylindrical member and the connecting portion of the flange member are set to have dimensions by which a close-fit relation is obtained between the end portion and the connecting portion, the flange member has an opposing surface which abuts against an end face of the cylindrical member, and the end portion of the cylindrical member is heated and increased in diameter so as to have a clearance-fit relation with the connecting portion of the flange member, the connecting portion of the flange member is fitted in the end portion of the cylindrical member, while the end portion of the cylindrical member is cooled, so that a central axis of the flange member is aligned with a central axis of the cylindrical member, and the opposing surface of the flange member contacts the end face of the cylindrical member.

According to the second aspect a photosensitive drum of the present invention has the following arrangement.

That is, a photosensitive drum for an image forming apparatus comprises a sleeve member having an opening portion in at least one end, a fitting portion being defined inside the opening portion, and a shaft member having a first cylindrical portion to be fitted in the fitting portion of the sleeve member, and a second cylindrical portion in which a shaft portion extending from the first cylindrical portion is formed, wherein an inner diameter of the opening portion of the sleeve member is increased by heating the opening portion to a predetermined temperature, the first cylindrical portion of the shaft member is inserted and fitted in the opening portion increased in diameter, and the shaft member and the sleeve member are connected by cooling the heated portion.

According to the third aspect a photosensitive drum of the present invention has the following arrangement.

That is, a photosensitive drum for an image forming apparatus comprises a sleeve member having an opening portion in at least one end, a fitting portion being defined inside the opening portion, and a shaft member having a first cylindrical portion to be fitted in the fitting portion of the sleeve member, and a second cylindrical portion in which a shaft portion extending from the first cylindrical portion is formed, wherein the sleeve member and the shaft member are primarily made from aluminum, an inner diameter of the opening portion of the sleeve member is increased by heating the opening portion to a predetermined temperature, the first cylindrical portion of the shaft member is inserted and fitted in the opening portion increased in diameter, and the shaft member and the sleeve member are integrally connected by cooling the heated portion, thereby ensuring coaxiality between the sleeve member and the shaft member.

According to the first aspect a developing apparatus of the present invention has the following arrangement.

That is, a developing apparatus having a developing roller for supplying a developer to a photosensitive member for receiving an image of information from an information recording medium, in order to visualize the image on the photosensitive member, comprises a frame member for holding a bearing member for axially supporting the developing roller, wherein the developing roller comprises a sleeve member having an opening portion in at least one end, a fitting portion being defined inside the opening portion, and a shaft member having a first cylindrical portion to be fitted in the fitting portion of the sleeve member, and a second cylindrical portion in which a shaft portion extending from the first cylindrical portion is formed, and an inner diameter of the opening portion of the sleeve member is increased by heating the opening portion to a predetermined temperature, the first cylindrical portion of the shaft member is inserted and fitted in the opening portion increased in diameter, and the shaft member and the sleeve member are connected by cooling the heated portion, thereby ensuring coaxiality between the sleeve member and the shaft member.

According to the second aspect a developing apparatus of the present invention has the following arrangement.

That is, a developing apparatus having a developing roller for supplying a developer to a photosensitive member for receiving an image of information from an information recording medium, in order to visualize the image on the photosensitive member, comprises a frame member for holding a bearing member for axially supporting the developing roller, wherein the developing roller comprises a sleeve member having an opening portion in at least one end, a fitting portion being defined inside the opening portion, a shaft member having a first cylindrical portion to be fitted in the fitting portion of the sleeve member, and a second cylindrical portion in which a hollow shaft portion extending from the first cylindrical portion is formed, and a magnet member having a shaft portion arranged in the sleeve member, the shaft portion of the magnet member is exposed from the hollow shaft portion of the shaft member, and an inner diameter of the opening portion of the sleeve member is increased by heating the opening portion to a predetermined temperature, the first cylindrical portion of the shaft member is inserted and fitted in the opening portion increased in diameter, and the shaft member and the sleeve member are connected by cooling the heated portion.

According to the first aspect a cylindrical body manufacturing method of the present invention has the following arrangement.

That is, a cylindrical body manufacturing method of manufacturing a cylindrical body in which a connecting portion of a flange member is fitted in an end portion of a cylindrical member, comprises the steps of setting the inside of the end portion of the cylindrical member and the connecting portion of the flange member to have dimensions by which a close-fit relation is obtained between the end portion and the connecting portion, increasing an inner diameter of the end portion of the cylindrical member by heating the end portion to a predetermined temperature, thereby obtaining a clearance-fit relation between the inside of the end portion of the cylindrical member and the connecting portion of the flange member, fitting the connecting portion of the flange member in the end portion of the cylindrical member while the end portion of the cylindrical member is cooled, and pushing the flange member in a direction of fitting to the cylindrical member to make an end face of the cylindrical member abut against an opposing surface of the flange member which opposes the end face.

According to the first aspect a cylindrical body manufacturing apparatus of the present invention has the following arrangement.

That is, a cylindrical body manufacturing apparatus for manufacturing a cylindrical body in which a connecting portion of a flange member is fitted in an end portion of a cylindrical member, comprises heating means for heating the end portion of the cylindrical member, which is set to have dimensions by which a close-fit relation is obtained with respect to the connecting portion of the flange member, to a predetermined temperature, thereby increasing an inner diameter of the end portion of the cylindrical member to have a clearance-fit relation with the connecting portion of the flange member, and fitting means for fitting the connecting portion of the flange member in the end portion of the cylindrical member, while the end portion of the cylindrical member is cooled, so that a central axis of the flange member is aligned with a central axis of the cylindrical member, thereby making an end face of the cylindrical member abut against an opposing surface of the flange member which opposes the end face.

According to the second aspect a cylindrical body manufacturing method of the present invention has the following arrangement.

That is, a cylindrical body manufacturing method of manufacturing a cylindrical body in which a connecting portion of a flange member is fitted in an end portion of a cylindrical member, comprises the steps of setting the inside of the end portion of the cylindrical member and the connecting portion of the flange member to have dimensions by which a close-fit relation is obtained between the end portion and the connecting portion, incorporating a magnet roller into the cylindrical member, increasing an inner diameter of the end portion of the cylindrical member by heating the end portion to a predetermined temperature, while an end portion of the magnet roller is covered with magnetic shielding means, thereby obtaining a clearance-fit relation between the inside of the end portion of the cylindrical member and the connecting portion of the flange member, fitting the connecting portion of the flange member in the end portion of the cylindrical member, while the end portion of the cylindrical member is cooled, so that the end portion of the magnet roller extends through the flange member, and pushing the flange member in a direction of fitting to the cylindrical member to make an end face of the cylindrical member abut against an opposing surface of the flange member which opposes the end face.

Other objects and advantages besides those discussed above shall be apparent to those skilled in the art from the description of preferred embodiments of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 19A and 19B are enlarged views of the major components for explaining the operation of connecting a sleeve and a flange by the manufacturing apparatus in FIG. 1;

FIGS. 23A and 23B are enlarged views of the main parts for explaining the operation of connecting a sleeve and a flange by the manufacturing apparatus in FIG. 22;

FIG. 45 is a view showing the supplied power and the power supply time for heating the end portion of a sleeve to 200° C. when the diameter of the sleeve changes;

FIG. 46 is a view showing the measurement results of the sixth to ninth embodiments and the comparative examples;

DETAILED DESCRIPTION OF THE PREFERRED EMBODIMENTS

Embodiments of the present invention will be described below in the order of [Overall Arrangement of Image Forming Apparatus], [Developing Sleeve Manufacturing Apparatus], [Practical Example of Developing Sleeve Manufacturing Method], [Examples of Structure of Developing Sleeve], and [Practical Example of Photosensitive Drum Manufacturing Method].

[Image Forming Apparatus]

Figure 35:
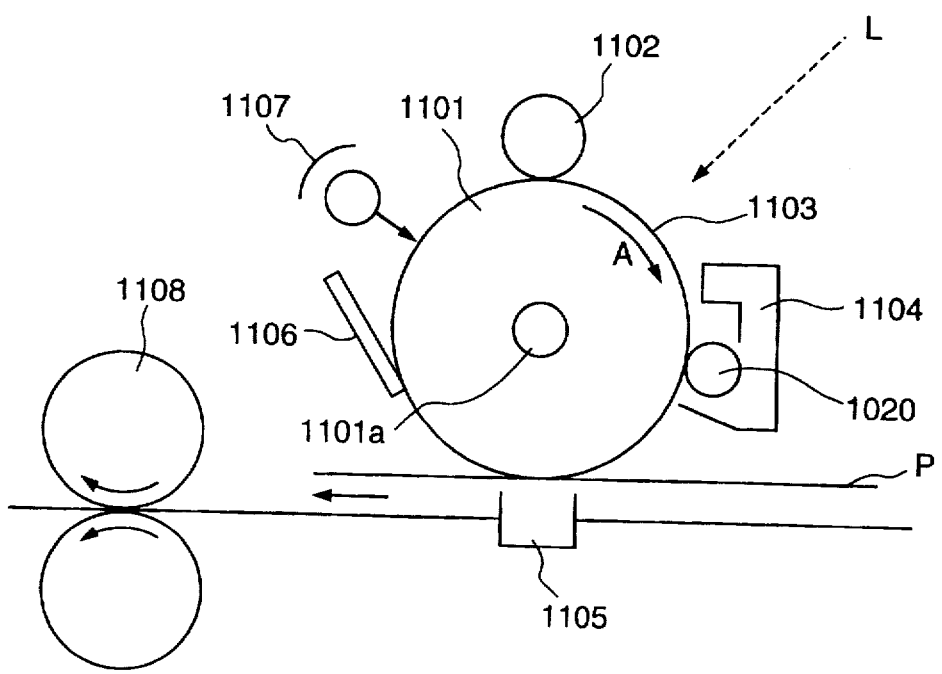
FIG. 35 is a schematic view showing the arrangement of the major components of an image forming apparatus.

FIG. 35 shows a schematic arrangement of a transfer type electrophotographic apparatus including a developing sleeve or also called developing roller and a photosensitive drum as cylindrical members.

In FIG. 35, a photosensitive drum 1101 is rotated about a shaft 1101a in a direction indicated by an arrow A at a predetermined peripheral velocity. In the course of rotation, the circumferential surface of the photosensitive drum 1101 is evenly charged with a predetermined positive or negative potential by a charging means 1102. Thereafter, the circumferential surface of the photosensitive drum 1101 in an exposure portion 1103 is subjected to optical image exposure L (e.g., slit exposure or laser beam scanning exposure) by an image exposing means (not shown). As a consequence, an electrostatic latent image corresponding to the exposed image is formed on the circumferential surface of the photosensitive drum 1101.

This electrostatic latent image is developed with toner by a developing means 1104, and the resulting toner image is transferred by a transfer means 1105 onto the surface of a transfer medium P which is fed from a paper feed unit (not shown) to between the photosensitive drum 1101 and the transfer means 1105 in synchronism with the rotation of the photosensitive drum 1101. The developing means 1104 includes a developing sleeve 1020. The transfer medium P on which the image is transferred is separated from the surface of the photosensitive drum 1101 and supplied to an image fixing means 1108 where the transferred image is fixed. The resulting transfer medium P is output from the apparatus as a printout (copy).

The residual toner after the image transfer is removed from the surface of the photosensitive drum 1101 by a cleaning means 1106, and the cleaned surface is discharged by a pre-exposing means 1107. Thus the surface of the photosensitive drum 1101 is repetitively used in image formation.

As the uniform charging means 1102 for the photosensitive drum 1101, a corona charger or a contact charger is generally, widely used. A corona charging transfer means is also generally, widely used as the transfer means 1105. Also, a plurality of constituent elements, e.g., the photosensitive drum 1101, the developing means 1104, and the cleaning means 1106 described above, can be integrally united as a single unit, and this unit can be detachably mounted in the electrophotographic apparatus. As an example, a unit which integrally supports at least one of the charging means 1102, the developing means 1104, and the cleaning means 1106 together with the photosensitive drum 1101 can be used as a single unit (developing device) which is detachably mountable in the apparatus main body, and this unit can be demountably arranged in the apparatus main body by using a guiding means such as a rail.

When the electrophotographic apparatus is used as a copying machine or a printer, the optical image exposure L is done by reading reflected light or transmitted light from an original or an original itself to form a signal and scanning a laser beam or driving an LED array or a liquid crystal shutter array by using this signal.

Figure 36:
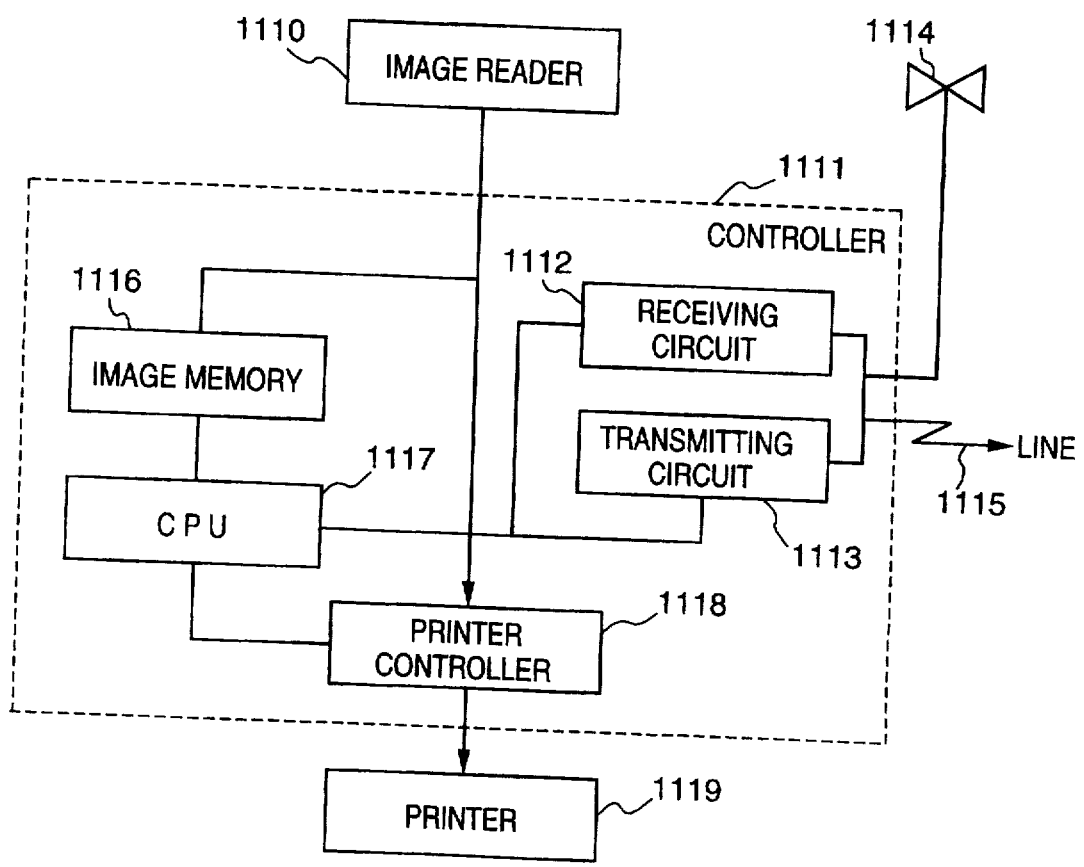
FIG. 36 is a block diagram of the image forming apparatus in FIG. 35.

When the electrophotographic apparatus is used as a facsimile printer, the optical image exposure L functions as exposure for printing received data. FIG. 36 is a block diagram showing a practical arrangement in this case.

Referring to FIG. 36, a controller 1111 controls an image reader 1110 and a printer 1119. The controller 1111 is generally controlled by a CPU 1117. Read data from the image reader 1110 is transmitted to a remote station via a transmitting circuit 1113. Data received from a remote station is supplied to the printer 1119 via a receiving circuit 1112. An image memory 1116 stores predetermined image data. A printer controller 118 controls the printer 1119. Reference numeral 1114 denotes a telephone set.

An image received from a line 1115 (image information transmitted from a remote terminal through the line 1115) is demodulated by the receiving circuit 1112. Thereafter, the CPU 1117 decodes the image information and stores the information into the image memory 116. When an image of at least one page is stored in the memory 1116, the CPU 1117 performs image recording of that page. That is, the CPU 1117 reads out the image information of one page from the memory 1116 and sends the decoded image information of one page to the printer controller 1118. Upon receiving the image information of one page from the CPU 1117, the printer controller 1118 so controls the printer 1119 as to perform recording of the image information of that page. Note that the CPU 1117 transmits the next page while the printer 1119 is recording the data.

Image reception and recording are performed as described above.

The developing means 1104 supplies a developer to an electrostatic latent image on the photosensitive drum 1101 by rotation of the developing sleeve 1020 and thereby develops the electrostatic latent image. Therefore, to well supply the developer to the photosensitive drum 1101, the developing sleeve 1020 must be opposed to the photosensitive drum 1101 with a predetermined distance between them.

Figure 37:
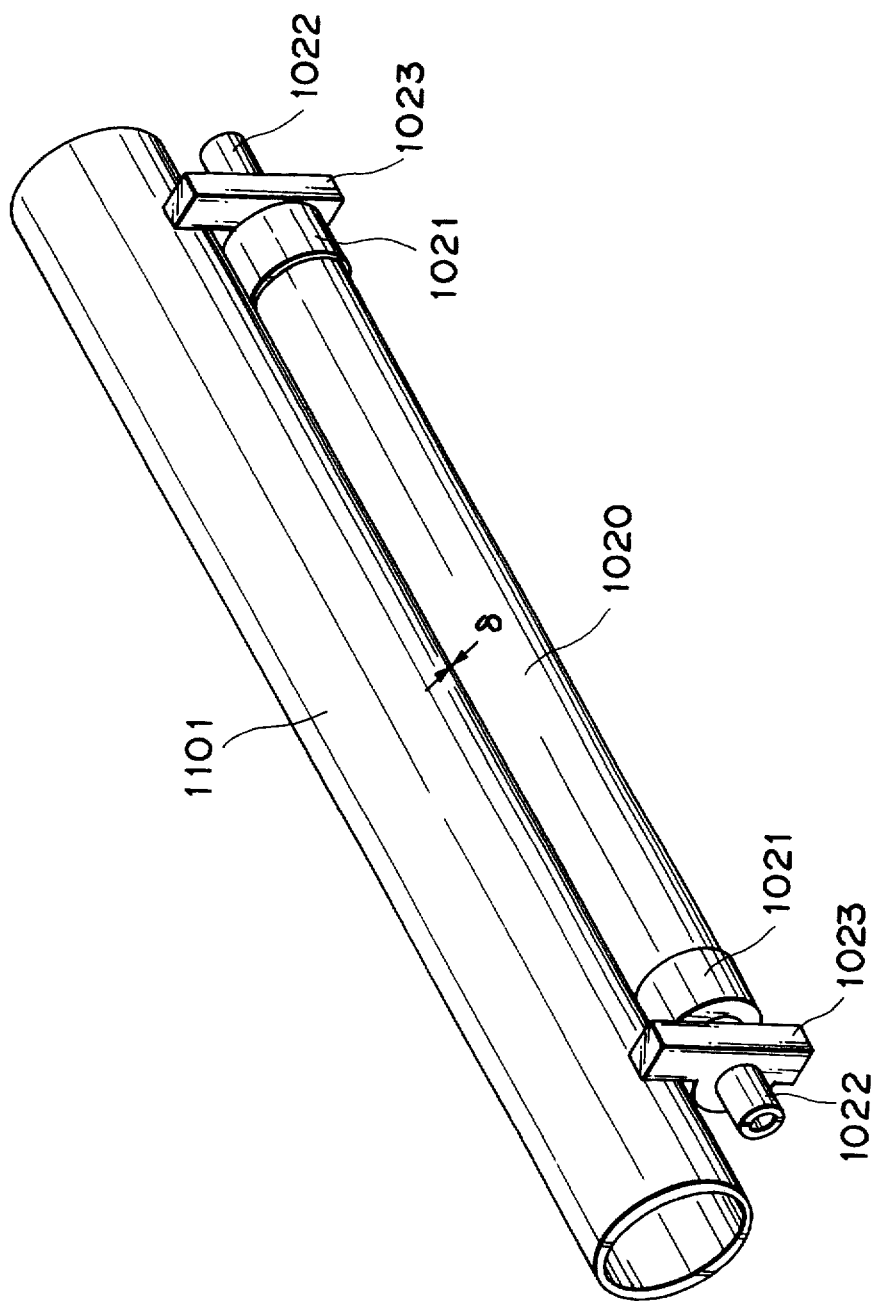
FIG. 37 is a perspective view of a developing sleeve and a photosensitive drum in FIG. 35.
Figure 38:
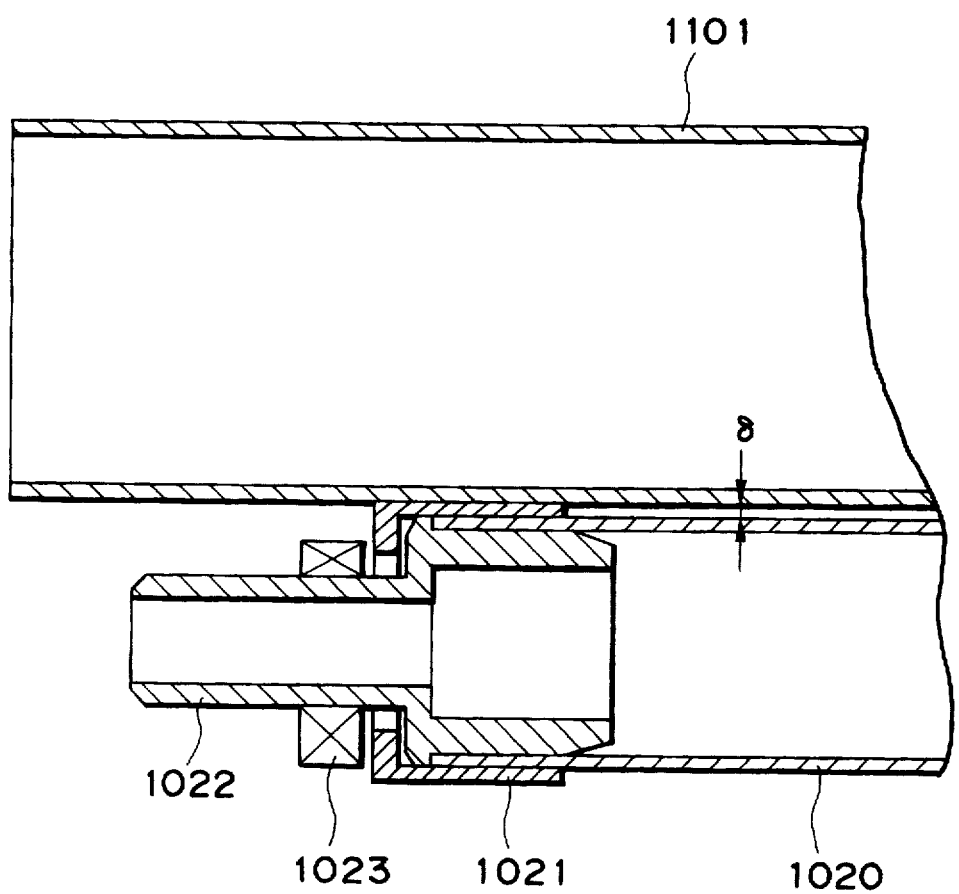
FIG. 38 is a sectional view of the end portion of the developing sleeve in FIG. 35.

FIG. 37 is a perspective view showing the positional relationship between the developing sleeve 1020 and the photosensitive drum 1101. FIG. 38 is a sectional view of an end portion of the developing sleeve 1020 which is not to be driven.

As in FIG. 37, flange members 1022 at the two ends of the developing sleeve 1020 are axially supported to be rotatable by slide bearings 1023. Also, spacer rollers 1021 are rotatably fitted on the end portions of the developing sleeve 1020 in order to keep the distance, δ, between the surface of the photosensitive drum 1101 and the surface of the developing sleeve 1020 constant. These spacer rollers 1021 are made from a resin material with a high slidability, and the outer diameter of the rollers is set to be larger than the outer diameter of the developing sleeve 1020 by an amount (2δ) twice as large as the distance δ. Accordingly, as illustrated in FIG. 38, by making the spacer roller 1021 abut against the circumferential surface of the photosensitive drum 1101, the distance δ between the surface of the photosensitive drum 1101 and the surface of the developing sleeve 1020 is kept constant.

Figure 39:
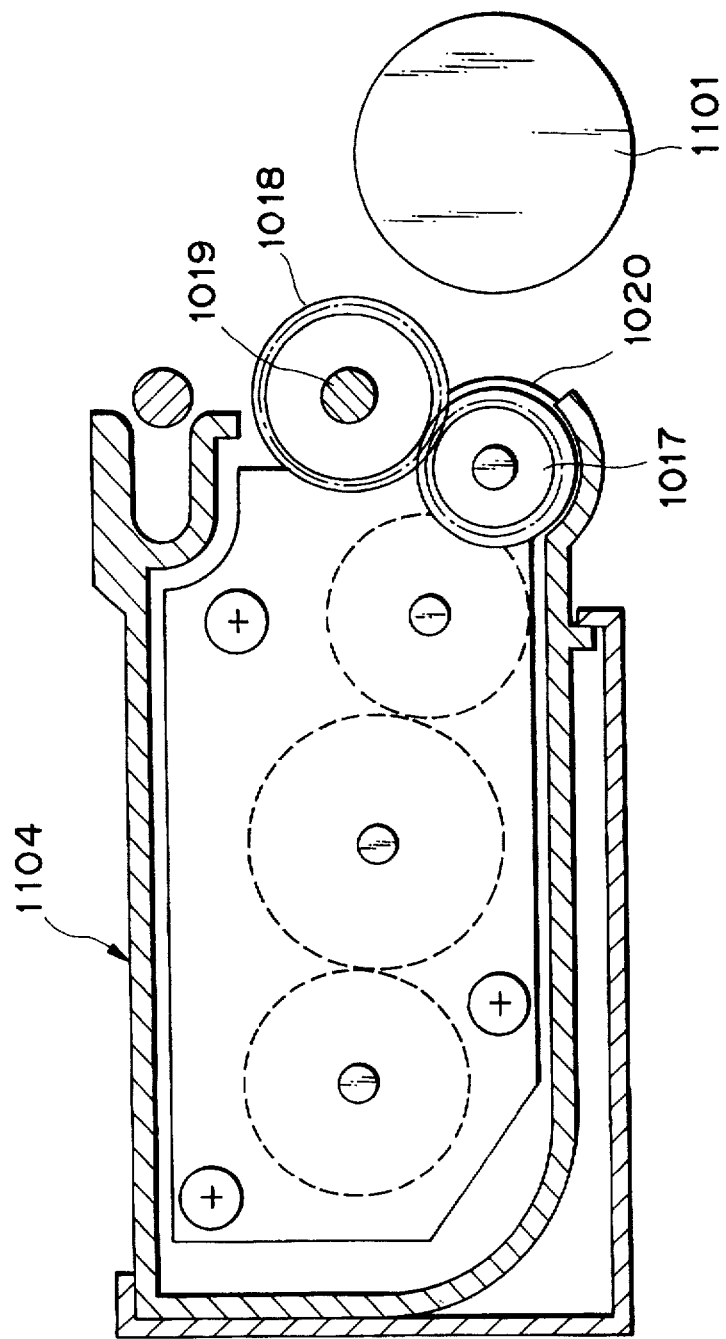
FIG. 39 is a side view of a driving mechanism of the developing sleeve in FIG. 35.
Figure 40:
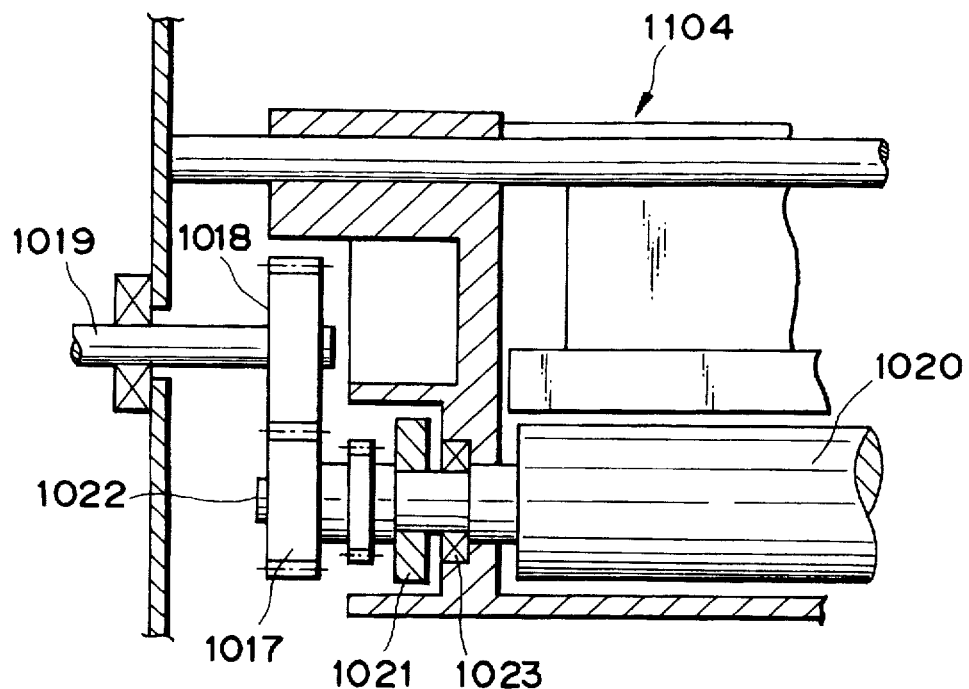
FIG. 40 is a sectional view showing the main parts of the driving mechanism of the developing sleeve in FIG. 35.

FIG. 39 is a side view of the developing means 1104, and FIG. 40 is a sectional view of an end portion of the developing sleeve 1020 on the driving shaft side.

In FIGS. 39 and 40, a driving gear 1017 is attached to the flange member 1022 on the driving shaft side, and a driving gear 1018 of a driving shaft 1019 of the apparatus main body selectively meshes with this driving gear 1017. In this way the developing sleeve 1020 is rotated.

Figure 41:
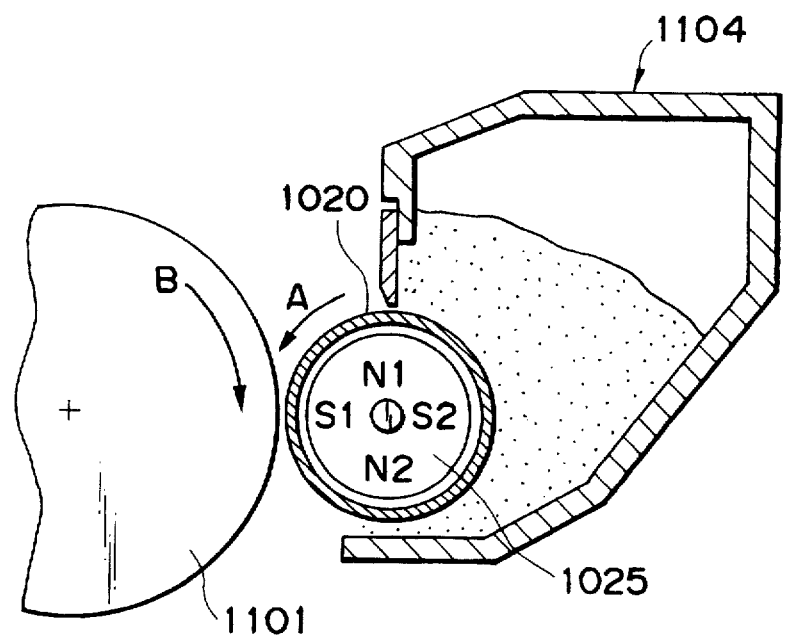
FIG. 41 is a side view for explaining the positional relationship between the developing sleeve and the photosensitive drum in FIG. 35.
Figure 42:
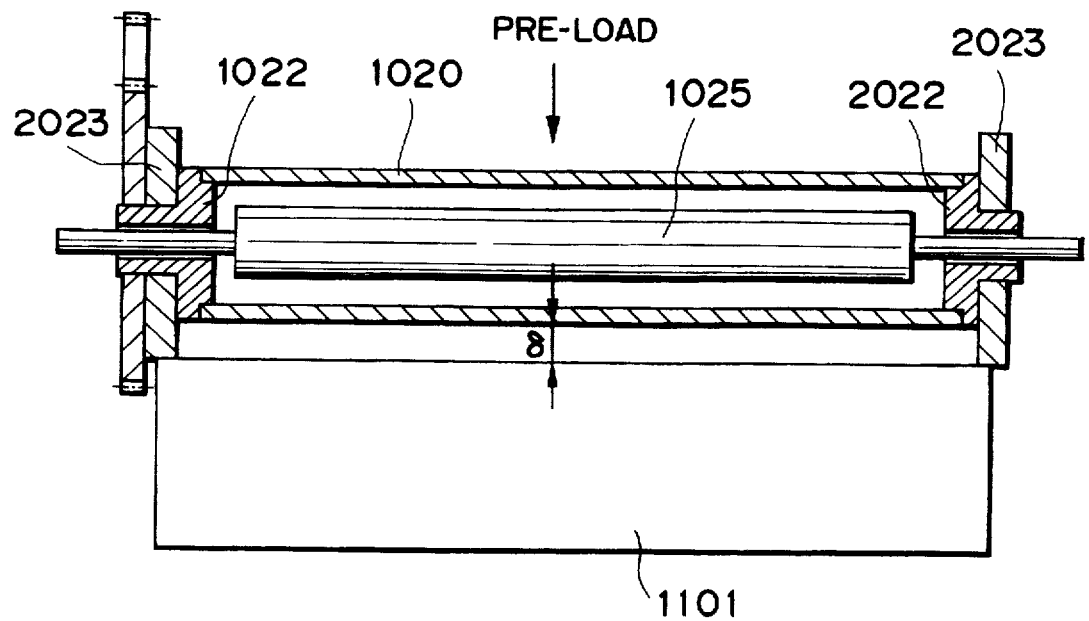
FIG. 42 is a sectional view for explaining one example of conventional developing sleeves.
Figure 43A:
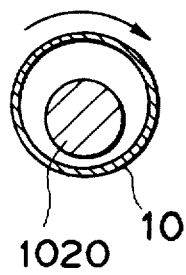
FIGS. 43A to 43D are sectional views for explaining the rotation of the conventional developing sleeve.
Figure 43B:
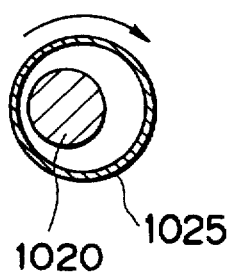
Figure 43C:
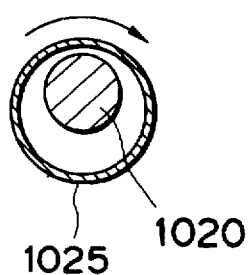
Figure 43D:
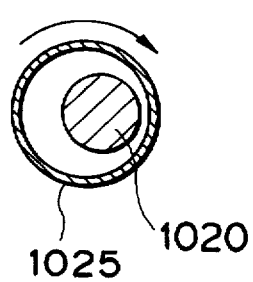
Figure 44:
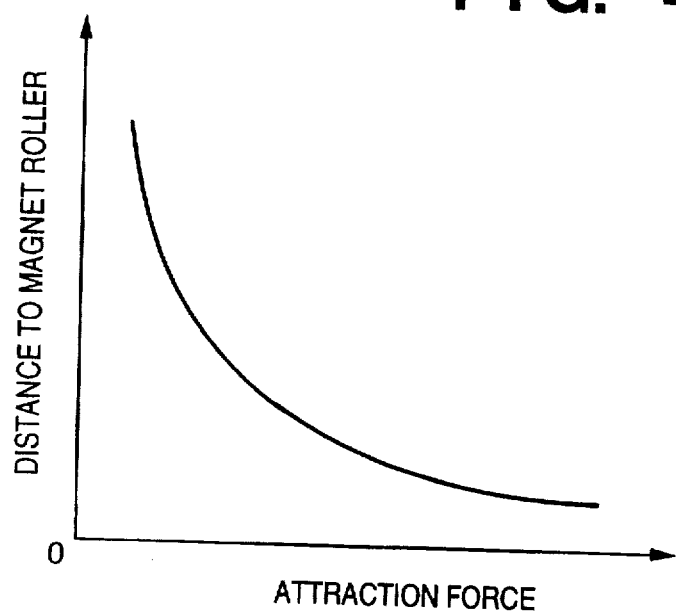
FIG. 44 is a graph for explaining the relationship between the distance from a developing sleeve to an internal magnet roller and the toner attraction force of the magnet roller.

FIG. 41 is a sectional view in which a magnet roller 1025 is included in the developing sleeve 1020. In FIG. 41, the developing sleeve 1020 is rotated in a direction indicated by an arrow A outside the magnet roller 1025 which is held fixed. The photosensitive drum 1101 is rotated in a direction indicated by an arrow B.

[Developing Sleeve Manufacturing Apparatus]
(First Embodiment)

Figure 1:
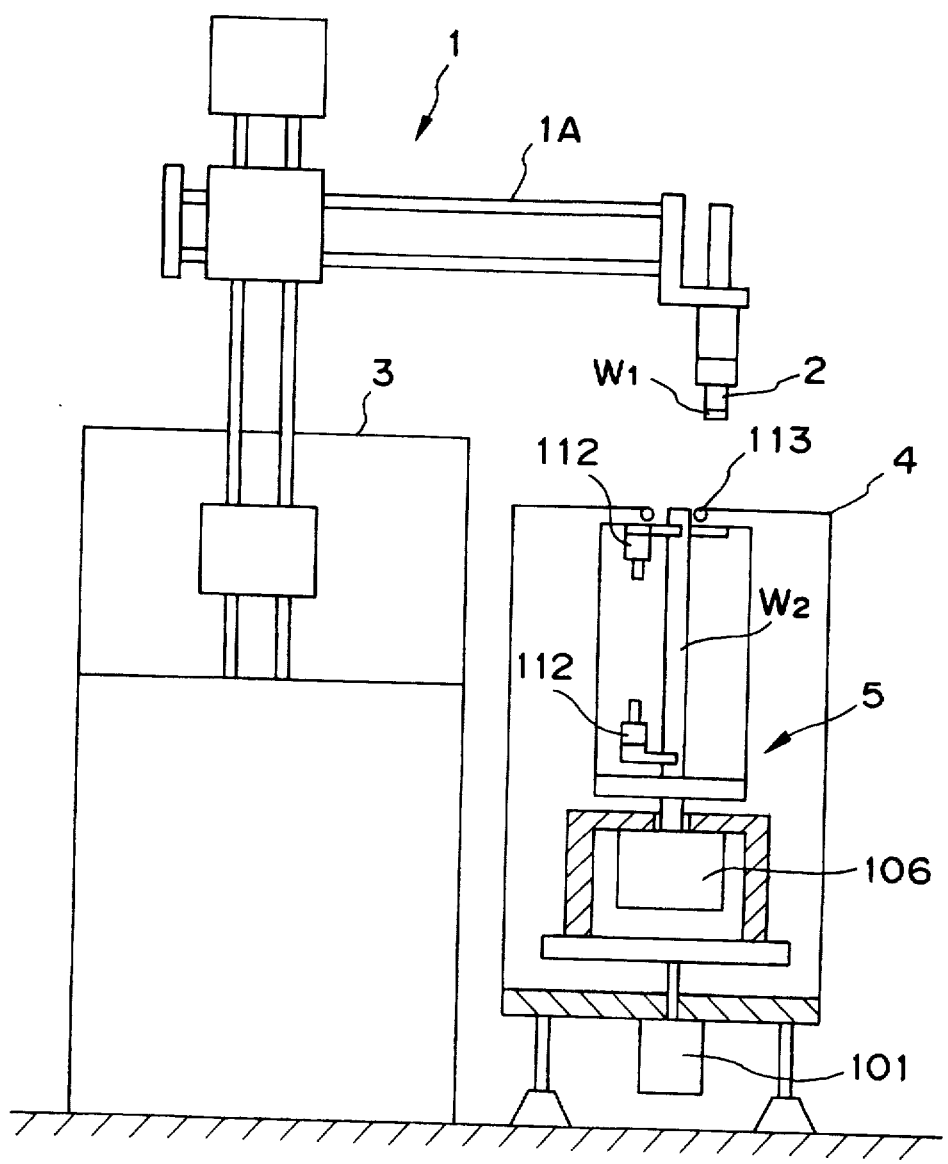
FIG. 1 is a side view showing the first embodiment of a developing sleeve manufacturing apparatus according to the present invention.
Figure 2:
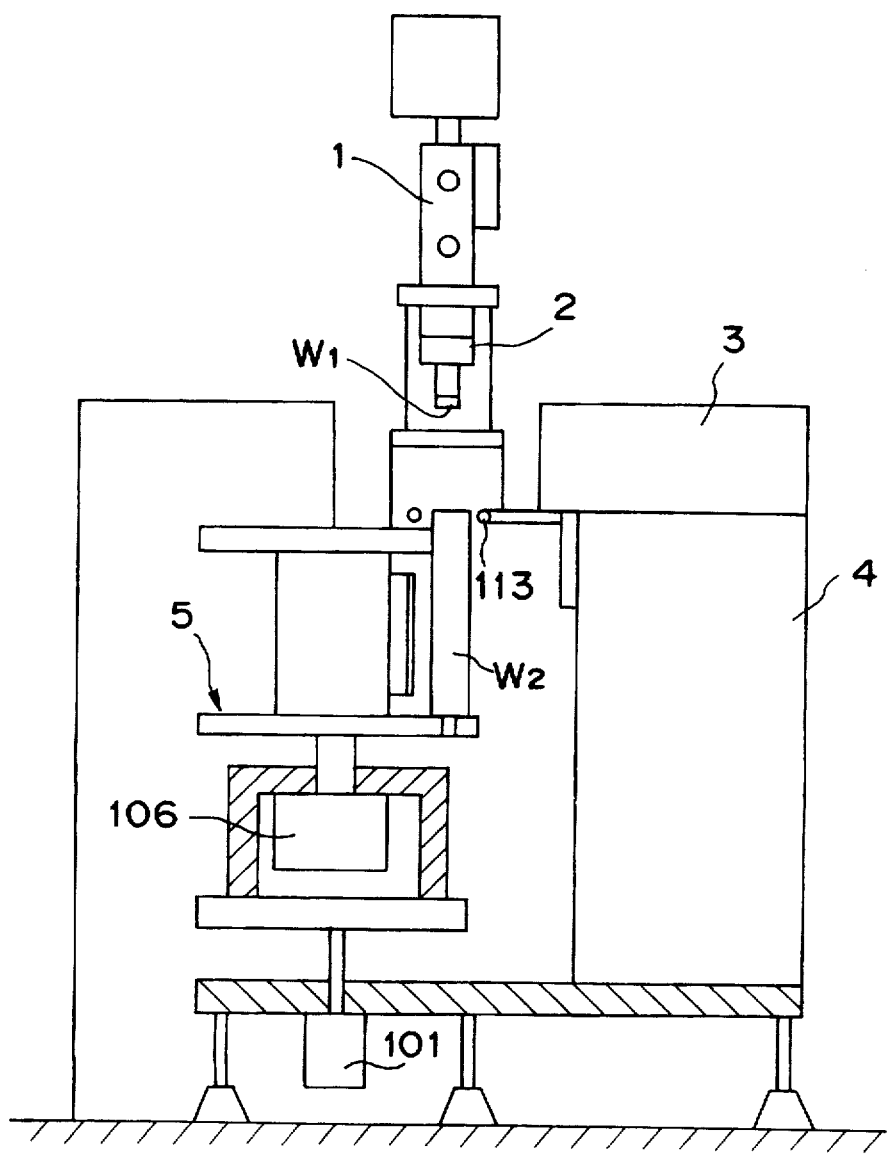
FIG. 2 is a front view of the manufacturing apparatus in FIG. 1.
Figure 3:
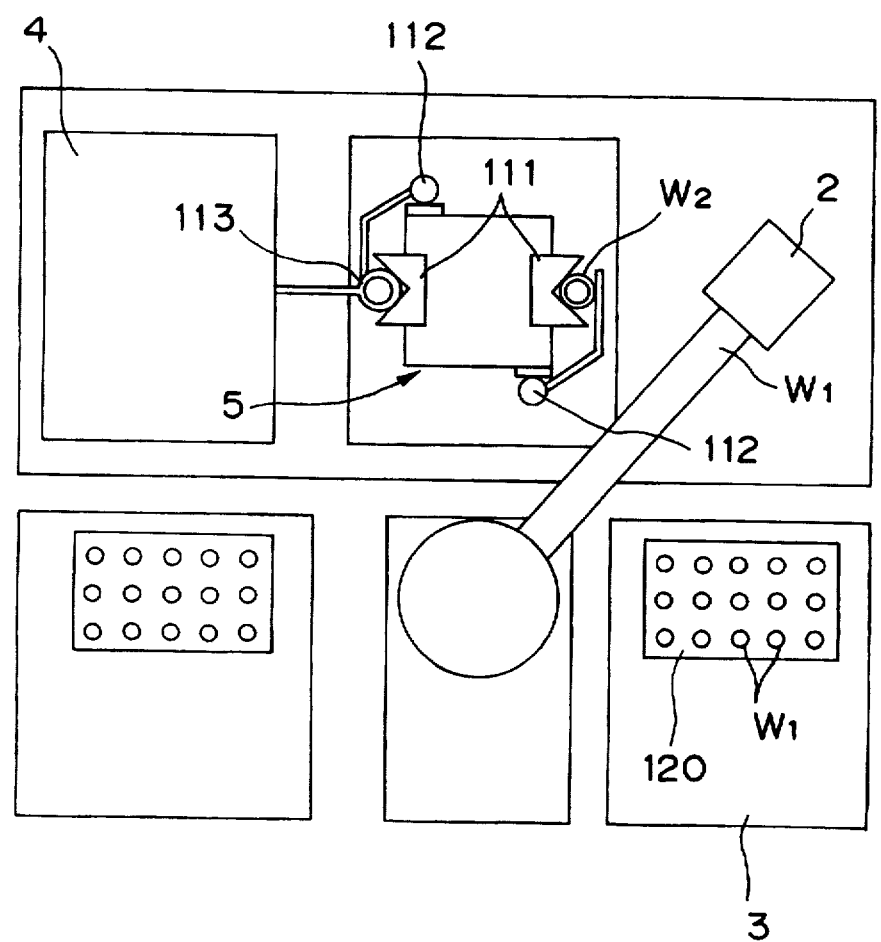
FIG. 3 is a plan view of the manufacturing apparatus in FIG. 1.

FIG. 1 is a side view of an apparatus for manufacturing a developing sleeve as a cylindrical body, FIG. 2 is a front view of the manufacturing apparatus, and FIG. 3 is a plan view of the apparatus. In the following description, a cylindrical member as a main component of the developing sleeve described above will be referred to as a sleeve W2, and a flange member will be referred to as a flange W1.

In FIGS. 1 to 3, reference numeral 1 denotes an NC assembling robot; 2, a robot hand; 3, a stocker for supplying the flange W1 which is processed with a high accuracy; 4, a radio-frequency heating device for heating an end portion of the sleeve W2 which is also processed with a high accuracy; and 5, a turntable for loading and unloading the sleeve W to and from a conveyor line (not shown).

Figure 4:
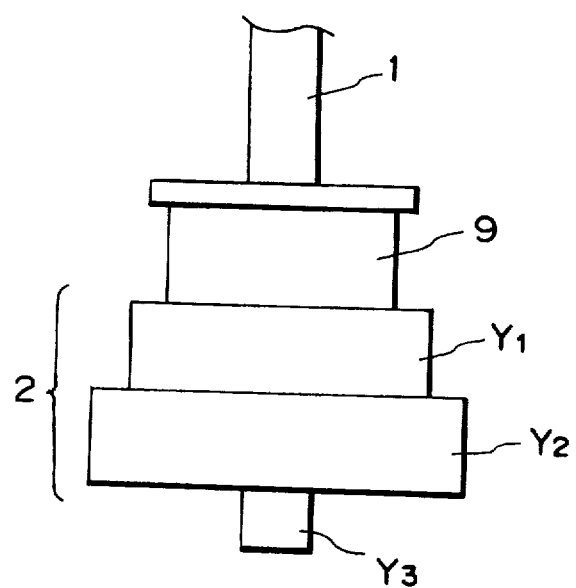
FIG. 4 is a schematic view of the arrangement of a robot hand in FIG. 1.

FIG. 4 shows a schematic arrangement of the robot hand 2. The robot hand 2 consists of a horizontal compliance unit (aligning unit) Y1, a horizontal angle adjusting unit Y2, and a flange holding unit Y3. The robot hand 2 is attached to an arm 1A of the robot 1 via a cushion unit 9.

Figure 5:
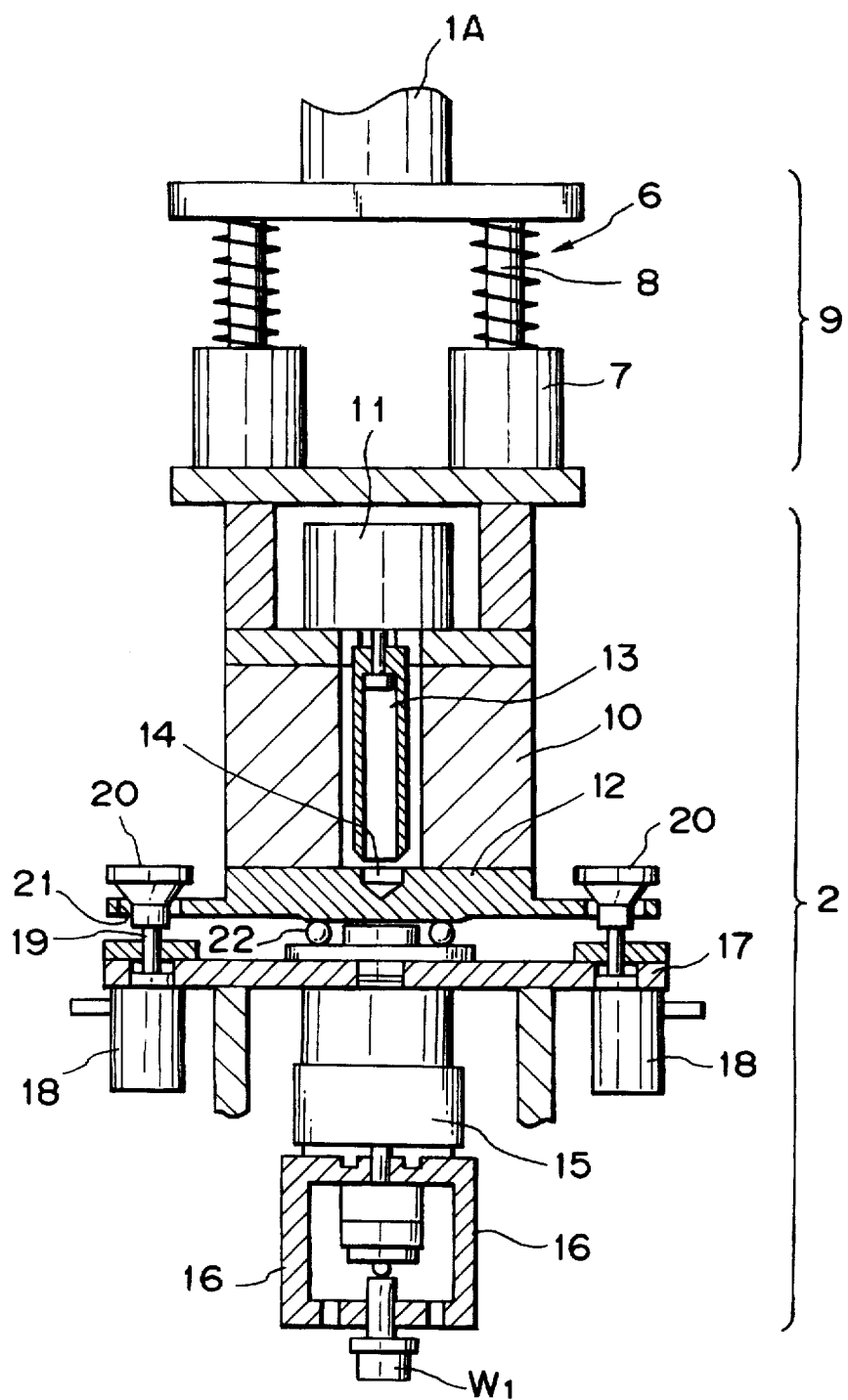
FIG. 5 is a sectional view of the robot hand in FIG. 1.
Figure 6:
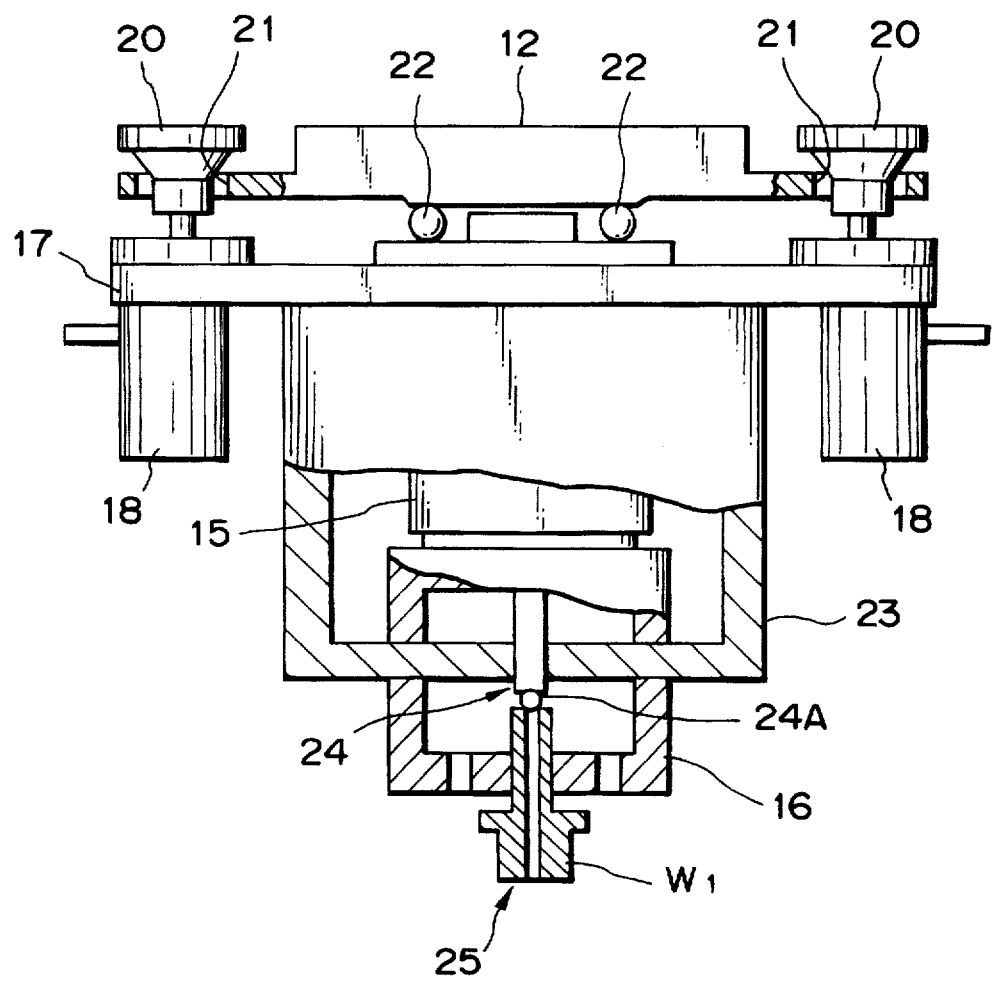
FIG. 6 is an enlarged sectional view of the end portion of the robot hand in FIG. 5.

FIG. 5 is a sectional view of the overall robot hand 2, and FIG. 6 is an enlarged sectional view of the lower portion of the robot hand 2.

Figure 7A:
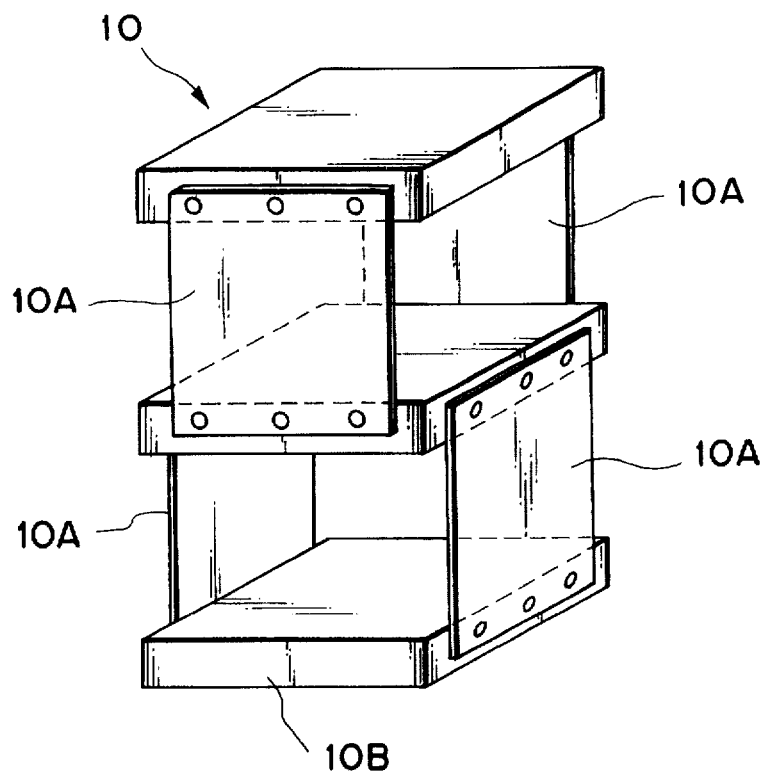
FIGS. 7A and 7B are schematic views of the arrangement of a cushion unit in FIG. 4.
Figure 7B:
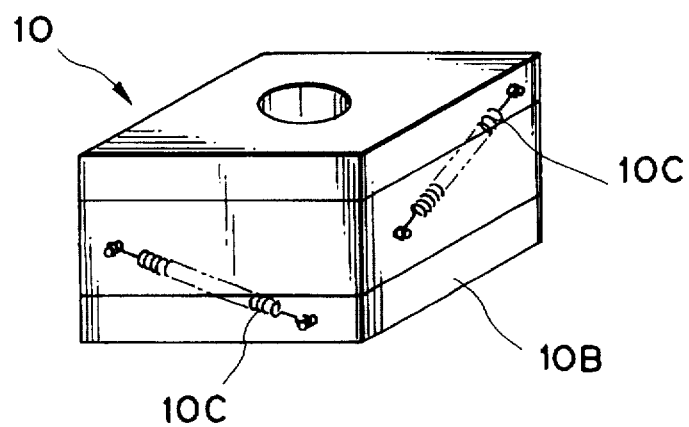

Referring to FIG. 5, in the cushion unit 9 linear slide members 7 biased downward by springs 6 are guided to be vertically slidable by rods 8 which depend from the arm 1A of the robot 1. The robot hand 2 is attached to the linear slide members 7 and normally biased downward. Reference numeral 10 denotes a horizontal compliance as the unit Y1. The horizontal compliance 10 permits a horizontal displacement of a horizontal table 10B by using parallel leaf springs 10A, as shown in FIG. 7A, or by using tension springs 10C, as shown in FIG. 7B. The compliance shown in FIG. 7B is preferred when a vertical rigidity is necessary. The centripetal force of the horizontal table 10B resulting from the spring 10A or 10C is preferably 0.1 kg or less.

The horizontal compliance 10 is arranged between a lock cylinder 11 and a lock plate 12. The lock plate 12 corresponds to the horizontal table 10B of the horizontal compliance 10. When supplied with pressurized air through a solenoid valve (not shown), the lock cylinder 11 protrudes a cylinder rod 13 downward and fits the lower end of the rod 13 into a lock hole 14 of the lock plate 12, thereby fixing the lock plate 12, i.e., the horizontal compliance 10. Accordingly, while the robot 1 is operating at a high speed the robot hand 2 can be positioned without being vibrated by fixing the horizontal compliance 10 in this way.

Claws 16 for holding the flange W1 are attached to a parallel hand 15. A parallel hand fixing member 17 fixes the parallel hand 15 and is equipped with a plurality of parallel hand lock cylinders 18. A tapered top 20 is attached to the upper end of each of these parallel hand lock cylinders 18. When supplied with pressurized air through a solenoid valve (not shown), the parallel hand lock cylinders 18 pull down the tapered tops 20 and fit the tapered tops 20 into fitting holes 21 of the lock plate 12. As a result, the parallel hand 15 is pulled up and fixed to the lock plate 12. A thrust bearing 22 is sandwiched between the lock plate 12 and the parallel hand fixing member 17. Accordingly, any tilt of the parallel hand 15 also is corrected by the pull by the parallel hand lock cylinders 18.

As illustrated in FIG. 6, a press support member 23 for inserting the flange W1 into the sleeve W2 and pressing the flange W1 against the sleeve W2 is attached to the parallel hand fixing member 17. This support member 23 is equipped with a screw ball 24 having a rotatable ball 24A. The position of the screw ball 24 nearly agrees with the center of the parallel hand 15 and, when the parallel hand 15 holds the flange W1, agrees with the center of a hole 25 in the flange W1.

In FIGS. 1 to 3, the stocker 3 is a device for supplying the flange W1 to the robot 1. The stocker 3 contains a plurality of stacked pallets 120 shown in FIG. 3, and a large number of flanges W1 are arranged in a matrix manner in each of these pallets 120. An empty pallet 120 from which all flanges W1 are supplied to the robot 1 is automatically discharged, and instead a new pallet 120 packed with flanges W1 is set at the supply position.

Figure 8A:
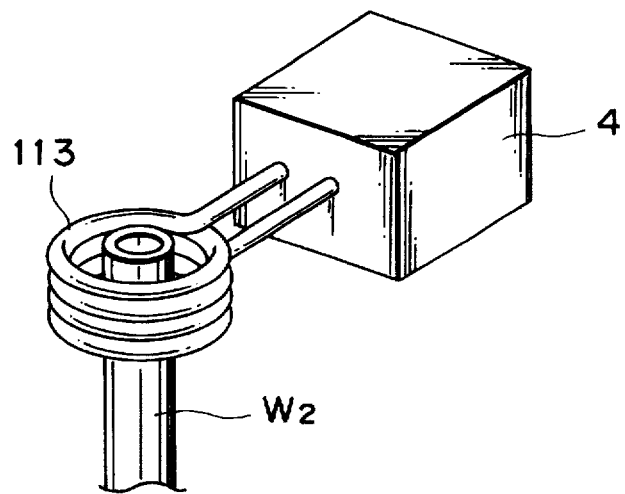
FIGS. 8A to 8C are enlarged views of a radio-frequency heating device in FIG. 1.
Figure 8B:
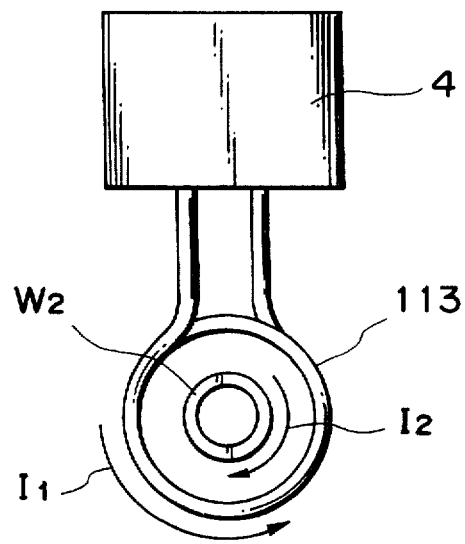
Figure 8C:
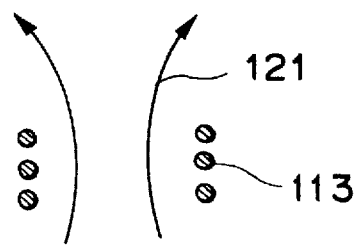

FIGS. 8A to 8C show details of the radio-frequency heating device 4. As will be described later, when the sleeve W2 is placed in a coil 113 of the radio-frequency heating device 4 by the turntable 5, a radio-frequency current Ii is flowed through the coil 113. Consequently, a magnetic field 121 is generated in the coil 113 (FIG. 8C) to generate an induced current I2 in the sleeve W2, and the sleeve W2 self-generates heat. Also, by changing the frequency of the current I1 it is possible to change the heated state from the surface toward the center of the sleeve W2 placed in the coil 113, resulting in a high versatility when the thickness of the sleeve W2 is altered. In this induction heating, a portion applied with the magnetic field self-generates heat. Therefore, compared to the case in which heat is externally applied by conduction, a portion to be heated alone can be heated locally and instantaneously. This results in a high heating efficiency. Additionally, since a portion to be heated can be uniformly heated, this heated portion thermally expands uniformly. This can improve the connection accuracy of shrink fit.

Figure 9:
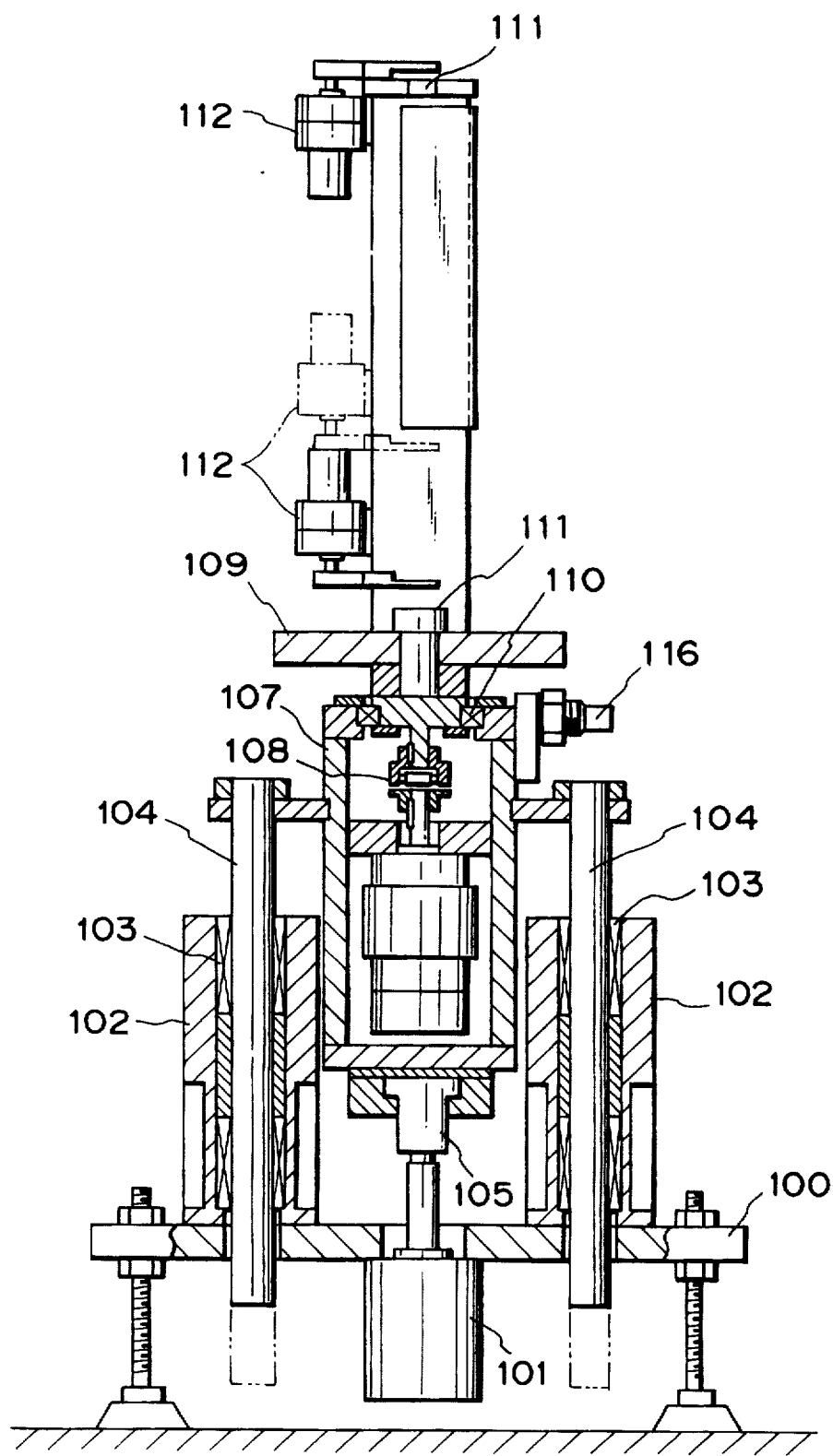
FIG. 9 is a sectional view of a turntable in FIG. 1.
Figure 10:
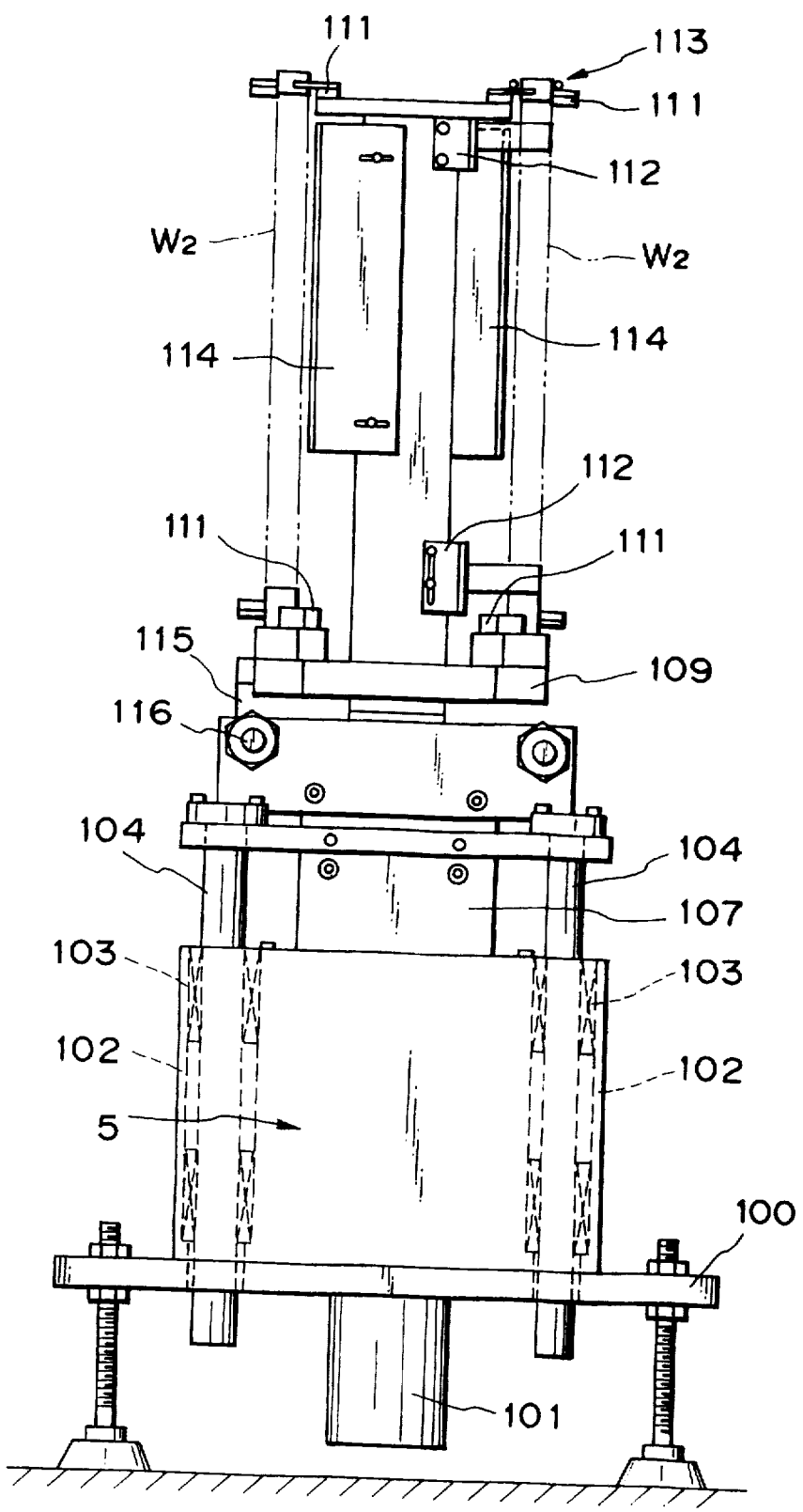
FIG. 10 is a side view of the turntable in FIG. 1.

FIGS. 9 and 10 illustrate details of the turntable 5.

In FIGS. 9 and 10, reference numeral 100 denotes a base plate; 101, a vertical cylinder; and 102, guide blocks. Each guide block 102 incorporates a linear bush 103 for guiding a guide bar 104 to be vertically slidable. A joint member 105 to be joined to the lower portion of a high-rotor block 107 is attached to the upper end of the rod of the vertical cylinder 101. The high-rotor block 107 incorporates a high rotor 106. The high-rotor block 107 is connected to the guide bars 104 and vertically moved with a high accuracy by the vertical cylinder 101. The high rotor 106 is coupled with a turntable base 109 via a coupling 108. The turntable base 109 is supported by a cross roller bearing 110, and so the rotation of the high rotor 106 is accurately transmitted to the turntable base 109.

On the turntable base 109, receivers 111 (FIG. 3) having a V sectional shape and rotary cylinders 112 are arranged. The receiver 111 is used to position the sleeve W2, and the rotary cylinder 112 presses and fixes the sleeve W2 to the receiver 111. In accordance with the operation of the rotary cylinder 112, the sleeve W2 can be positioned and loaded/unloaded.

Referring to FIG. 10, the sleeve W2 which is positioned and held by the receiver 111 and the rotary cylinder 112 is vertically moved together with the turntable base 109 by the vertical cylinder 101, and consequently the upper end of the sleeve W2 is located in the coil 113 of the radio-frequency heating device 4. In FIG. 10, reference numerals 114 denote magnetic plates made from, e.g., iron. When a magnet roller W3 is inserted into the sleeve W2 and the flange W1 is connected as will be described later, the magnetic plates 114 attract and position the magnet roller W3 to one side in the sleeve W2.

The turntable base 109 is rotated by the high rotor 106. The position of the turntable base 109 in the direction of rotation is regulated when a stopper 115 (FIG. 10) attached to the turntable base 109 abuts against a rotation positioning shock absorber 116 (FIG. 10) fixed to the high-rotor block 107.

Figure 11:
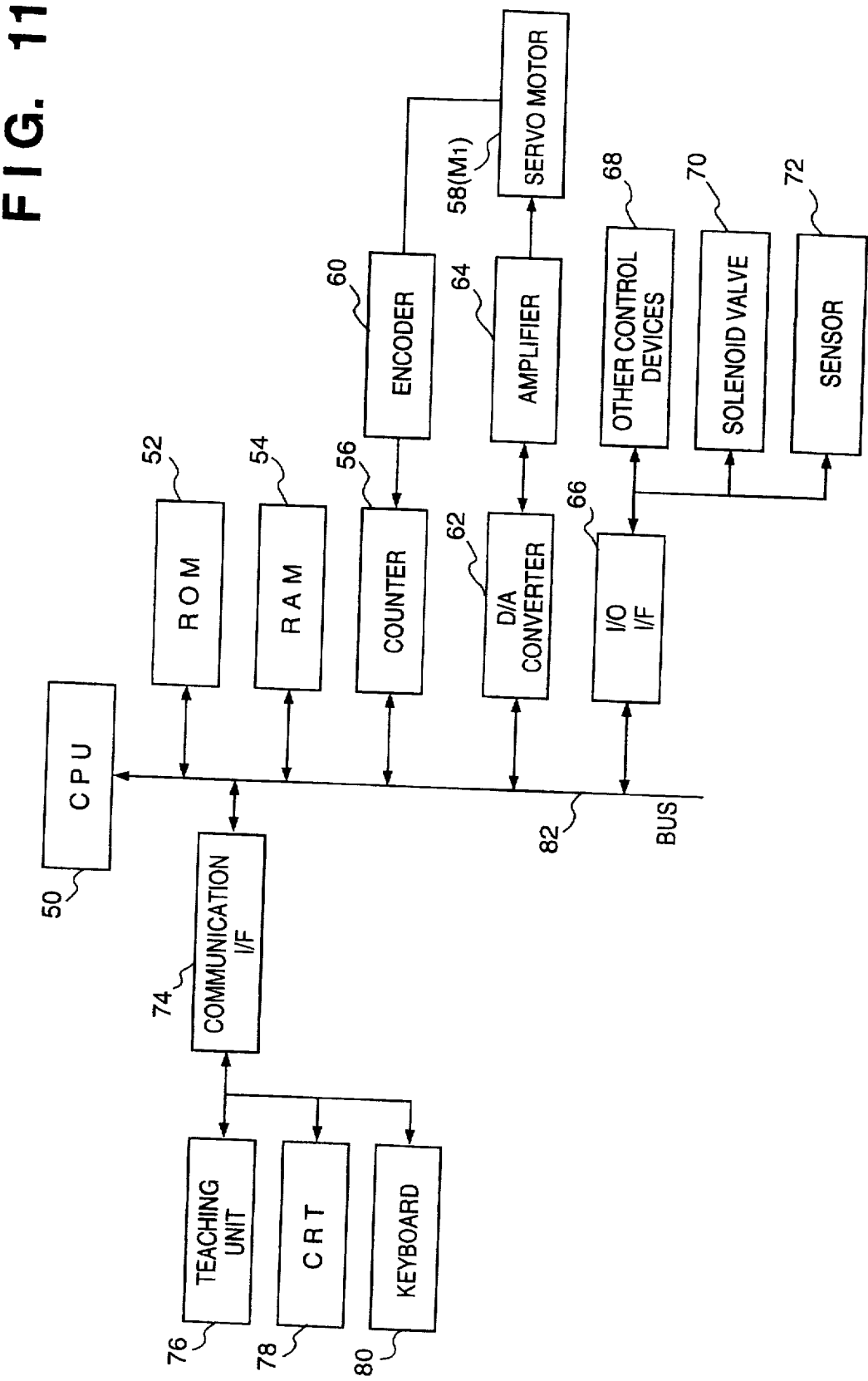
FIG. 11 is a block diagram of a control system of the manufacturing apparatus in FIG. 1.

FIG. 11 is a block diagram of a control system of this manufacturing apparatus.

In FIG. 11, reference numeral 50 denotes a central processing unit (CPU); 52, a nonvolatile memory (ROM) connected to the CPU 50 through a bus and including programs of a series of control algorithms and man-machine interface programs; and 54, a memory (RAM) capable of storing teaching data and backed up by a battery. A counter 56 is connected to an encoder 60 which is connected to a servo motor 58 for driving the robot 1, and performs counting to detect the present position of the servo motor 58. A D/A converter 62 is connected to the servo motor 58 via a torque amplifier 64 and outputs a current instruction to the torque amplifier 64 under the control of the CPU 50. An I/O interface 66 supplies information from, e.g., other control devices 68, such as the radio-frequency heating device 4, a solenoid valve 70, and a sensor 72 to the CPU 50. A communication interface 74 connects an external teaching unit 76, a display device 78, and an input keyboard 80 to the CPU 50. The ROM 52, the RAM 54, the counter 56, the converter 62, and the interfaces 66 and 74 are connected to the CPU 50 through a bus 82.

Figure 12A:
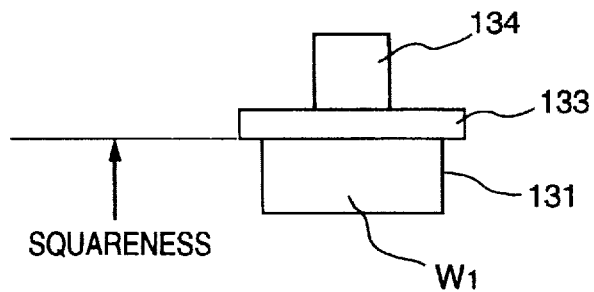
FIGS. 12A and 12B are side views of a flange and a sleeve connected by the manufacturing apparatus in FIG. 1.
Figure 12B:
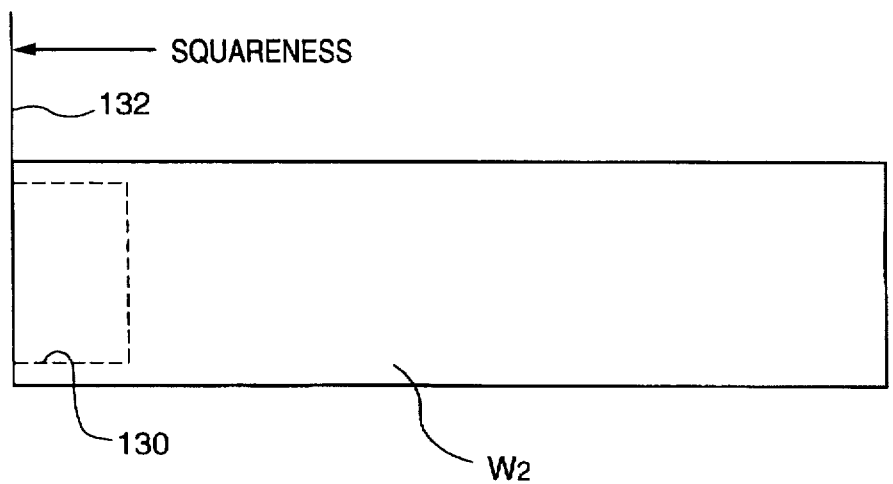

FIG. 12A is a side view of the flange W1, and FIG. 12B is a side view of the sleeve W2.

Figure 13A:
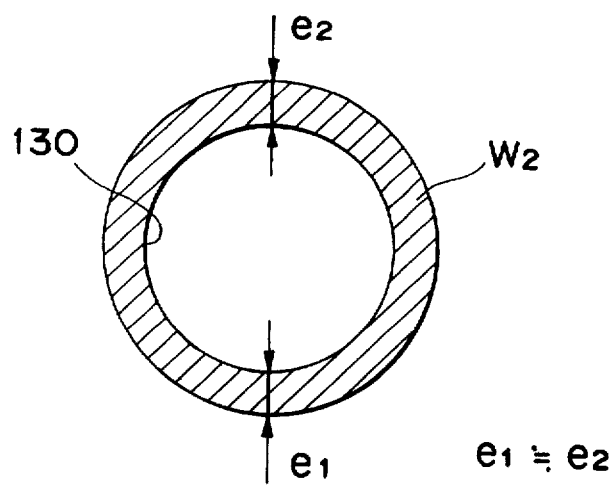
FIGS. 13A and 13B are sectional views for explaining the sectional shape of the sleeve in FIGS. 12A and 12B.
Figure 13B:
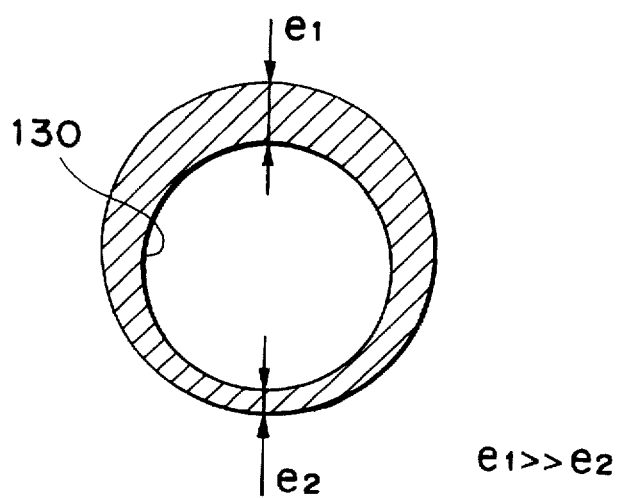

In the flange W1, a connecting portion 131 to be connected to a processed hole 130 in the end of the sleeve W2, and a projecting portion 134 at the end of the flange W1 are so processed as to have a highly accurate roundness of 2 $\mu$m and a highly accurate coaxiality of 3 $\mu$m. Also, an outer peripheral portion 133 to be made contact with an end face 132 of the sleeve W2 is so processed as to have a highly accurate squareness with respect to the connecting portion 131. Inner-diameter processing is performed for the end portion of the sleeve W2, and the coaxiality between the inner-diameter processed hole 130 and the outer diameter of the sleeve W2 has a high accuracy. Therefore, the thickness deviation as shown in FIG. 13B is small, i.e., the thickness deviation is even as in FIG. 13A. The thickness deviation is preferably 10 $\mu$m or smaller. Also, the inner-diameter processed hole 130 and the end face 132 of the sleeve W2 are so processed as to have a highly accurate squareness.

Accordingly, by connecting the flange W1 and the sleeve W2 without scoring the processed surfaces of these members and making the outer peripheral portion 133 of the flange W1 abut against the end face 132 of the sleeve W2, it is possible to highly accurately determine the coaxiality of the projecting portion 134 of the flange W1 with respect to the two end portions of the sleeve W2.

The operation of connecting the flange W1 and the sleeve W2 will be described below.

Figure 14:
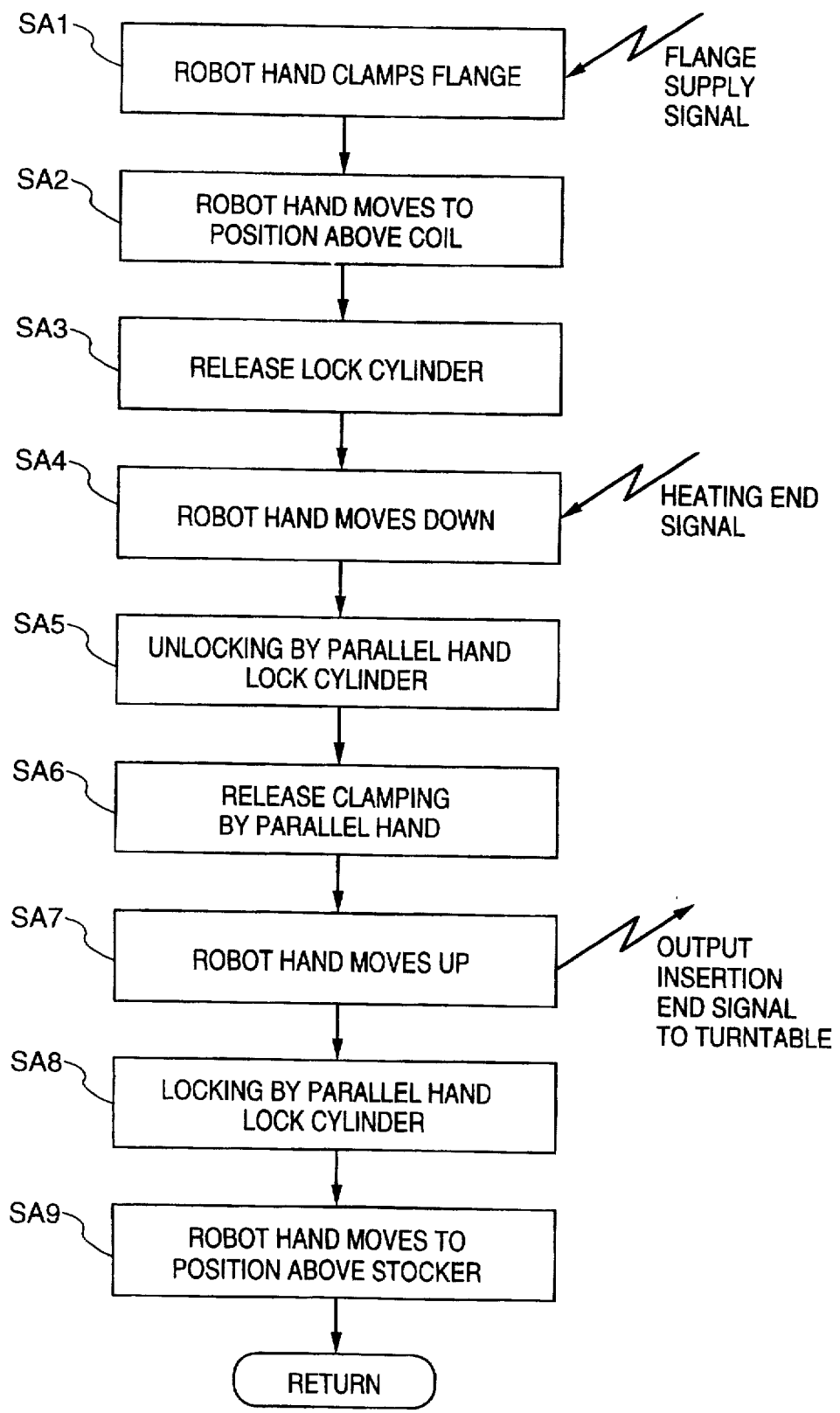
FIG. 14 is a flow chart for explaining the operation of the robot hand of the manufacturing apparatus in FIG. 1.
Figure 15:
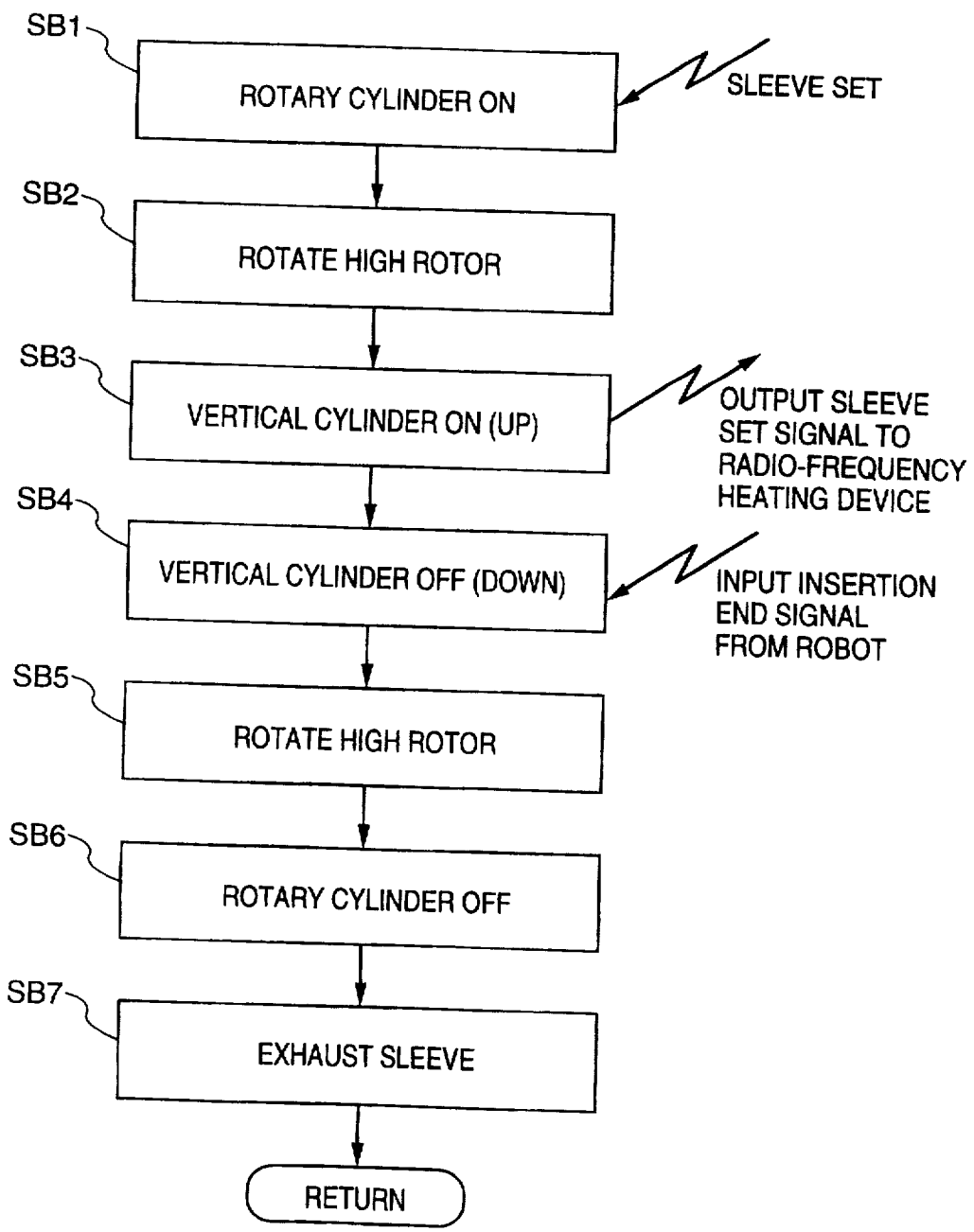
FIG. 15 is a flow chart for explaining the operation of the turntable of the manufacturing apparatus in FIG. 1.

FIG. 14 is a flow chart for explaining the operation of the robot 1, and FIG. 15 is a flow chart for explaining the operation of the turntable 5.

First, when the flange W1 is set in the supply position on the stocker 3, the arm 1A of the robot 1 rotates and the claws 16 of the robot hand 2 clamp the flange W1 (step SA1). The robot hand 2 then moves to a position above the coil 113 of the radio-frequency heating device 4 (step SA2), releases locking of the lock plate 12 by the lock cylinder 11, and stands by (step SA3).

Figure 16:
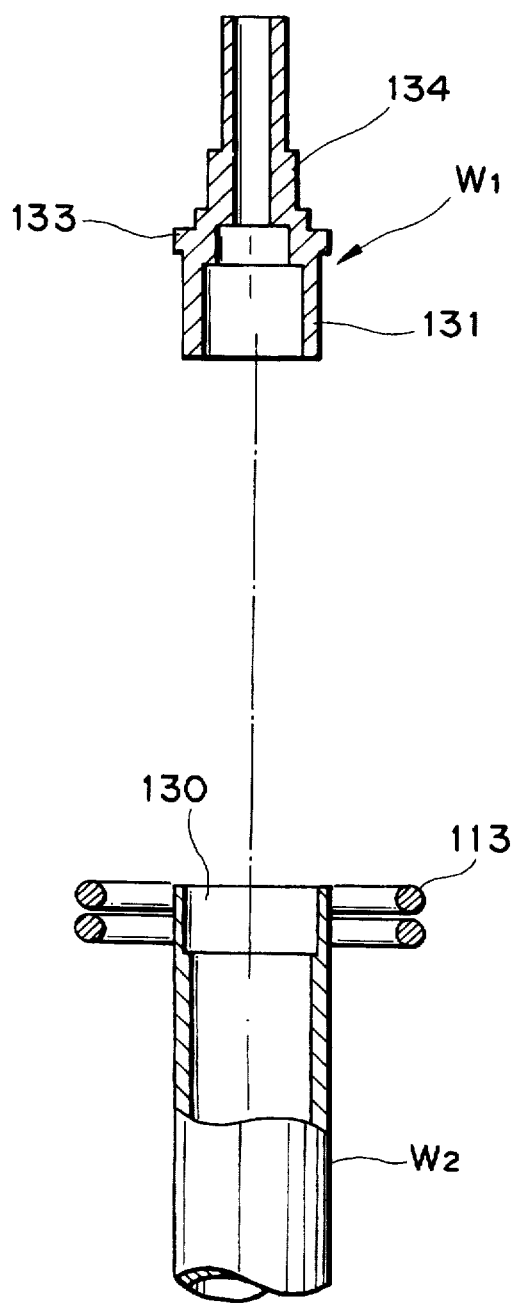
FIG. 16 is a sectional view of a sleeve and a flange connected by the manufacturing apparatus in FIG. 1.

On the other hand, when the sleeve W2 is set on the turntable 5, the rotary cylinder 112 urges the sleeve W2 against the V-shaped receiver 111 and thereby positions the sleeve W2 (step SB1). Thereafter, the high rotor 106 rotates the sleeve W2 together with the turntable base 109 (step SB2), and the stopper 115 abuts against the shock absorber 116. When these members abut, the sleeve W2 is positioned below the coil 113. The vertical cylinder 101 is then turned on to move the turntable base 109 and the high-rotor block 107 upward, thereby positioning the upper end of the sleeve W2 inside the coil 113 as illustrated in FIG. 16 (step SB3). After the sleeve W2 is thus positioned, a driving signal is supplied to the radio-frequency heating device 4, and thereby the coil 113 is applied with power and starts heating. Consequently, the opening portion of the sleeve W2, i.e., the inner-diameter processed hole 130 in the upper end of the sleeve W2 self-generates heat due to an induced current. As a result, the inner-diameter processed hole 130 increases its diameter by thermal expansion.

Figure 17:
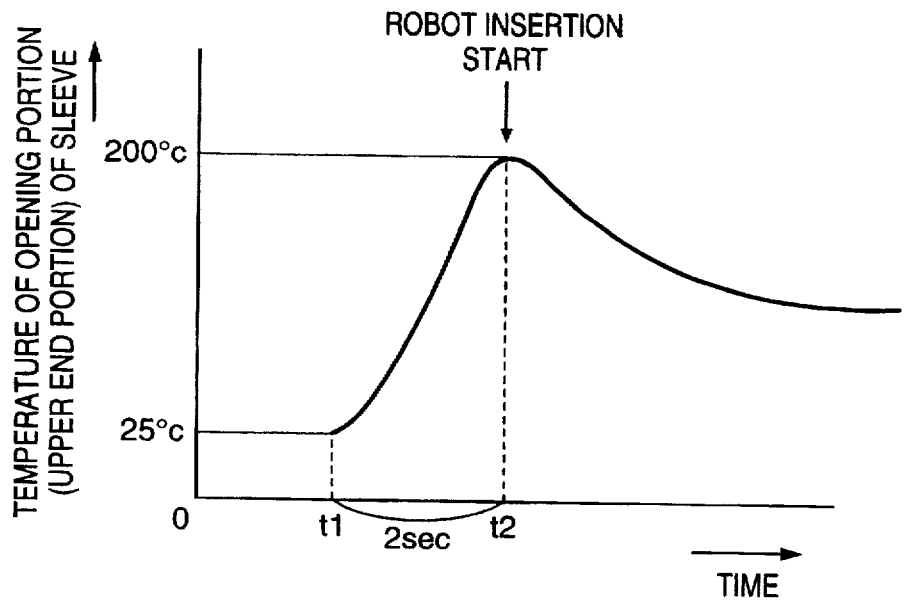
FIG. 17 is a graph for explaining the relationship between the heating time and the temperature of a sleeve in the manufacturing apparatus in FIG. 1.
Figure 18:
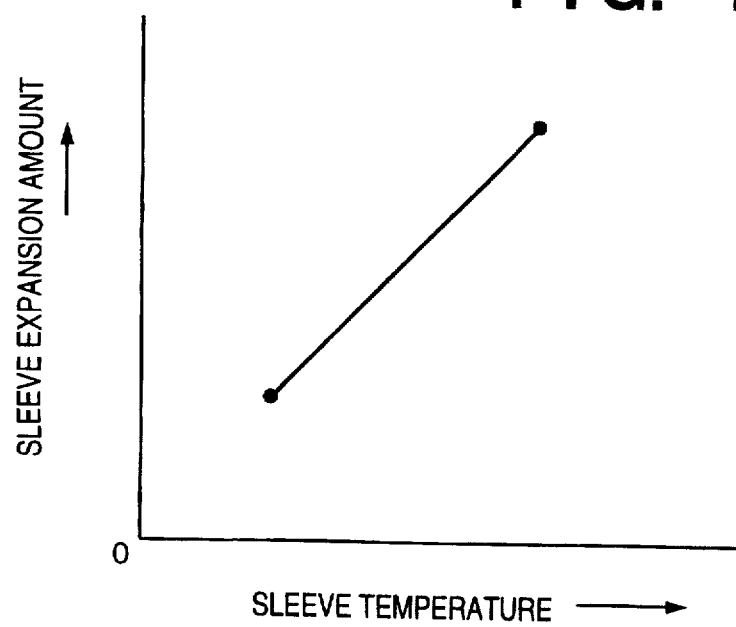
FIG. 18 is a graph for explaining the relationship between the temperature and the expansion amount of a sleeve heated by the manufacturing apparatus in FIG. 1.

FIG. 17 shows a temperature change when the upper end portion of the sleeve W2 is heated from time t1. FIG. 18 shows the relationship between the temperature and the expansion amount of the sleeve W2.

Since the diameter of the inner-diameter processed hole 130 of the sleeve W2 increases, the relationship between the inner-diameter processed hole 130 and the connecting portion 130 of the flange W1 changes from close fit to clearance fit. Accordingly, the connecting portion 131 can be inserted into the inner-diameter processed hole 130 with a clearance between them as will be described below.

After the heating of the sleeve W2 is completed, the supply of power to the coil 113 is stopped, and the radio-frequency heating device 4 supplies a heating end signal to the robot 1 to thereby move the robot hand 2 downward (step SA4). Consequently, the flange W1 clamped by the claws 16 is gradually inserted into the inner-diameter processed hole 130 of the sleeve W2. After the outer peripheral portion of the flange W1 abuts against the end face 132 of the sleeve W2, the flange W1 is urged by the force of the springs 6 in the cushion unit 9.

If there is a difference between the central axes of the sleeve W2 and the flange W1 when the flange W1 is inserted into the sleeve W2, and if the difference is within an amount corresponding to chamfers of these members, this difference is absorbed by the horizontal compliance 10. Consequently, the connecting portion 131 of the flange W1 is smoothly inserted into the inner-diameter processed hole 130 of the sleeve W2. Also, as shown in FIG. 19A, when the insertion of the flange W1 is started the parallel hand lock cylinders 18 fit and fix the tapered tops 20 into the fitting holes 21. After the flange W1 is inserted, as illustrated in FIG. 19B, the parallel hand lock cylinders 18 immediately perform an unlocking operation (step SA5), thereby permitting a relative displacement between the lock plate 12 and the parallel hand fixing member 17. Additionally, the parallel hand 15 releases the flange W1 from clamping (step SA6), thereby removing the flange W1 from the claws 16. As a consequence, the flange W1 is urged downward by force F of the springs 6 of the cushion unit 9, and this urging force F divides into vertical force F1 and horizontal force F2 from the ball 24A as a supporting point.

By the parallel hand unlocking (step SA5) and the parallel clamp release (step SA6) in this robot hand 2, the flange W1 is urged against the end face 132 of the sleeve W2 and thereby the position of the flange W1 is regulated. Simultaneously, the temperature of the flange W1 at room temperature rapidly approaches the temperature of the end portion of the sleeve W2, completing the connecting operation. In this manner a high-accuracy connection is accomplished in accordance with the processing accuracy of the flange W1 and the sleeve W2.

After the connection is thus completed, the robot hand 2 rises (step SA7), and the parallel hand lock cylinders 18 lock the lock plate 12 and the parallel hand fixing member 17. At the same time, an insertion end signal indicating the end of insertion of the flange W1 is supplied to the turntable 5, and the turntable 5 moves down by turning off the vertical cylinder 101 (step SB4). After the high rotor 106 rotates to a discharge station for the sleeve W2 (step SB5), the rotary cylinder 112 is turned off to release the sleeve W2 (step SB6) and exhaust the sleeve W2 (step SB7). On the other hand, after the lock cylinder 11 locks the horizontal compliance 10, the robot hand 2 rapidly moves onto the stocker 3 to clamp the next flange W1 (step SA9).

Note that the heating device 4 is not limited to a radio-frequency heating device. For example, it is possible to use a device which generates heat by using a cartridge heater, a halogen lamp, or a xenon lamp.

Note also that in the apparatus for manufacturing the developing sleeve for use in a laser beam printer as in this embodiment, in order that the coaxiality of the flange W1 with respect to the outer diameter of the sleeve W2 after these members are connected be 15 µm or smaller, the material of the sleeve W2 and the flange W1 need only be a metal, such as Al or Fe, which can be shrink-fitted. In addition to the laser beam printer developing sleeve, the present invention is applicable to assembly of an 8-mm VTR drum requiring a high-accuracy assembly and to a polygon mirror manufacturing apparatus.

(Second Embodiment)

Figure 20:
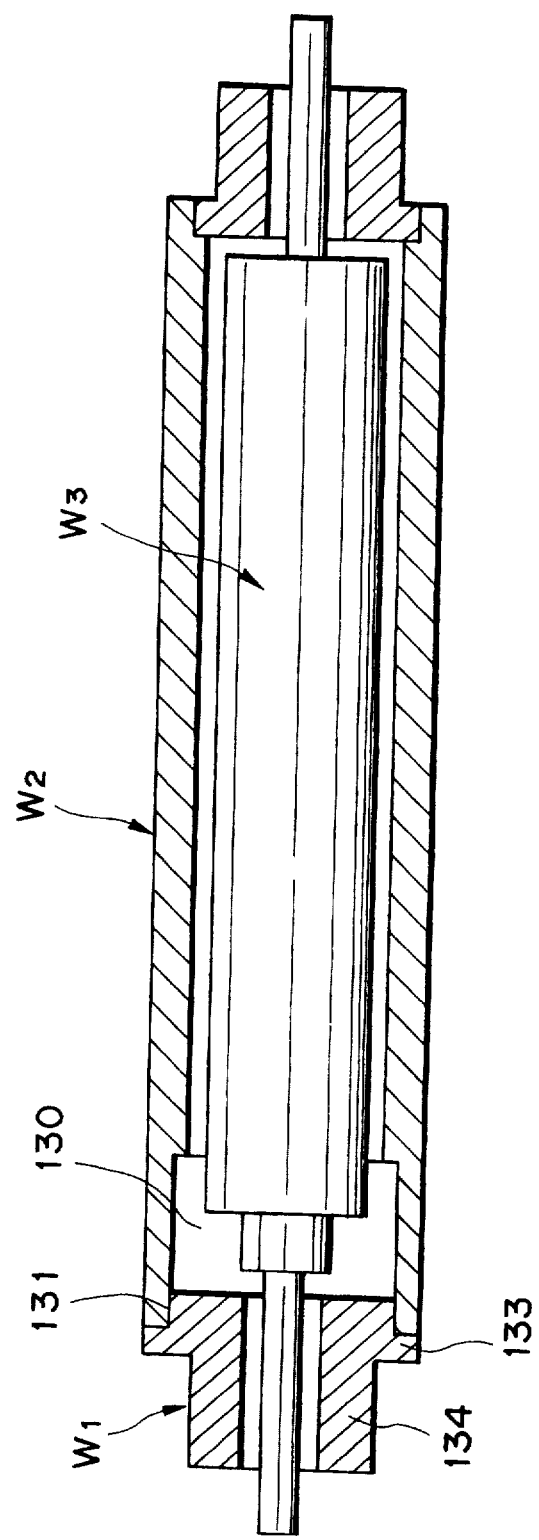
FIG. 20 is a sectional view of a developing sleeve which can be manufactured by the manufacturing apparatus in FIG. 1.
Figure 21:
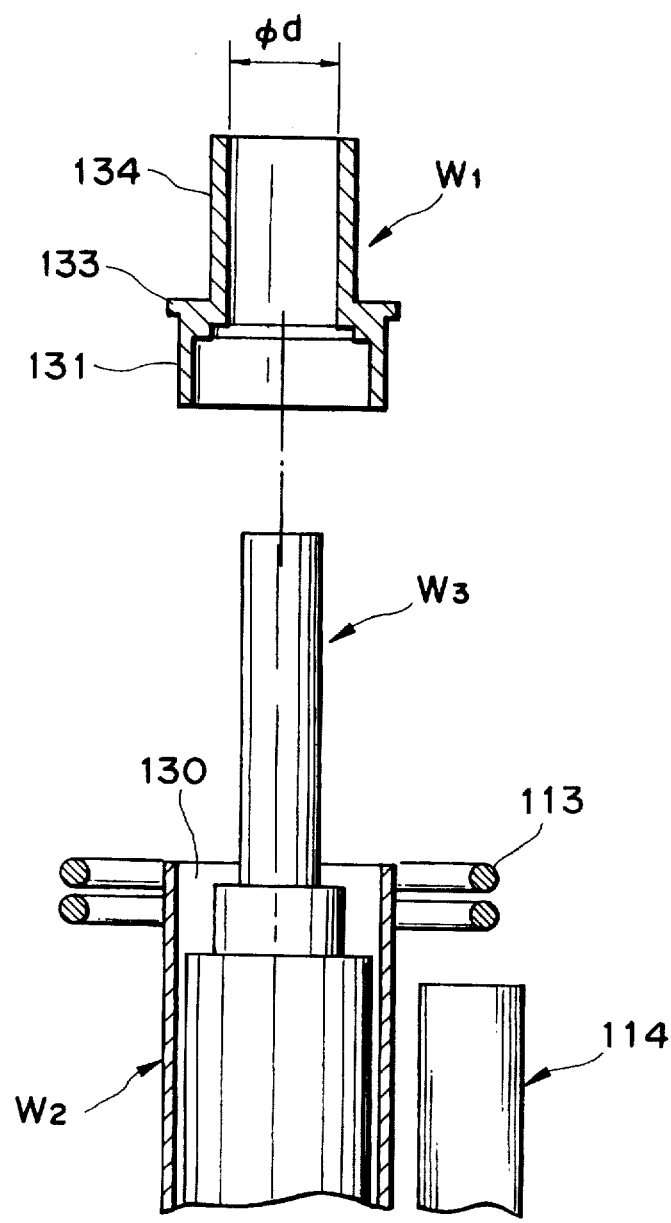
FIG. 21 is a sectional view of the main parts for explaining the heating operation by the second embodiment of the developing sleeve manufacturing apparatus according to the present invention.

A manufacturing apparatus of this embodiment is an example of an apparatus for connecting flanges W1 to a sleeve W2, which incorporates a magnet roller W3 as illustrated in FIGS. 20 and 21, by shrink fit.

Figure 22:
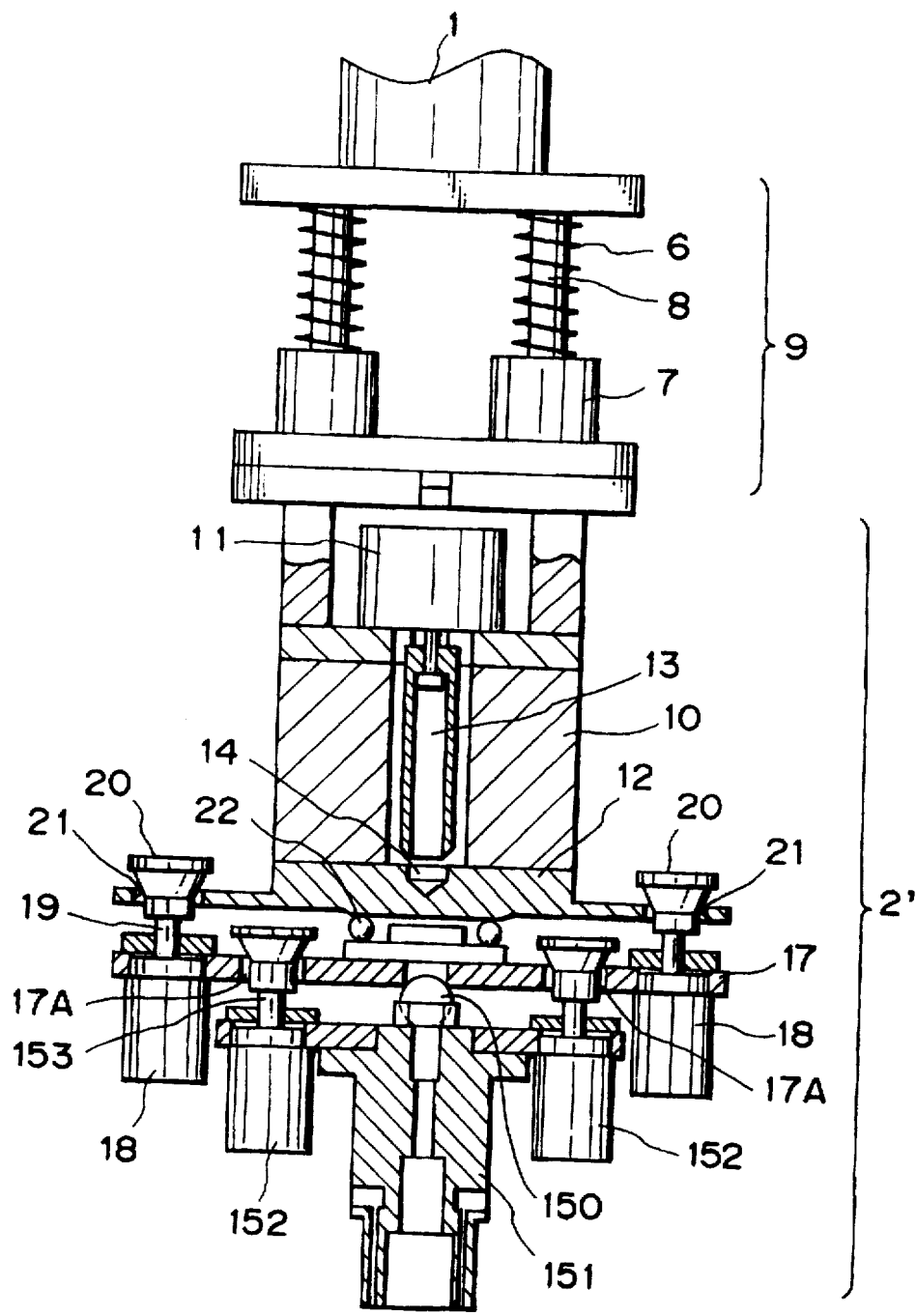
FIG. 22 is a sectional view of a robot hand in the second embodiment of the developing sleeve manufacturing apparatus according to the present invention.

As shown in FIG. 20, when the flanges W1 are connected to the sleeve W2 incorporating the magnet roller W3 as in this embodiment, the end portions of the magnet roller W3 protrude to the outside through the flanges W1. Therefore, the robot hand 2 in the previous embodiment cannot directly urge the flange W1 by using the ball 24A. In this embodiment, therefore, a robot hand 2', FIG. 22, which incorporates an angle absorbing mechanism is mounted instead of the robot hand 2 described above. The difference of the robot hand 2' from the robot hand 2 will be described below.

The robot hand 2' has a chucking head 151 for vacuum-chucking the flange W1. A ball screw 150 having a rotatable ball 150A is attached to this chucking head 151. Tapered tops 153 are pulled downward by a plurality of chucking head lock cylinders 152 mounted on the chucking head 151 and are fitted and fixed in fitting holes 17A of a parallel hand fixing member 17. That is, the chucking head 151 is pulled up and fixed to the parallel hand fixing member 17 by the chucking head lock cylinders 152.

When insertion of the flange W1 is started, as illustrated in FIG. 23A, parallel hand lock cylinders 18 fit and fix tapered tops 20 in fitting holes 21, and the chucking head lock cylinders 152 fit and fix the tapered tops 153 in the fitting holes 17A. After the flange W1 is inserted, as shown in FIG. 23B, the parallel hand lock cylinders 18 immediately perform an unlocking operation to permit a relative displacement between a lock plate 12 and the parallel hand fixing member 17. At the same time, the chucking head lock cylinders 152 perform an unlocking operation to permit a relative displacement between the parallel hand fixing member 17 and the chucking head 151. Consequently, the flange W1 is connected along an inner-diameter processed hole 130 of the sleeve W2.

In connecting the flange W1, the flange W1 is urged downward by force F of springs 6 of a cushion unit 9. Accordingly, as illustrated in FIG. 23A, a positional difference $\Delta x$ of the parallel hand fixing member 17 from the lock plate 12 is absorbed by a thrust bearing 22, and an angle $\Delta \theta$ of the chucking head 151 from the parallel hand fixing member 17 is absorbed.

Since the outer diameter of the magnet roller W3 is smaller than the inner diameter of the sleeve W2, the magnet roller W3 is not fixedly positioned but inclined in the sleeve W2. If this inclination of the magnet roller W3 is large, the end portion of the magnet roller W3 cannot be inserted inside an inner diameter $\phi d$ (FIG. 21) of the flange W1 when the flange W1 is connected. Therefore, a magnetic body 114 arranged in a turntable 5 is used. That is, by the attraction force between the magnetic body 114 and the magnet roller W3, the magnet roller W3 is attracted to one side in the sleeve W2 and positioned parallel to the sleeve W2. Since this avoids interference between the flange W1 and the magnet roller W3, the flange W1 can be inserted into the inner-diameter processed hole 130 of the sleeve W2.

[Practical Examples of Developing Sleeve Manufacturing Method]

(First Embodiment)

A developing sleeve of this embodiment was manufactured by shrink-fitting a flange in one end portion of the sleeve by using the manufacturing apparatus according to the first embodiment described previously and press-fitting another flange in the other end of the sleeve.

Figure 24A:
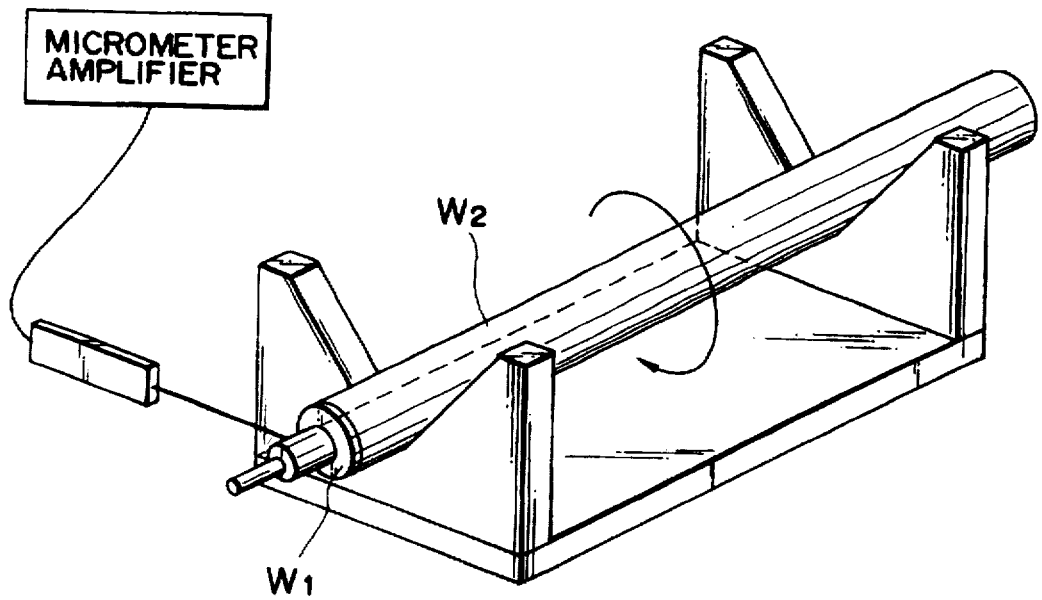
FIGS. 24A to 24C are views for explaining the measurement position of the developing sleeve.

An aluminum alloy extruded/drawn cylindrical pipe 12 mm in outer diameter, 10.4 mm in inner diameter, and 246 mm in length was used as the material of a sleeve W2, and an inner-diameter processed hole 130 having an inner diameter of 10.610 mm and a length of 5 mm was cut in one end of the cylindrical pipe. When the sleeve W2 thus processed was rotated with its two ends held at positions A and B as illustrated in FIG. 24C, the run-out at a point a, i.e., an inner-diameter run-out was 8 $\mu$m, and the end face squareness was 3 $\mu$m. This sleeve W2 was set in the manufacturing apparatus of the first embodiment described earlier such that the inner-diameter processed hole 130 was located above. Note that the outer diameter and the length of a connecting portion 131 of a flange W1 were 10.618 mm and 1.5 mm, respectively.

In order to develop a latent image formed on a latent image carrier by an electrophotographic process or an electrostatic recording process, a magnet roller is inserted into a developing sleeve as will be described later. This is to carry a developer by a magnetic force. When the magnetic force of the magnet, roller is taken into consideration, the thickness of the cylindrical member of the developing sleeve preferably ranges between 0.5 and 1.5 mm. Also, the connection strength of the flange member of the developing sleeve needs to be 5 to 50 kg when prevention of a skew or removal of the flange upon rotation is taken into account. From the foregoing, the following dimensions are effective.

That is, the connection margin needs to be 0.04 to 0.2% of a reference inner diameter. The connection length is set to between 1 to 5 mm in order to prevent a skew of the flange member after the connection and to ensure a high connection strength. If the connection margin is smaller than 0.04% of the reference inner diameter, a necessary connection strength cannot be attained. On the other hand, a connection strength margin larger than 0.2% of the reference inner diameter results in an unnecessarily high strength. The flange may have a skew after being connected if the connection length is 1 mm or smaller, but a connection length of 5 mm or larger is unnecessary. An increase in the diameter of the cylindrical member caused by heating is preferably 0.3 to 0.5% of the reference inner diameter. If the increase is smaller than 0.3%, the flange member may be connected askew due to the contact between the cylindrical member and the flange member. If the increase is larger than 0.5%, the heating temperature becomes too high, and this may cause heat deterioration of the material.

To obtain good images by using the developing sleeve, it is preferable to suppress the run-out of the flange member to 15 $\mu$m or less. This is so because the run-out of the entire developing sleeve can be suppressed by an accuracy of 15 $\mu$m or less when the developing sleeve is coupled to a means of rotating the developing sleeve. To obtain this accuracy, it is necessary to decrease the inner-diameter run-out (socket joint run-out) of the connecting portion of the cylindrical member to be 10 $\mu$m or less and to decrease the end face squareness to be 5 $\mu$m or less. Under these connecting conditions, the run-out of the flange member becomes 15 $\mu$m or less.

In a cylindrical body such as a developing sleeve or a photosensitive drum, it is preferable that a cylindrical member and flange members be made from the same material, when the environmental conditions of a copying machine or a printer in which the cylindrical body is incorporated are taken into account. This is particularly preferable to obtain a high connection strength in every environment including a high-temperature, high-humidity environment and a low-temperature, low-humidity environment. The material is especially preferably aluminum because of a light weight and a high processability. However, aluminum has the drawback that it readily thermally deforms under thermal conditions at high temperatures. Therefore, it is necessary to suppress the heating temperature so that the increase in the diameter of an aluminum cylindrical member ranges between 0.3 and 0.5% of the reference inner diameter.

In the manufacture of the developing sleeve, in connecting the flange member to the cylindrical member in the presence of the magnet roller set in the cylindrical member, the heating temperature of the cylindrical member must be suppressed to avoid a variation in the magnetic force of the magnet roller resulting from heating for increasing the diameter of the cylindrical member. From this necessity, the increase in the diameter of the cylindrical member is set to between 0.3 and 0.5% of the reference inner diameter. Also, changes in the magnetic force of the magnet roller can be suppressed by setting the heating temperature to 200° C. or lower.

In connecting the flange W1 and the sleeve W2, a portion 5 mm long from the upper end of the sleeve W2 was heated to about 200° C. with a coil supplied power of 0.7 kw and a power supply time of 1 sec by using a radio-frequency heating device 4, thereby increasing the diameter of the inner-diameter processed hole 130 of the sleeve W2 by 42 $\mu$m. Thereafter, the flange W1 was inserted and connected to the sleeve W2.

FIG. 45 shows the supplied power and the power supply time necessary to heat the end portion of the sleeve W2 to 200° C. when the diameter of the sleeve W2 changed.

Figure 24B:
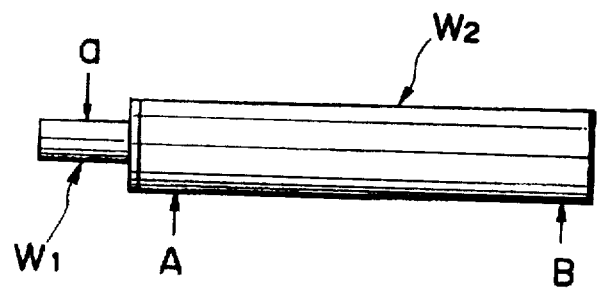
Figure 24C:
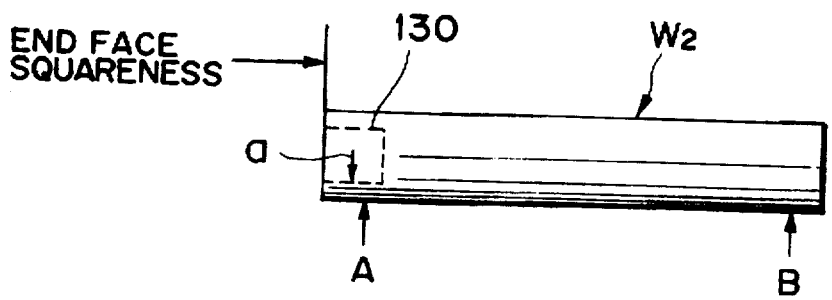

The run-out at a position a of the flange W1 was measured when the developing sleeve material in which the flange W1 was connected to one end (in which the inner-diameter processed hole 130 was formed) of the sleeve W2 was rotated with the ends of the sleeve W2 held at positions A and B as illustrated in FIG. 24B. The run-out was found to be 10 $\mu$m. Also, a force of 10 kg was required to forcedly pull out the flange W1 from the sleeve W2.

Note that when the run-out accuracy is set to 10 $\mu$m, the run-out of the whole range over within the range over which good images can be obtained when the sleeve is coupled to the sleeve rotating means. Note also that a pulling strength of 10 kg can be deemed a sufficient strength for the rotating means when prevention of a skew or removal of the flange is taken into consideration.

Figure 25:
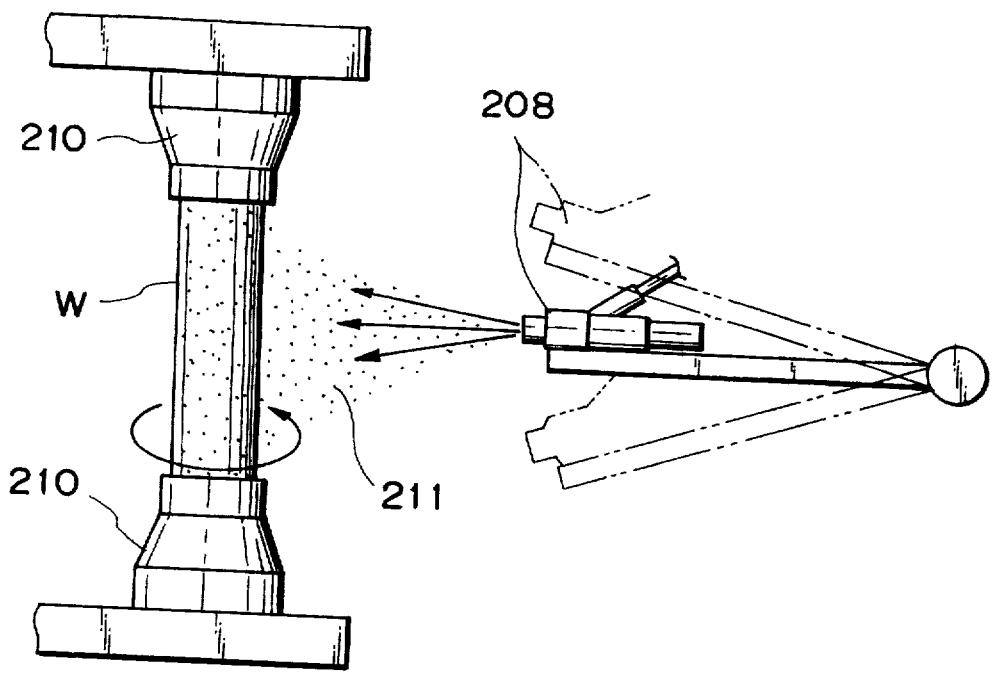
FIG. 25 is a side view for explaining blasting of the developing sleeve.

Furthermore, sandblasting as illustrated in FIG. 25 was done for the developing sleeve material. In FIG. 25, reference symbol W denotes the developing sleeve material, and reference numeral 208 denotes a blast nozzle for discharging abrasive grains 211; and 210, upper and lower masking jigs. The abrasive grains were sprayed while the developing sleeve material W was rotated. The sandblast conditions were as follows.

Figure 26:
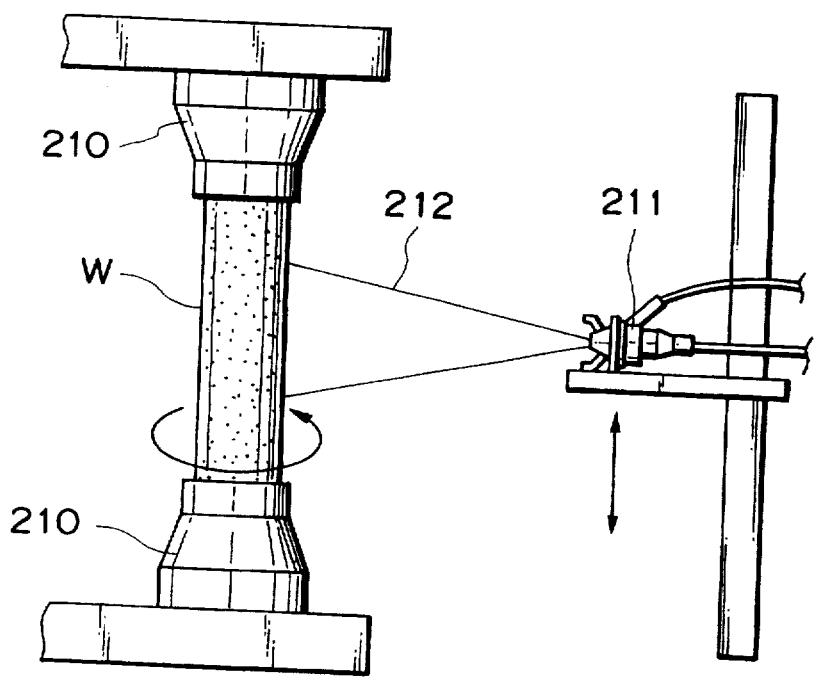
FIG. 26 is a side view for explaining coating of the developing sleeve.

Abrasive grains; alumina powder (#100,
manufactured by Showa Denko K.K.)
Discharge pressure; 2.8 kg/cm$^2$
Nozzle distance; 120 mm
Blast time; 60 sec.
Sleeve rotating speed; 60 rpm Thereafter, as illustrated in FIG. 26, a paint 212 for improving the charging properties was sprayed from a spray 211 onto the developing sleeve material W thus blasted (Ra=2 to 2.5 $\mu$m), forming a coating layer. The resultant developing sleeve material W was placed in a drying oven at 150° C. for about 30 min to thermally set the coating film. The paint 212 was prepared by mixing an MEK solvent, such that the solid content was 10%, in 10 parts by weight of conductive carbon, 90 parts by weight of graphite (average abrasive grain size 7 μm), and 100 parts by weight of a phenolic resin, placing the resultant mixture together with glass beads in a paint mixing device (e.g., a paint shaker), and dispersing the materials for five hours.

Figure 27A:
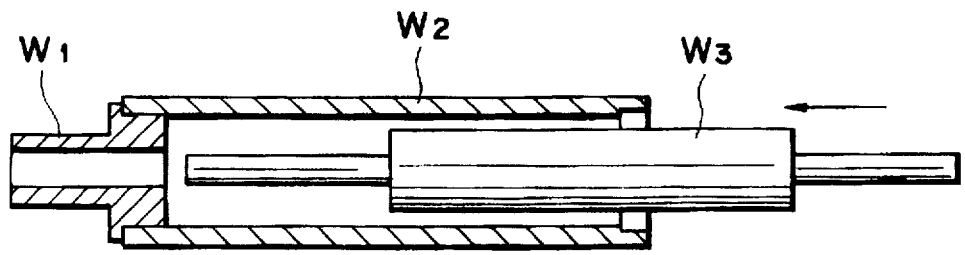
FIGS. 27A to 27C are sectional views for explaining a developing sleeve manufacturing method according to the present invention.
Figure 27B:
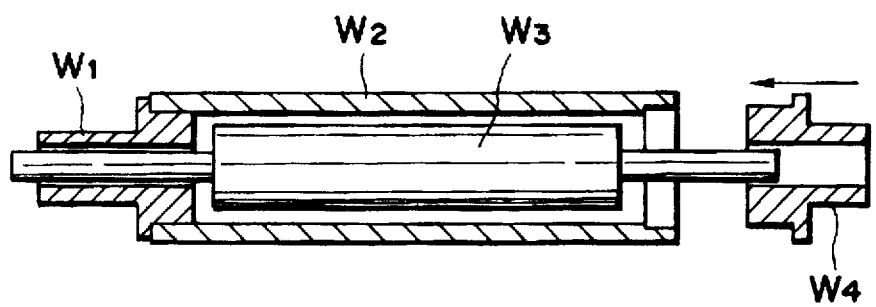
Figure 27C:
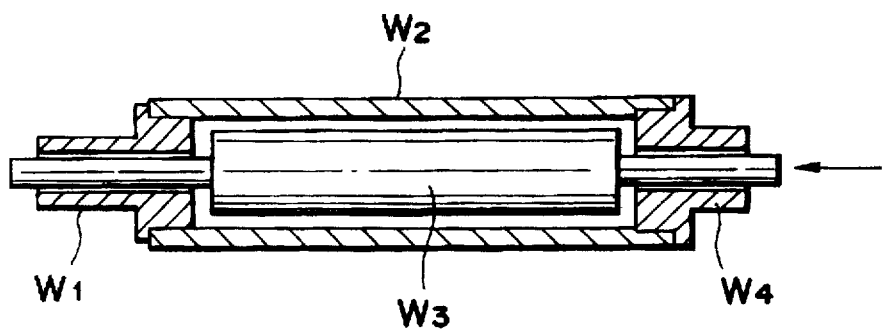

Thereafter, as shown in FIGS. 27A to 27C, a magnet roller W3 was inserted into the developing sleeve material W in which the flange W1 was connected to one end of the sleeve W2, and a flange W4 was then pressed into the other end of the sleeve W2 to complete the developing sleeve. In this way, after the resin coated on the surface of the sleeve W2 was thermally set, the magnet roller W3 was incorporated. Accordingly, it was possible to avoid a change in the lines of magnetic force of the magnet roller W3 or a thermal deformation of the magnetic roller W3 caused by heat during the thermal setting.

The developing sleeve thus completed was mounted in a process cartridge of a laser beam printer manufactured by CANON INC., and images were formed. The result was that good images were obtained with no pitch variation by the sleeve W2.

Note that instead of surface roughening by blasting in FIG. 25, it is also possible to do it by adding spherical grains 1 to 30 μm in diameter to the paint 212 during the coating step in FIG. 26. Examples of the spherical grains are nylon, silicone, phenol, polystyrene, polymethylmethacrylate, and polyethylene spherical grains. The surface roughness can be controlled by changing the addition amount or the grain size of the spherical grains. If the grain size is 1 μm or smaller, no desired surface roughness can be attained. A grain size larger than 30 μm is too large to obtain good adhesion properties with the resin.

Also, to suppress skewing of the flange W1 when it is inserted, central axis lathe or cutting can be performed for the sleeve W2 incorporating the magnet roller W3.
(Second Embodiment)

By using the same materials and methods as in the first embodiment described above, a developing sleeve material was manufactured by connecting a flange W1 to one end portion of a sleeve W2. The inner-diameter run-out (socket joint run-out) was 7 μm, and the end face squareness was 4 μm. Thereafter, blasting and formation of a coating layer for improving the charging properties were performed following the same procedures as in the first embodiment. However, the paint for forming the coating layer was prepared by mixing 10 parts by weight of conductive carbon, 90 parts by weight of graphite (average abrasive grain size 7 μm), PMMA spherical grains (average grain size 10 μm), and 100 parts by weight of a phenolic resin, and dispersing the resultant mixture in a paint shaker as in the first embodiment.

Following the same procedure as in the first embodiment, a magnet roller W3 was inserted into the sleeve W2, and a flange W4 was pressed into the other end of the sleeve W2, thereby completing the developing sleeve. The run-out of the flange W4 was found to be 10 μm.

The developing sleeve thus completed was used to form images in the same manner as in the first embodiment, and the result was that good images were obtained.
(Third Embodiment)

A developing sleeve of this embodiment was manufactured by connecting a flange to one end of the sleeve and shrink-fitting another flange in the other end of the sleeve by using the manufacturing apparatus of the second embodiment described above.

A sleeve W2 was an aluminum alloy extruded/drawn cylindrical pipe 20 mm in outer diameter, 18.4 mm in inner diameter, and 330 mm in length. A flange having a through hole 8 mm in inner diameter was connected to one end of the sleeve W2. An inner-diameter processed hole 130 having an inner diameter of 18.635 mm and a length of 4 mm was cut in the other end of the sleeve W2. When the sleeve W2 thus processed was rotated with its two ends held at positions A and B as shown in FIG. 24C, the run-out at a point a, i.e., the socket joint run-out was 7 μm, and the end face squareness was 4 μm.

Following the same procedure as in the second embodiment, a coating solution was coated on the sleeve W2 to one end of which the flange was connected.

Figure 28A:
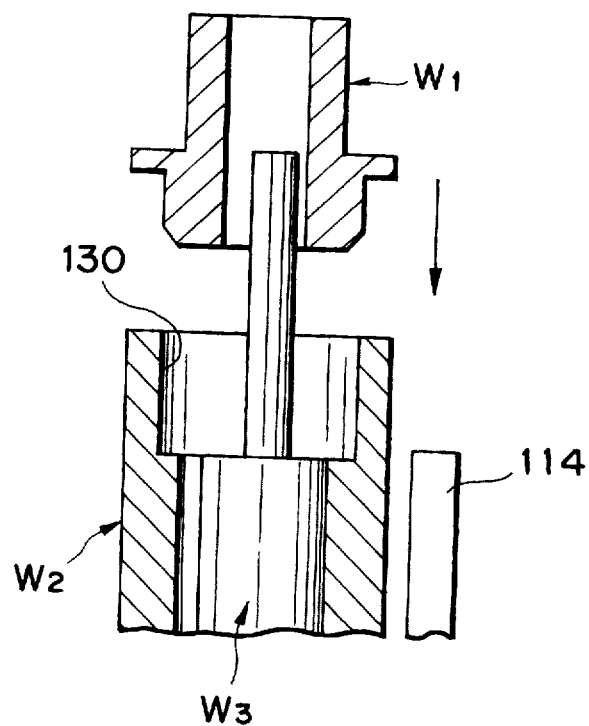
FIGS. 28A and 28B are sectional views of the major parts for explaining another embodiment of the developing sleeve manufacturing method according to the present invention.
Figure 28B:
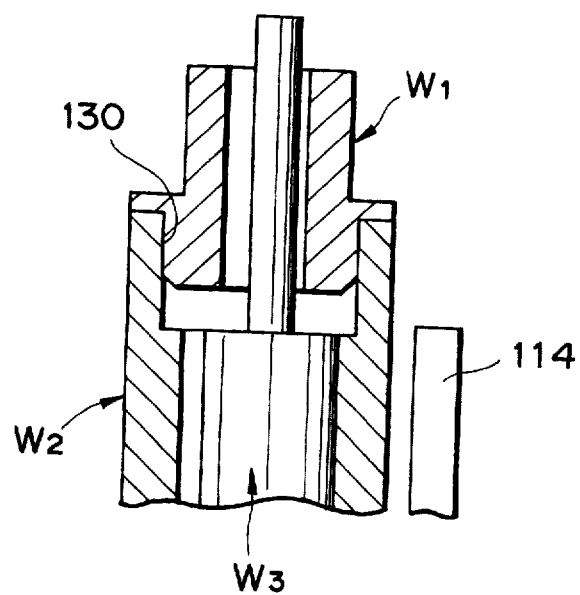

As illustrated in FIGS. 28A and 28B, by using the manufacturing apparatus of the second embodiment, a magnet roller W3 was inserted into the sleeve W2 and positioned and held by a magnetic body 114, and a flange W1 was shrink-fitted in the inner-diameter processed hole 130 in the other end of the sleeve W2. The outer diameter and the length of a connecting portion 131 of the flange W1 were 18.645 mm and 3.5 mm, respectively, and the inner diameter of the through hole of the flange W1 through which the end portion of the magnet roller W3 extended was 10 mm. In connecting the flange W1 and the sleeve W2, the inner-diameter processed hole 130 in the other end of the sleeve W2 was heated to approximately 200° C. with a supplied power of 2 kw and a power supply time of 1 sec by a radio-frequency heating device 4, thereby increasing the inner diameter by 75 μm. The flange W1 was then inserted and connected to the sleeve W2.

The developing sleeve material in which the flange W1 was connected to one end (in which the inner-diameter processed hole 130 was formed) of the sleeve W2 as described above was rotated with the two ends of the sleeve W2 held at positions A and B, as shown in FIG. 24A, and the run-out at a position a of the flange W1 was measured and found to be 11 μm. Also, a force of 20 kg or more was necessary to forcedly pull out the flange W1 from the sleeve W2.

The developing sleeve thus completed was used in the same manner as in the first embodiment with the result that good images were obtained.
(Fourth Embodiment)

As in the above third embodiment, a developing sleeve of this embodiment was manufactured by connecting a flange to one end of the sleeve and shrink-fitting another flange in the other end of the sleeve by using the manufacturing apparatus of the second embodiment described previously.

Figure 29C:
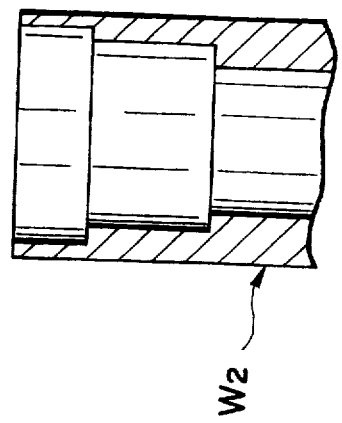
FIGS. 29A to 29C are sectional views of the major parts for explaining still another embodiment of the developing sleeve manufacturing method according to the present invention.

A sleeve W2 was an aluminum alloy extruded/drawn cylindrical pipe 20 mm in outer diameter, 18.8 mm in inner diameter, and 330 mm in length. A sintered oilless bearing whose inner diameter ranged from 5.01 to 5.04 mm was fixed in a flange connected to one end of the sleeve W2. A shaft portion at one end of a magnet roller W3 was axially supported by this bearing. As shown in FIG. 29C, a step socket joint was formed inside the other end of the sleeve W2. Following the same procedure as in the second embodiment, a coating solution was coated on the sleeve W2 to one end of which the flange was connected.

Figure 29B:
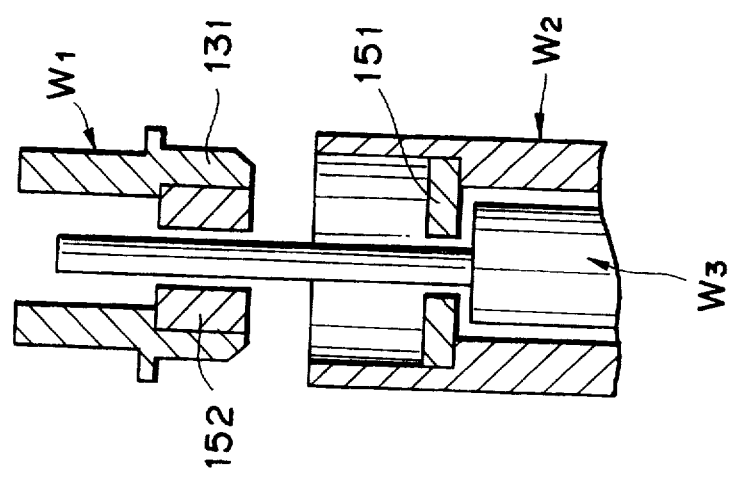
Figure 29A:
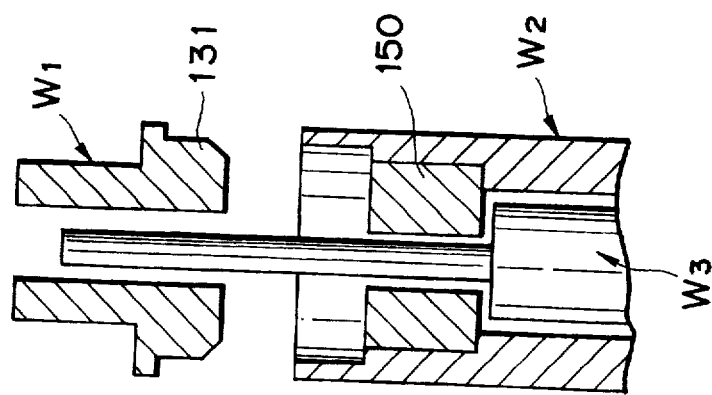

Thereafter, the magnet roller W3 was inserted into the sleeve W2, and, as illustrated in FIG. 29A, a shaft portion at one end of the magnet roller W3 was axially supported by a sintered oilless bearing 150 whose inner diameter ranged between 5.01 and 5.04 mm. The shaft portion at one end of the magnet roller W3 had an outer diameter of 5 mm and a dimensional tolerance of f8(JIS: Japan Industrial Standard), i.e., ϕ4.972 to ϕ4.990, with respect to the bearing 150. A shaft portion at the other end of the magnet roller W3 also was similarly axially supported. The socket joint of the sleeve W2 to be connected to the flange W1 had an inner diameter of 19.003 mm and a length of 2.5 mm. When the sleeve W2 was rotated with its two ends held at positions A and B as in FIG. 24C, the run-out at a point a, i.e., the socket joint run-out was 6 μm, and the end face squareness was 3 μm.

The sleeve W2 thus manufactured was set in the manufacturing apparatus of the second embodiment described earlier, and a flange W1 was shrink-fitted in the other end of the sleeve W2. The outer diameter, the length, and the inner diameter of a connecting portion 131 of the flange W1 were 19.017 mm, 2.5 mm, and 6±0.2 mm, respectively. The diameter of the other end of the sleeve W2 was increased by 76 μm by a heating device 4.

The developing sleeve in which the flange W1 was thus shrink-fitted in the sleeve W2 was rotated with the two ends of the sleeve W2 held at positions A and B as shown in FIG. 24A, and the run-out at a position a of the flange W1 was measured. The run-out was found to be 9 μm. Also, a force of 15 kg or higher was required to forcedly pull out the flange W1 from the sleeve W2.

The developing sleeve thus completed was used in the same way as in the first embodiment, and as a result good images were obtained.

Note that the bearing 150 is not limited to a sintered oilless bearing, so it is possible to use, e.g., a polyacetal resin bearing or a heat-resistant engineering plastics.

(Fifth Embodiment)

As in the above fourth embodiment, a developing sleeve of this embodiment was manufactured by connecting a flange to one end of the sleeve and shrink-fitting another flange in the other end of the sleeve by using the manufacturing apparatus of the second embodiment described previously.

A sleeve W2 was an aluminum alloy extruded/drawn cylindrical pipe 20 mm in outer diameter, 18.8 mm in inner diameter, and 330 mm in length. A sintered oilless bearing whose inner diameter ranged from 5.01 to 5.04 mm was fixed in a flange connected to one end of the sleeve W2. A shaft portion at one end of a magnet roller W3 was axially supported by this bearing. As shown in FIG. 29B, a socket joint was formed inside the other end of the sleeve W2. The inner diameter, the length, the socket joint run-out, and the end face squareness of the socket joint were set to 18.903 mm, 5 mm, 6 μm, and 4 μm, respectively. Following the same procedure as in the second embodiment, a coating solution was coated on the sleeve W2 to one end of which the flange was connected.

Thereafter, the magnet roller W3 was inserted into the sleeve W2, and, as illustrated in FIG. 29B, a shaft portion at one end of the magnet roller W3 was axially supported by a sintered oilless bearing 151 whose inner diameter ranged between 5.01 and 5.04 mm. The shaft portion at one end of the magnet roller W3 had an outer diameter of 5 mm and a dimensional tolerance of f8, i.e., ϕ4.972 to ϕ4.990, with respect to the bearing 150. A shaft portion at the other end of the magnet roller W3 also was similarly axially supported.

The sleeve W2 thus manufactured was set in the manufacturing apparatus of the second embodiment described earlier, and a flange W1 was shrink-fitted in the other end of the sleeve W2. The outer diameter and the length of a connecting portion 131 of the flange W1 were 18.915 mm and 3.5 mm, respectively. A sintered oilless bearing 152 whose inner diameter ranged between 5.01 and 5.04 was fixed inside the flange W1. As in the fourth embodiment, the diameter of the other end of the sleeve W2 was increased by 76 μm with a supplied power of 2 kw and a power supply time of 1 sec by using a heating device 4.

The developing sleeve in which the flange W1 was thus shrink-fitted in the sleeve W2 was rotated with the two ends of the sleeve W2 held at positions A and B as shown in FIG. 24A, and the run-out at a position a of the flange W1 was measured. The run-out was found to be 9 μm. Also, a force of 20 kg or higher was required to forcedly pull out the flange W1 from the sleeve W2.

The developing sleeve thus completed was used in the same way as in the first embodiment, and as a result good images were obtained.

(Sixth, Seventh, & Eighth Embodiments)

FIG. 46 shows data of the sixth, seventh, and eighth embodiments as developing sleeves. These embodiments were manufactured by changing dimensions such as the connection margin in the third embodiment described previously. Also, Comparative Examples 1 to 5 were manufactured and evaluated.

Additionally, the following developing sleeves were manufactured and evaluated as Comparative Examples 6, 7, and 8.

In Comparative Example 6, a flange W1 was shrink-fitted without positioning a magnet roller W3 by using a magnetic body 114 in the manufacture of the developing sleeve according to the third embodiment. As a result, the flange W1 was inserted and connected askew, and the run-out of the flange W1 was 40 μm. This produced pitch variations in formed images, leading to a practical problem.

In Comparative Example 7, a flange W1 was shrink-fitted without positioning a magnet roller W3 by using a magnetic body 114 in the manufacture of the developing sleeve according to the forth embodiment. As a result, the flange W1 was inserted and connected askew, and the run-out of the flange W1 was 50 μm.

In Comparative Example 8, a flange W1 was shrink-fitted without fixing a magnet roller W3 in the manufacture of the developing sleeve according to the fifth embodiment. As a result, the flange W1 was inserted askew only halfway. Also, the force required to pull out the flange W1 was 5 kg or less.

(Ninth Embodiment) A flange including a sintered oilless bearing whose inner diameter ranged from 5.01 to 5.04 mm was attached to one end of an SUS304 sleeve W2 20.0 mm in outer diameter, 18.8 mm in inner diameter, and 321.4 mm in length. As shown in FIG. 29A, a step socket joint was formed in the other end of the sleeve W2. Thereafter, a coating solution was coated following the same procedure as in the first embodiment. Subsequently, a magnet roller W3 was inserted into the sleeve W2 and held by the sintered oilless bearing. The outer diameter of the bearing was 5 mm, the dimensional tolerance of the bearing with respect to the interior of the other end of the sleeve W2 was f8, i.e., ϕ4.972 to ϕ4.990, and the inner diameter of the bearing was 5.01 to 5.04 mm. The socket joint in the other end of the sleeve W2 to which a flange W1 was connected had an inner diameter of 19.003 mm, a length of 2.5 mm, a socket joint run-out of 7 μm, and an end face squareness of 4 μm.

The other end of the sleeve W2 was heated to approximately 200° C. with a supplied power of 1 kw and a power supply time of 1 sec, thereby increasing the diameter by 76 μm. Following the same procedure as in the first embodiment, the sleeve W1 was inserted and connected. The outer diameter, the length, and the inner diameter of the connected portion of the sleeve W1 were 19.016 mm, 2.3 mm, and 6±0.2 mm, respectively.

After the flange W1 and the sleeve W2 were connected, the run-out of the flange W1 was measured and found to be 11 µm. Also, a force of 15 kg or more was required to forcedly pull out the flange W1. The developing sleeve thus manufactured was used in the same manner as in the first embodiment, and the result was that no pitch variation took place and good images were obtained.

(Tenth Embodiment)

A developing sleeve was manufactured following the same procedures as in the fifth embodiment except that the material of a sleeve W2 was changed from aluminum to SUS304. The result was that the run-out of a flange W1 was 10 µm and the pulling force was 20 kg.

[Examples of Structure of Developing Sleeve]

FIGS. 30 to 34 illustrate developing sleeves having different structures. In these drawings, reference numeral 160 denotes a sintered oilless bearing for axially supporting a magnet roller W3.

Figure 30:
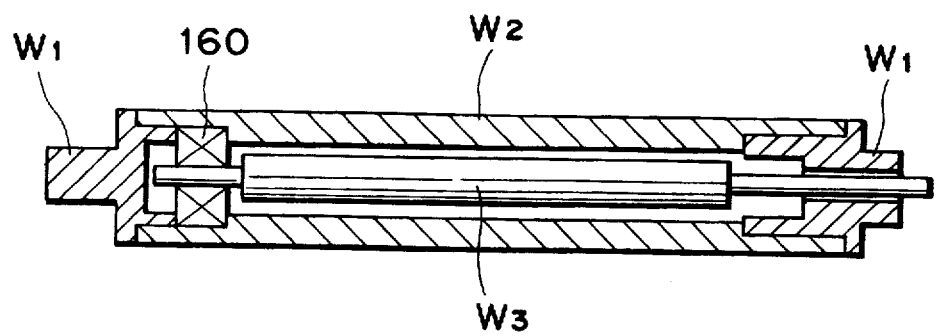
FIG. 30 is a sectional view for explaining another example of the structure of the developing sleeve according to the present invention.
Figure 31A:
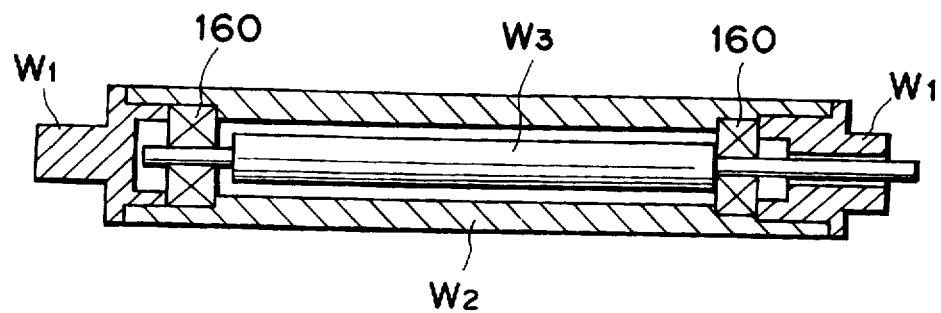
FIGS. 31A and 31B are sectional views for explaining still another example of the structure of the developing sleeve according to the present invention.
Figure 31B:
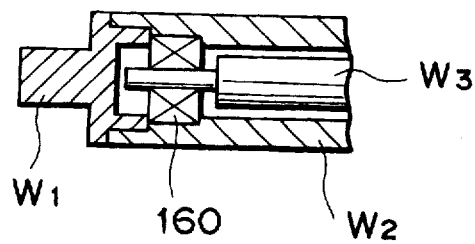
Figure 32:
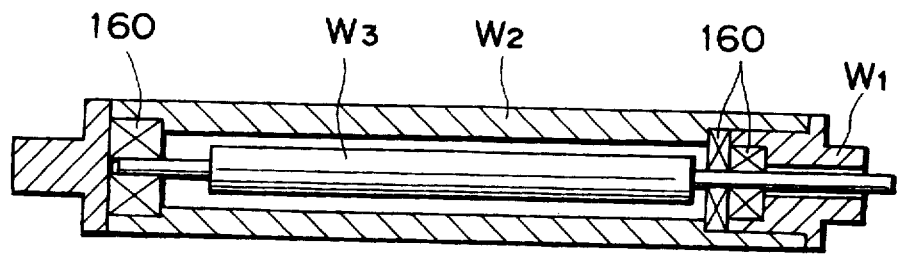
FIG. 32 is a sectional views for explaining still another example of the structure of the developing sleeve according to the present invention.
Figure 33A:
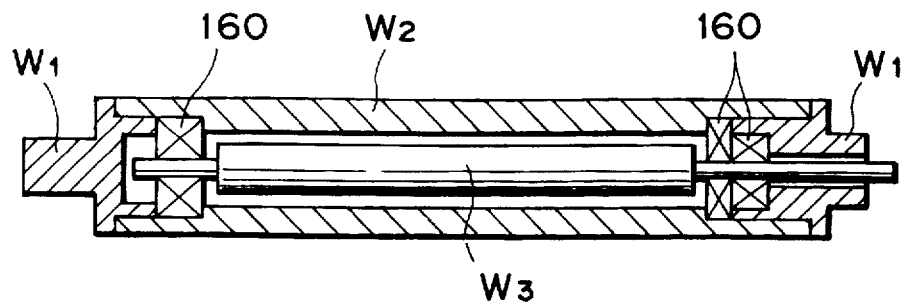
FIGS. 33A and 33B are sectional views for explaining still another example of the structure of the developing sleeve according to the present invention.
Figure 33B:
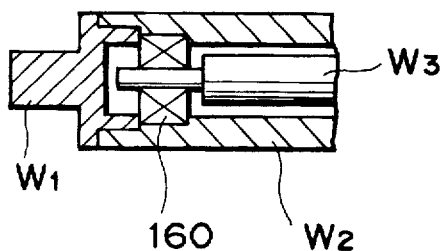
Figure 34:
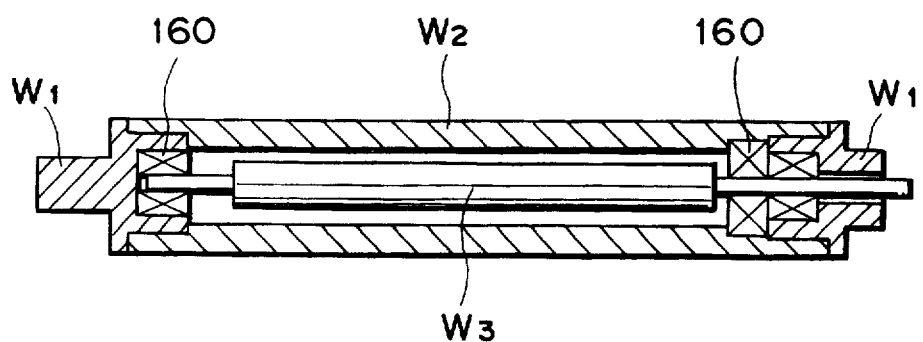
FIG. 34 is a sectional views for explaining still another example of the structure of the developing sleeve according to the present invention.

In the developing sleeve shown in FIG. 30, the bearing 160 is arranged only on the driving side (on the side of a left flange W1). Note it is possible to use a plastic flange as a flange W1 on the non-driving side, the right-hand side in FIG. 30, and an aluminum flange as the flange W1 on the driving side, the left-hand side in FIG. 30. Referring to FIG. 31A, bearings 160 are provided in the two ends of a developing sleeve. The bearing 160 on the left side of FIG. 31A can also be attached inside a sleeve W2 in which a step socket joint is formed as shown in FIG. 31B. The developing sleeve illustrated in FIG. 32 includes two bearings 160 on the non-driving side (on the side of a right flange W1). In the developing sleeve shown in FIG. 33A, the left flange W1, FIG. 31A, is fitted in the sleeve W2. In the developing sleeve shown in FIG. 33B, the bearing 160 is attached inside the left end of the sleeve W2 in which a step socket joint is formed. In the developing sleeve shown in FIG. 34, the bearing 160 is attached inside a left flange W1.

All of these developing sleeves illustrated in FIGS. 30 to 34 can be manufactured using the manufacturing apparatuses according to the first and second embodiments described previously.

[Practical Example of Photosensitive Drum Manufacturing Method]

A cylindrical pipe as an aluminum alloy extruded/drawn product having an outer diameter of 28.5 mm, an inner diameter of 27.1 mm, and a length of 260.5 mm was used as a cylindrical member (to be referred to as a "sleeve" hereinafter) of a photosensitive drum, and a socket joint 26.900 mm in inner diameter and 7 mm in length was cut in one end portion of this sleeve. The inner-diameter run-out (socket joint run-out) was 8 µm, and the end face squareness was 3 µm.

An aqueous ammonia solution of casein (11.2 g of casein, 1 g of 28% aqueous ammonia, and 222 ml of water) was coated by dip coating and dried, forming an undercoating layer with a coated amount of 1.0 g/cm².

Subsequently, 1 part by weight of aluminum chloride phthalocyanine, 1 part by weight of a bulyral resin (ESLECK BM-2 (trade name): available from Sekisui Chemical Co., Ltd.), and 30 parts by weight of isopropylalcohol were dispersed in a ball mill disperser for four hours. The resultant dispersion was coated on the previously formed undercoating layer by dip coating and dried, thereby forming a charge generating layer. The layer thickness was 0.3 µm.

Also, 1 part by weight of a hydrazone compound, 1 part by weight of a polysulfone resin (P1700 (trade name): available from Union Carbite Co.), and 6 parts by weight of monoclorobenzene were mixed and dissolved under stirring by a stirrer. The resultant solution was coated on the charge generating layer by dip coating and dried, forming a 2-µm thick charge transporting layer. In this manner a sleeve W2 of a photosensitive drum was manufactured.

A flange W1 was connected to one end portion of the sleeve W2 by using the manufacturing apparatus according to the first embodiment described previously. The diameter and the length of the connecting portion of the flange W1 were 26.913 mm and 2.0 mm, respectively. A portion 3 mm long from the end of the sleeve W2 was heated to about 200° C. with a supplied power of 3 kw and a power supply time of 1 sec by using a heating device 4, thereby increasing the diameter by 108 µm. Thereafter, the flange W1 was inserted and connected.

The run-out of the flange W1 was measured following the same procedures as in FIGS. 24A to 24C and found to be 10 µm. The force required to pull out the flange W1 was 15 kg or more. Thereafter, another flange was pressed into the other end of the sleeve W2 to complete the photosensitive drum.

To obtain good latent images by using the photosensitive drum, it is preferable that the run-out of the flange member be 20 µm or smaller. The run-out of the entire photosensitive can be suppressed by an accuracy of 20 µm or less when the photosensitive drum is coupled to a means of rotating the photosensitive drum. To obtain this accuracy, it is necessary to decrease the inner-diameter run-out (socket joint run-out) of the connecting portion of the cylindrical member to be 10 µm or less and to decrease the end face squareness to be 10 µm or less. Furthermore, the run-out of each component of the flange member must be 5 µm or less. Under these connecting conditions, the run-out of the flange member becomes 20 µm or less.

The photosensitive drum thus manufactured was mounted in a process cartridge of a laser beam printer available from CANON INC., and image formation was performed. As a result, good images were obtained with neither a pitch variation of the drum nor fogging.

Figure 47:
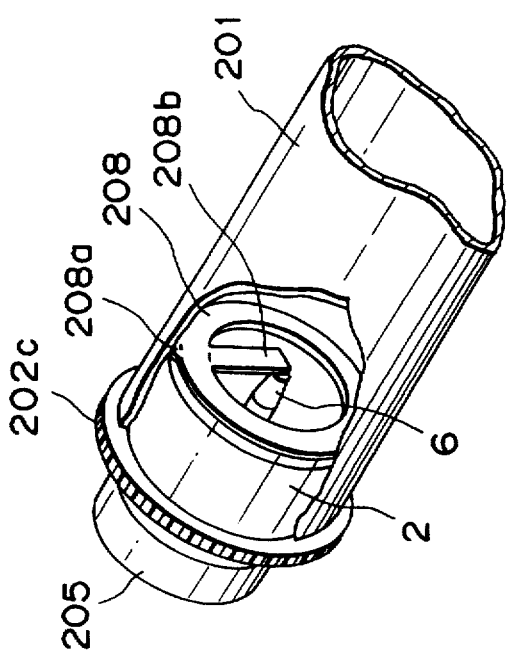
FIG. 47 is a perspective view of a photosensitive drum unit in the axial direction.
Figure 48:
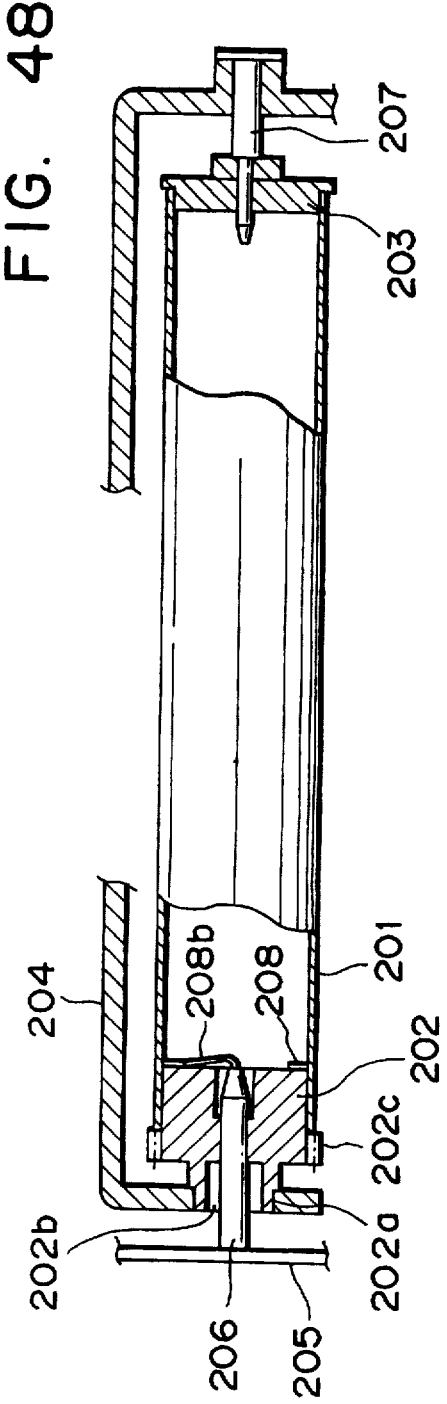
FIG. 48 is a sectional view of the photosensitive drum unit in the axial direction.

FIGS. 47 and 48 are sectional views of a photosensitive drum unit in the axial direction. A flange 203 and a flange 202 having a gear unit 202c are fixed to the two ends of a photosensitive drum 201. The gear unit 202c is rotated by meshing with a driving gear (not shown). Reference numeral 204 denotes a cartridge housing. The photosensitive drum 201 is rotatably attached inside the housing 204 by drum positioning pins 206 and 207.

[Another Embodiment of Developing Sleeve Manufacturing Apparatus]

In the first and second embodiments of the developing sleeve manufacturing apparatus, a flange W1 is connected after a magnet roller W3 is inserted into a sleeve W2.

Also, in the above embodiments, in order to improve the accuracy of the central axis of the magnet roller W3 in a developing sleeve W2, a bearing is incorporated into the flange W1, and the center shaft of the magnet roller W3 is supported by this bearing in the flange member. An iron shaft is used as the center shaft of the magnet roller W3.

In the above embodiments, this developing sleeve having a bearing in a flange member and an iron-shaft magnet roller is assembled by the method of shrink fit. This method can have the following problems.

That is, in the case of shrink fit, a high-accuracy developing sleeve can be obtained after shrink fit is completed.

However, when the sleeve W2 is heated with a radio frequency, the iron shaft of the magnet roller also is heated and thermally expands. Therefore, when the flange W1 is assembled the relationship between the bearing in the flange and the iron shaft changes from a clearance tolerance to a close tolerance, and this may cause an assembly error. Also, conduction of heat of the iron shaft may result in deformation of the magnet roller W3 or removal of the magnet from the iron shaft.

This embodiment is designed in consideration of these problems that might occur due to a temperature rise of the iron shaft.

This embodiment has many parts in common with the manufacturing apparatuses of the first and second embodiments, so only different parts will be described. The same reference numerals as in the first and second embodiments denote the same parts, and a detailed description thereof will be omitted.

As already described earlier, the outer diameter of a magnet roller W3 is smaller than the inner diameter of a sleeve W2, so the magnet roller W3 is not positioned but inclined in the sleeve W2. If this inclination of the magnet roller W3 is large, when a flange W1 is connected the end portion ($\phi$d2) of the magnet roller W3 cannot be inserted in the inner diameter, $\phi$d1 (FIG. 50), of a bearing 162 of the flange.

Figure 49:
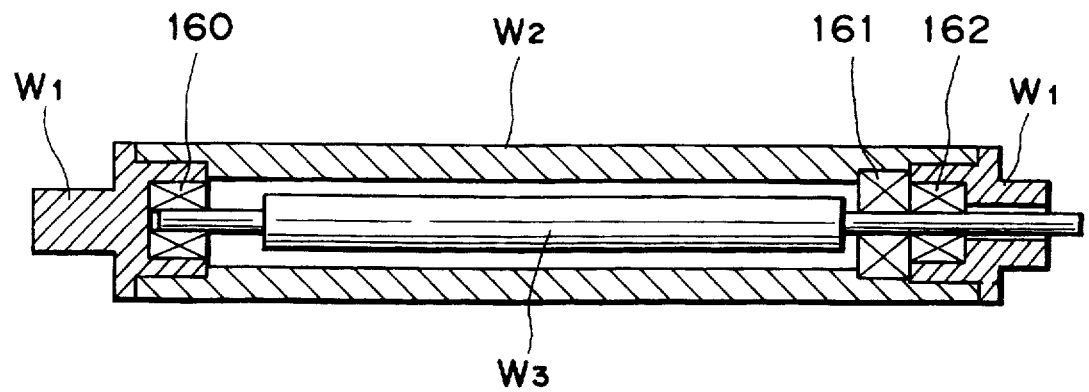
FIG. 49 is a view showing an example of the structure of a developing sleeve having a magnet roller with an iron core.
Figure 50:
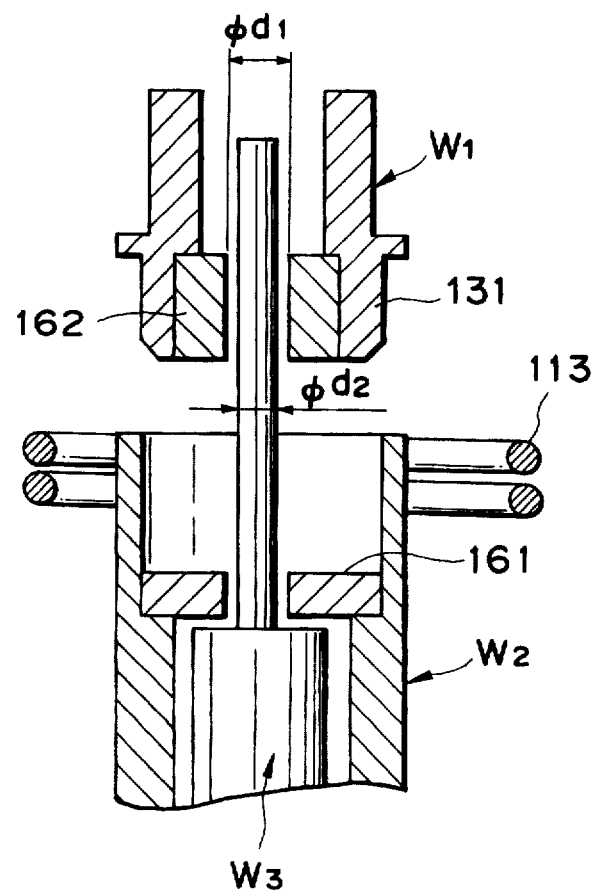
FIG. 50 is a view showing the way a flange is inserted into the sleeve.

As illustrated in FIGS. 49 and 50, therefore, a bearing 161 is placed in the sleeve W2 and used to temporarily align the magnet roller W3 with the central axis of the sleeve W2. Consequently, interference between the flange W1 and the magnet roller W3 is avoided, and this makes it possible to insert the flange W1 into the sleeve W2.

Note that the magnet roller W3 is either a resin integrally molded roller whose surface is not conductive or a resin integrally molded roller in the central axis of which an iron core is inserted. In this embodiment, shrink fit of a developing sleeve in which the sleeve W2 incorporates the magnet roller W3 having an iron core will be described.

Figure 51:
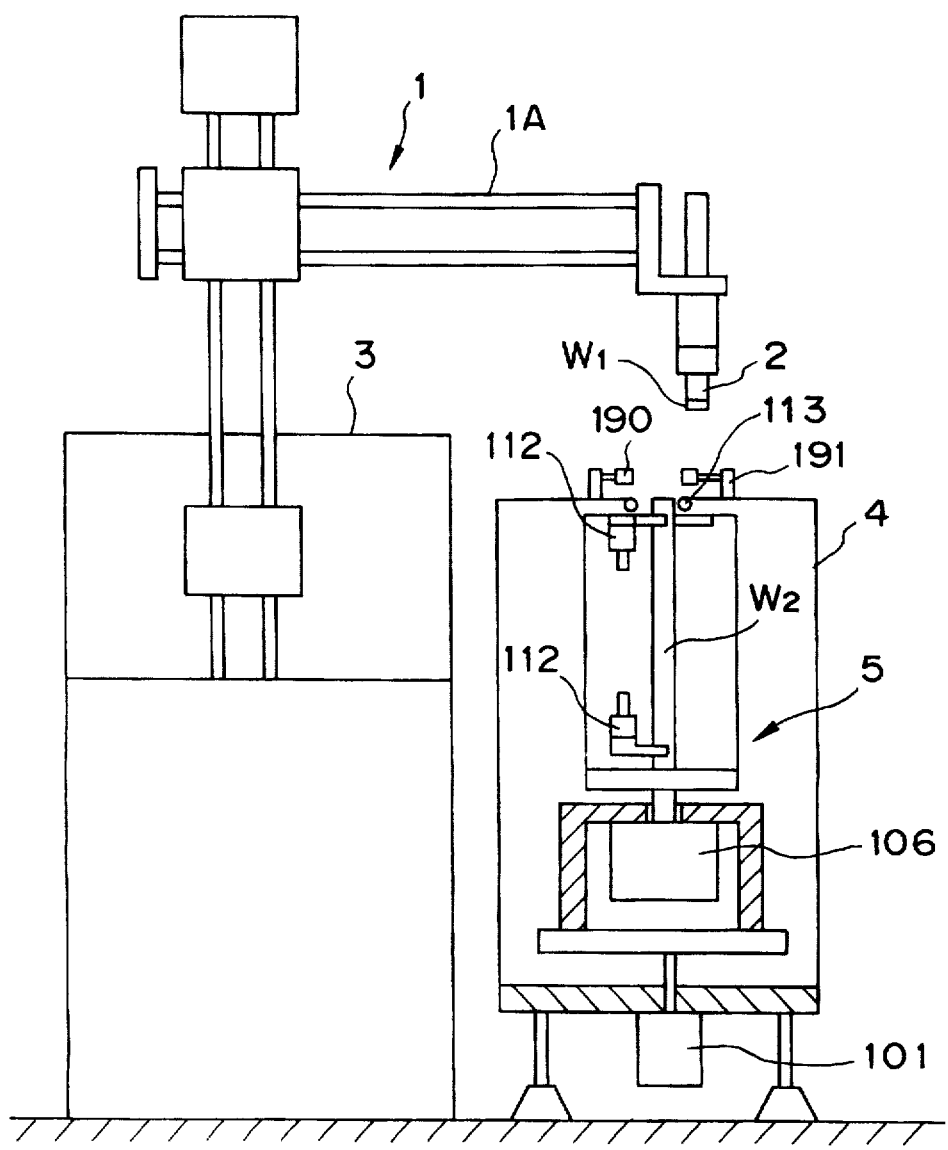
FIG. 51 is a side view showing another embodiment of the developing sleeve manufacturing apparatus according to the present invention.
Figure 52:
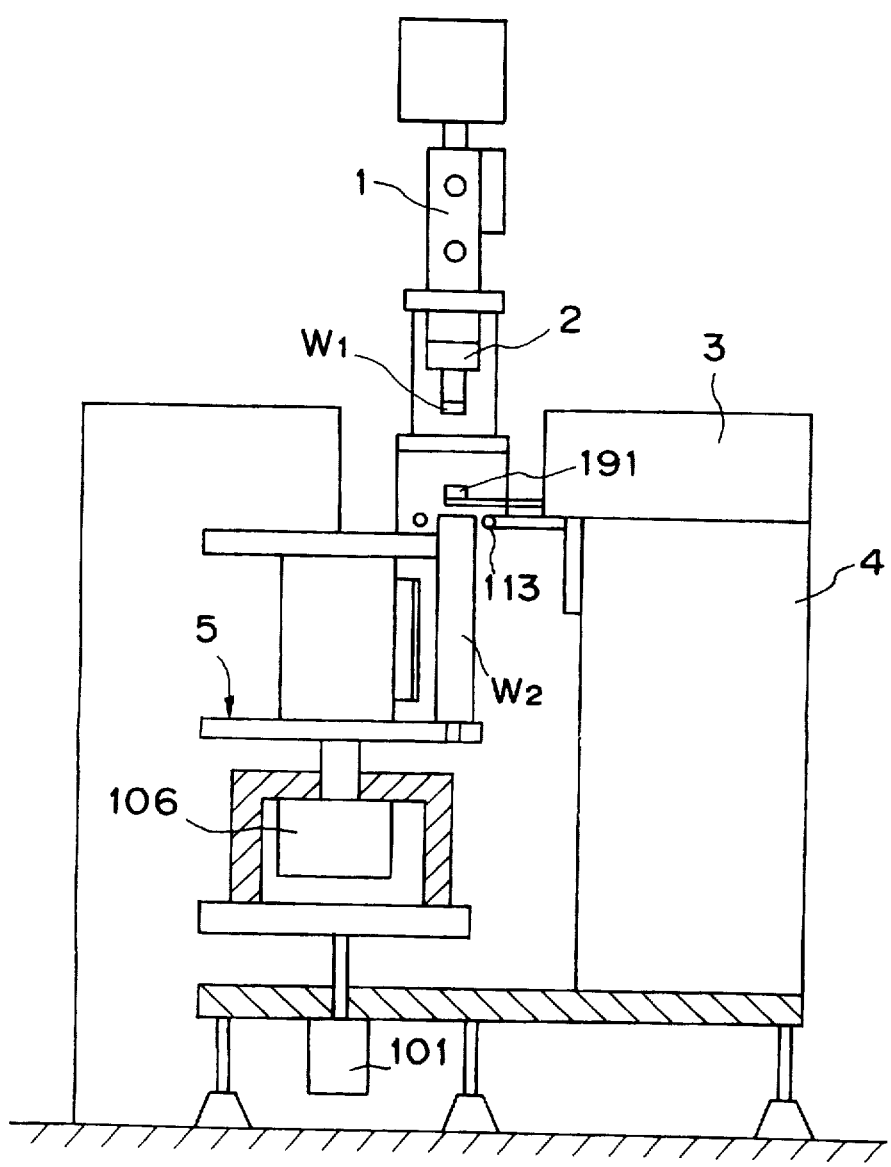
FIG. 52 is a front view of the manufacturing apparatus in FIG. 51.
Figure 53:
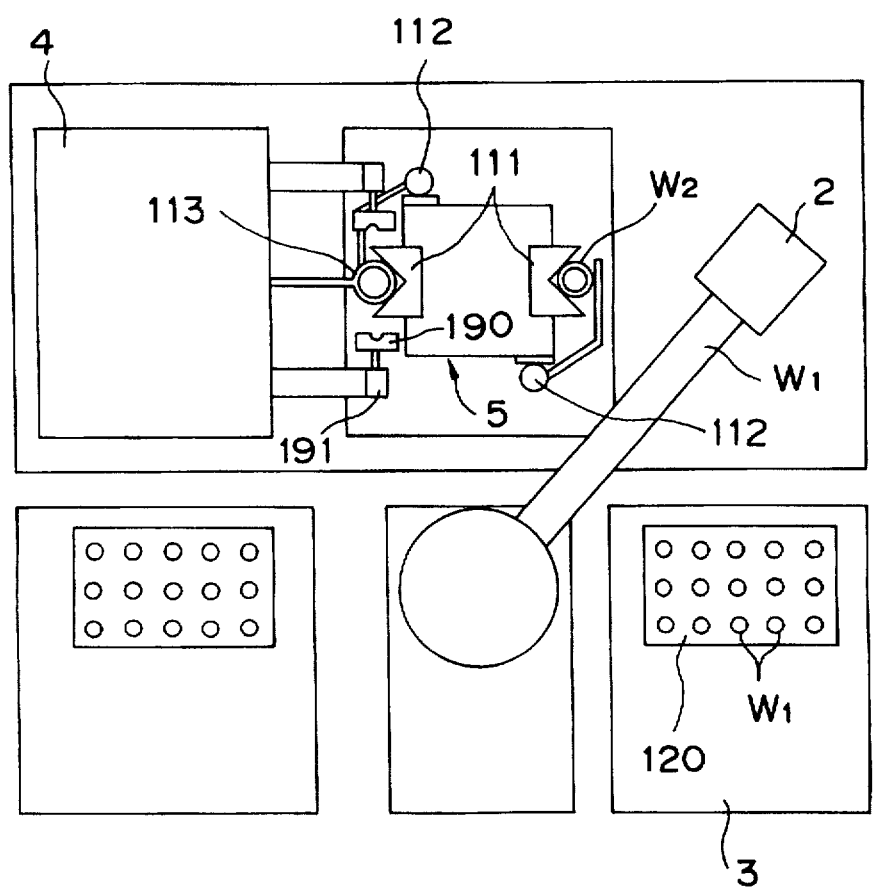
FIG. 53 is a plan view of the manufacturing apparatus in FIG. 51.

In a shrink fit apparatus illustrated in FIGS. 51 to 53, a metal body through which an eddy current flows generally self-generates heat by a radio-frequency heating device 4. The amount of heat generation is calculated by the following equation if the conditions such as the coil shape and the metal shape remain the same:

$$P \propto \mu r^2/\rho$$

where P is the self-generating heat power (W), $\rho$ is the specific resistance ($\Omega$m), and $\mu r$ is the permeability.

In the case of aluminum, $\mu r=1$ and $\rho=3.025\times10^{-8}$ ($\Omega$m), and in the case of iron, $\mu r=100$ and $\rho=9.71\times10^{-8}$ ($\Omega$m). That is, iron generates heat more easily than does aluminum.

More specifically, in heating connection (FIG. 54) incorporating the magnet roller W3 having the iron core, the aluminum sleeve W2 and the iron core of the magnet roller W3 are heated when a radio-frequency current is flowed through a coil 113. When the iron core is heated, the temperature of a resin magnetic portion 180 is raised by heat transfer. Consequently, the resin magnetic portion deforms, or adhesion between the resin magnetic portion and the iron core is broken, and this may make it impossible to obtain a satisfactory function.

Figure 56:
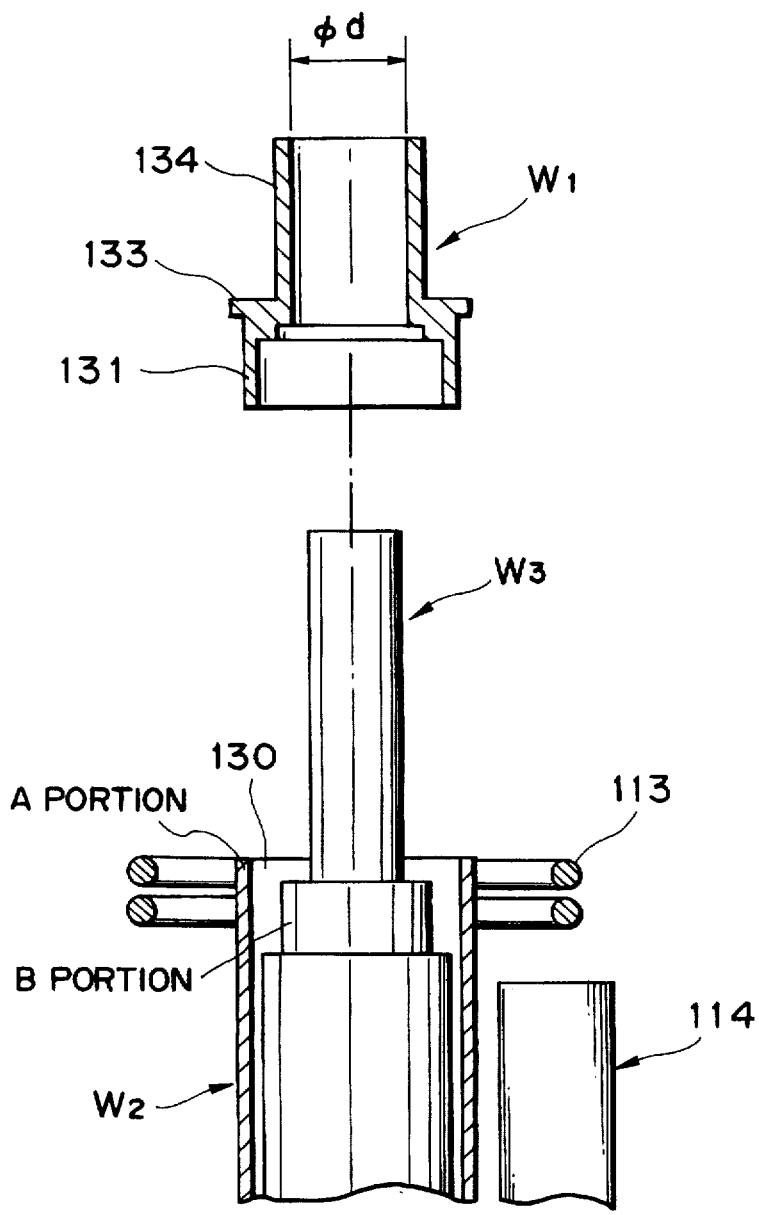
FIG. 56 is a view showing the way a flange is inserted into a sleeve having a resin integrally molded magnet roller.

For example, no eddy current flows on the surface of the resin integrally molded magnet roller W3 shown in FIG. 56. Accordingly, the output from the radio-frequency heating device 4 is finally, exclusively used to heat the aluminum sleeve W2. As a result, in FIG. 56 a portion A has a temperature rise by self-generation of heat but there is no temperature rise in a portion B.

Figure 54:
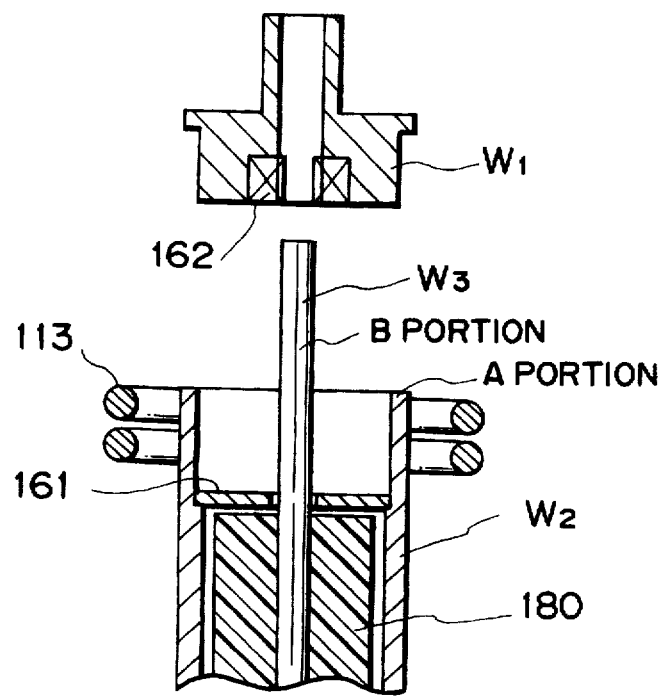
FIG. 54 is a view showing the way a flange is inserted into a sleeve.

In the case of the magnet roller W3 with the iron core shown in FIG. 54, however, both of the portions A and B have temperature rises. If the outer diameter of the aluminum sleeve W2 is large and the outer diameter of the iron core is small, the temperature rise in the iron core is negligible compared to the temperature rise in the aluminum sleeve when generation of a magnetic flux around the coil is taken into account. If this temperature rise is not negligible, the following method is used.

Figure 55:
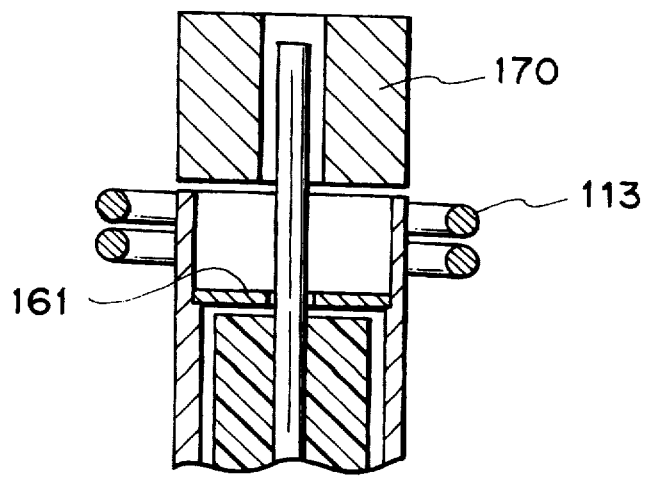
FIG. 55 is a view showing the state in which an iron core is covered with a magnetic shielding block.
Figure 57:
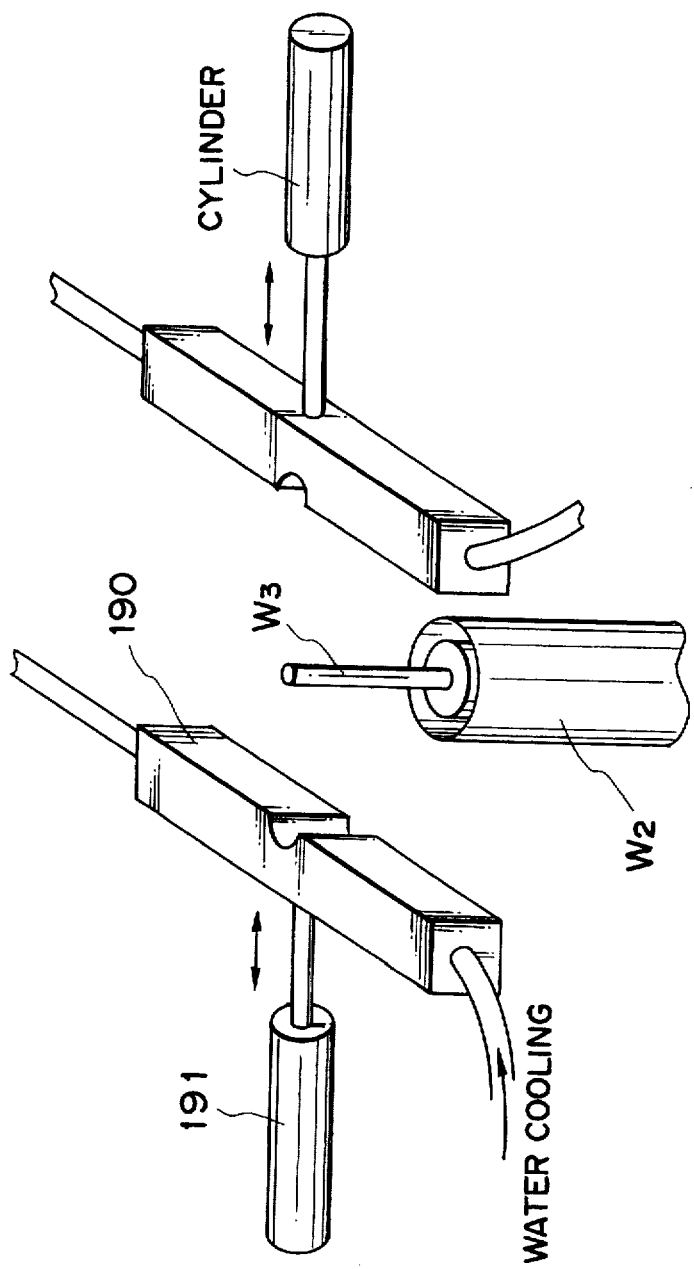
FIG. 57 is a view showing an example of the arrangement of the magnetic shielding block.

As illustrated in FIG. 55, magnetic shielding is performed by covering the iron core with a ferromagnetic hollow cylindrical roller 170 (made from, e.g., cobalt or nickel), thereby preventing the iron core from being heated by making an eddy current difficult to flow through the iron core. However, the hollow cylindrical roller 170 self-generates heat, and the opening portion of the aluminum sleeve W2 abruptly cool down after the radio-frequency heating. When the consequent clearance management is taken into consideration, the apparatus must be so designed as follows. That is, as illustrated in FIG. 57, the apparatus is so designed that magnetic shielding blocks 190 (made from, e.g., cobalt or nickel) can be moved at a high speed by cylinders 191 or NC motors on the two sides of the iron core. Also, piping for water cooling is arranged in each block 190 to constantly cool the block.

Figure 58:
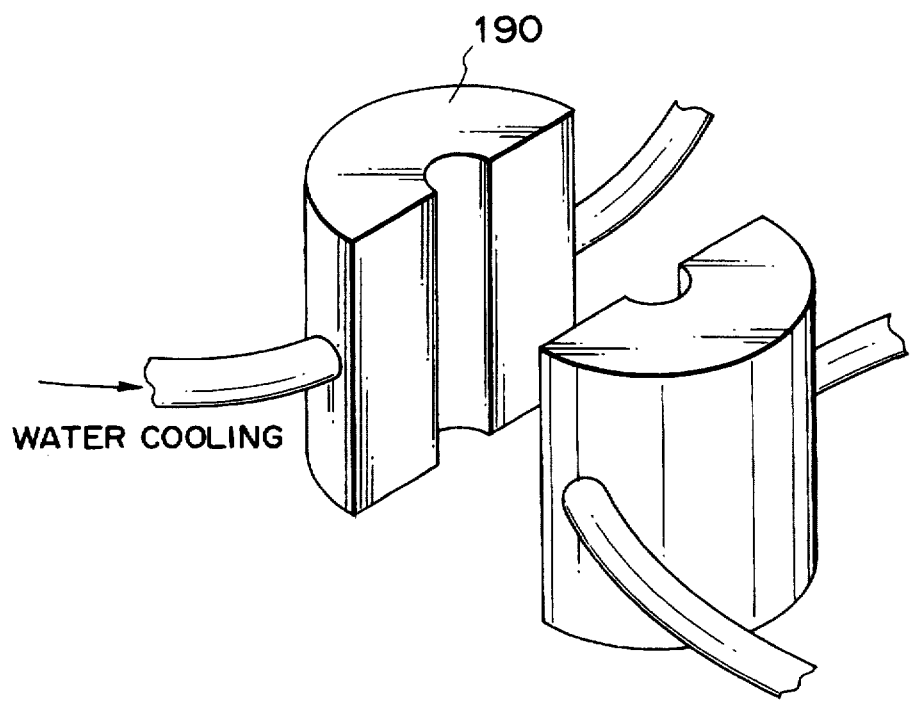
FIG. 58 is a view showing another example of the arrangement of the magnetic shielding block.

Note that these blocks 190 can have a semi-circular shape as shown in FIG. 58.

With this magnetic shielding method, the opening portion of the sleeve W2 can be heated without heating the iron core of the magnet roller W3. Consequently, in the developing sleeve in which the magnet roller W3 with the iron core is received by the bearings 162 and 160 in the flanges W1, the flanges W1 are smoothly inserted without causing thermal expansion of the iron core of the magnet roller W3.

The present invention is applicable to changes or modifications of the above embodiments without departing from the gist of the invention.

According to the above embodiments as described above, the close-fit relation between the cylindrical member and the flange member is changed to the clearance-fit relation by increasing the diameter of the connecting portion of the cylindrical member by heating. Thereafter, the flange member is fitted in the cylindrical member while the cylindrical member is being cooled, and the opposing portions of the cylindrical member and the flange member are pressed. Consequently, the central axes of the cylindrical member and the flange member can be aligned with a high accuracy in accordance with the processing accuracy of the connecting portions of the cylindrical member and the flange member.

With this method, in the case of a developing sleeve the run-out of the connected flange can be decreased to 15 $\mu$m or less. Accordingly, the developing sleeve has a little run-out as a whole when coupled with a means for rotating the developing sleeve, so good images can be obtained.

Also, in the case of a photosensitive drum the run-out of the connected flange can be decreased to 20 $\mu$m or less. Accordingly, the photosensitive drum has a little run-out as a whole when coupled with a means for rotating the photosensitive drum, so good latent images can be obtained.

Furthermore, in a developing apparatus using either of the developing sleeve or the photosensitive drum, the run-out is little when the sleeve or the drum is coupled with a rotating means, and the gap between the developing sleeve and the photosensitive drum varies little. Also, since good latent images are obtained, good images can be attained.

Additionally, when a cylindrical member is inductively heated with a radio frequency, a temperature rise in the end portion of a magnet roller can be reduced by magnetically shielding the end portion of the magnet roller. Consequently, it is possible to prevent heat deformation of the magnet roller, breaking of adhesion between the magnet and the iron core, and an assembly error upon insertion of a flange.

Also, the magnetic shielding means is constituted by two parts made from a ferromagnetic substance, and each part is so driven as to form a closed loop. As a consequence, when a robot inserts a flange these two parts can be rapidly retracted to positions where they have no influence on the insertion. This allows smooth insertion of the flange.

The present invention is not limited to the above embodiments and various changes and modifications can be made within the spirit and scope of the present invention. Therefore, to apprise the public of the scope of the present invention the following claims are made.

What is claimed is:

1. A cylindrical body for an image forming apparatus in which a shaft portion of a flange member is fitted into a hole having a machined diameter formed at an end portion of an aluminum cylindrical member, wherein the diameter of the hole and the shaft portion are set to have a close-fit relation, where a connection margin of 0.04% to 0.2% of the diameter of the hole is obtained between the diameter of the hole and the shaft portion at room temperature, and a depth of the hole is set to have a longer dimension than the shaft portion, wherein said flange member has an opposing surface which abuts against an end face of said cylindrical member, and wherein the end portion of said cylindrical member is heated and the hole is increased in diameter by 0.3% to 0.5% so as to have a clearance-fit relation with the shaft portion of said flange member, the shaft portion is fitted in the hole, an the end portion of said cylindrical member is cooled, so that a central axis of said flange member is aligned with a central axis of said cylindrical member, and an opposing surface of said flange member contacts the end face of the end portion of said cylindrical member.

2. The cylindrical body according to claim 1, wherein main constituents of the end portion of said cylindrical member and the shaft portion of said flange member are the same.

3. A cylindrical body for an image forming apparatus comprising:

a sleeve member having an opening portion formed in at least one end thereof, and a shaft member receiving portion being defined inside the opening portion, said sleeve member being made from aluminum; and a shaft member having a first cylindrical portion fitted into said shaft member receiving portion of said sleeve member, and a second cylindrical portion, which forms a shaft portion extending from the first cylindrical portion, wherein the shaft member receiving portion and the first cylindrical portion are set to have a close-fit relation, where a connection margin between the first cylindrical portion and the shaft member receiving portion is 0.04% to 0.2% of the diameter of the shaft member receiving portion at room temperature, and a length of shaft member receiving portion is set to have a longer dimension than said first cylindrical portion, and wherein the diameter of the shaft member receiving portion of said sleeve member is increased by 0.3% to 0.5% by heating the opening portion to a predetermined temperature by induction heating so as to have a clearance-fit relation with the first cylindrical portion, the first cylindrical portion of said shaft member is inserted and fitted in the shaft member receiving portion having been increased in diameter, and said shaft member and said sleeve member are connected by cooling the heated opening portion.

4. The cylindrical body according to claim 3, wherein a flange portion is formed on the first cylindrical portion of said shaft member so that an end face of the opening portion abuts against the flange portion when said shaft member is inserted into the shaft member receiving portion.

5. A cylindrical body for an image apparatus comprising:

a sleeve member having an opening portion formed in at least one end thereof, a shaft member receiving portion being defined inside the opening portion; and a shaft member having a first cylindrical portion fitted in the shaft member receiving portion of said sleeve member, and a second cylindrical portion, which forms a shaft portion extending from the first cylindrical portion, wherein said sleeve member and said shaft member are primarily made from aluminum, the shaft member receiving portion and the first cylindrical portion are set to have a close-fit relation, where a connection margin between the first cylindrical portion and the shaft member receiving portion of 0.04% to 0.2% of the diameter of the shaft member receiving portion is obtained between the shaft member receiving portion and the first cylindrical portion at room temperature, and a length of the shaft member receiving portion is set to have a longer dimension than the first cylindrical portion, and an inner diameter of the shaft member receiving portion of said sleeve member is increased by 0.3% to 0.5% by heating the opening portion to a predetermined temperature, the first cylindrical portion of said shaft member is inserted and fitted in the shaft member receiving portion having been increased in diameter, and said shaft member and said sleeve member are integrally connected by cooling the heated opening portion, thereby ensuring coaxiality between said sleeve member and said shaft member.

* * * * *

UNITED STATES PATENT AND TRADEMARK OFFICE
CERTIFICATE OF CORRECTION

PATENT NO. : 5,842,962

DATED : December 1, 1998

INVENTOR(S) : YUSUKE YAMADA, ET AL.

It is certified that error appears in the above-identified patent and that said Letters Patent is hereby corrected as shown below:

COVER PAGE [56]
Foreign Patent Documents, "3286414" should read
--3-286414--.

COLUMN 1,
Line 55, "made" should read --made to--.

COLUMN 19,
Line 24, "magnet," should read --magnet--.

COLUMN 20,
Line 56, "follows." should read --follows:--;
Line 57, "grains;" should read --grains:--;
Line 59, "pressure;" should read --pressure:--;
Line 60, "distance;" should read --distance:--;
Line 61, "time;" should read --time:--; and
Line 62, "speed;" should read --speed:--.

COLUMN 26,
Line 3, "Carbite" should read --Carbide--.

COLUMN 27,
Line 4, "assembled" should read --assembled,--; and
Line 25, "flange" should read --flange W1--.

UNITED STATES PATENT AND TRADEMARK OFFICE
CERTIFICATE OF CORRECTION

PATENT NO. : 5,842,962

DATED : December 1, 1998

INVENTOR(S): YUSUKE YAMADA, ET AL.

It is certified that error appears in the above-identified patent and that said Letters Patent is hereby corrected as shown below:

COLUMN 29,
Line 24, "hole" should read --hole,--;
Line 35, "an" should read --while--; and
Line 52, "fitted" should read --to be fitted--.

COLUMN 30,
Line 39, "portion" should read --portion,--.

Signed and Sealed this

Seventeenth Day of August, 1999

Attest:

Q. TODD DICKINSON

Attesting Officer

Acting Commissioner of Patents and Trademarks